(12) United States Patent
Hiramoto et al.

(10) Patent No.: US 9,385,961 B2
(45) Date of Patent: Jul. 5, 2016

(54) PARALLEL COMPUTING DEVICE, COMMUNICATION CONTROL DEVICE, AND COMMUNICATION CONTROL METHOD

(71) Applicant: FUJITSU LIMITED, Kawasaki-shi, Kanagawa (JP)

(72) Inventors: Shinya Hiramoto, Yokohama (JP); Yuji Oinaga, Sagamihara (JP); Yuichiro Ajima, Kawasaki (JP); Tomohiro Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 14/031,775

(22) Filed: Sep. 19, 2013

(65) Prior Publication Data
US 2014/0023090 A1 Jan. 23, 2014

Related U.S. Application Data

(63) Continuation of application No. PCT/JP2011/056836, filed on Mar. 22, 2011.

(51) Int. Cl.
 *H04J 3/16* (2006.01)
 *H04L 12/805* (2013.01)
 *H04L 12/825* (2013.01)
 *G06F 15/173* (2006.01)

(52) U.S. Cl.
 CPC ............ *H04L 47/365* (2013.01); *G06F 15/173* (2013.01); *H04L 47/25* (2013.01)

(58) Field of Classification Search
 CPC ..... H04K 47/365; H04K 47/25; G06F 15/173

USPC .......................................................... 370/471
See application file for complete search history.

(56) References Cited

U.S. PATENT DOCUMENTS

| | | | |
|---|---|---|---|
| 7,254,140 B1* | 8/2007 | Rokhsaz | H04L 12/5692 370/401 |
| 8,745,209 B2* | 6/2014 | Lloyd | H04L 47/14 370/229 |
| 2001/0044835 A1* | 11/2001 | Schober et al. | 709/217 |
| 2003/0174652 A1* | 9/2003 | Ebata | 370/235 |

(Continued)

FOREIGN PATENT DOCUMENTS

| EP | 1347601 | 9/2003 |
|---|---|---|
| EP | 1 424 818 | 6/2004 |

(Continued)

OTHER PUBLICATIONS

PCT International Preliminary Report on Patentability issued Oct. 3, 2013 in corresponding International Application No. PCT/JP2011/056836.

(Continued)

*Primary Examiner* — Faisal Choudhury
(74) *Attorney, Agent, or Firm* — Staas & Halsey LLP

(57) ABSTRACT

A parallel computing device includes a plurality of communicatively interconnected nodes for executing an arithmetic process. Each of the plurality of nodes includes: a measurement unit configured to measure a communication bandwidth up to a destination node based on a communication scheme among the nodes, and a control unit configured to control a size of a packet transmitted to the destination node according to the communication bandwidth measured by the measurement unit.

10 Claims, 45 Drawing Sheets

(56) References Cited

U.S. PATENT DOCUMENTS

| | | | |
|---|---|---|---|
| 2004/0109417 A1* | 6/2004 | Castro et al. .................. 370/238 |
| 2008/0062877 A1* | 3/2008 | Chen .............................. 370/235 |
| 2008/0112320 A1* | 5/2008 | van Willigenburg ......... 370/235 |
| 2008/0151776 A1 | 6/2008 | Kure |
| 2008/0192724 A1* | 8/2008 | Kondo et al. .................. 370/345 |
| 2009/0022061 A1* | 1/2009 | Walley ................ H04L 41/5003 370/252 |
| 2009/0037572 A1 | 2/2009 | Gebhart et al. |
| 2009/0049114 A1* | 2/2009 | Faraj ................. G06F 15/17337 709/201 |
| 2009/0182815 A1* | 7/2009 | Czechowski et al. ......... 709/206 |
| 2010/0157915 A1* | 6/2010 | Tsai .................... H04L 12/5693 370/329 |
| 2011/0007660 A1* | 1/2011 | Bae ............................... 370/252 |
| 2011/0222431 A1* | 9/2011 | Oue .................... H04L 43/0852 370/252 |
| 2012/0281715 A1* | 11/2012 | Shojania et al. .............. 370/468 |

FOREIGN PATENT DOCUMENTS

| | | |
|---|---|---|
| JP | 2001-326648 | 11/2001 |
| JP | 2003-273788 | 9/2003 |
| JP | 2007-158640 | 6/2007 |
| JP | 2008-160499 | 7/2008 |
| JP | 2008-205651 | 9/2008 |

OTHER PUBLICATIONS

International Search Report issued Apr. 19, 2011 in corresponding International Application No. PCT/JP2011/056836.
Japanese Office Action mailed Aug. 12, 2014 in corresponding Japanese Patent Application No. 2013-505695.
Extended European Search Report dated Sep. 3, 2014 in corresponding European Patent Application No. 11861487.4.
Chinese Office Action mailed Apr. 27, 2015 in corresponding Chinese Application No. 201180069370.5.
Chinese Office Action dated Aug. 13, 2015 in corresponding Chinese Patent Application No. 201180069370.5.

* cited by examiner

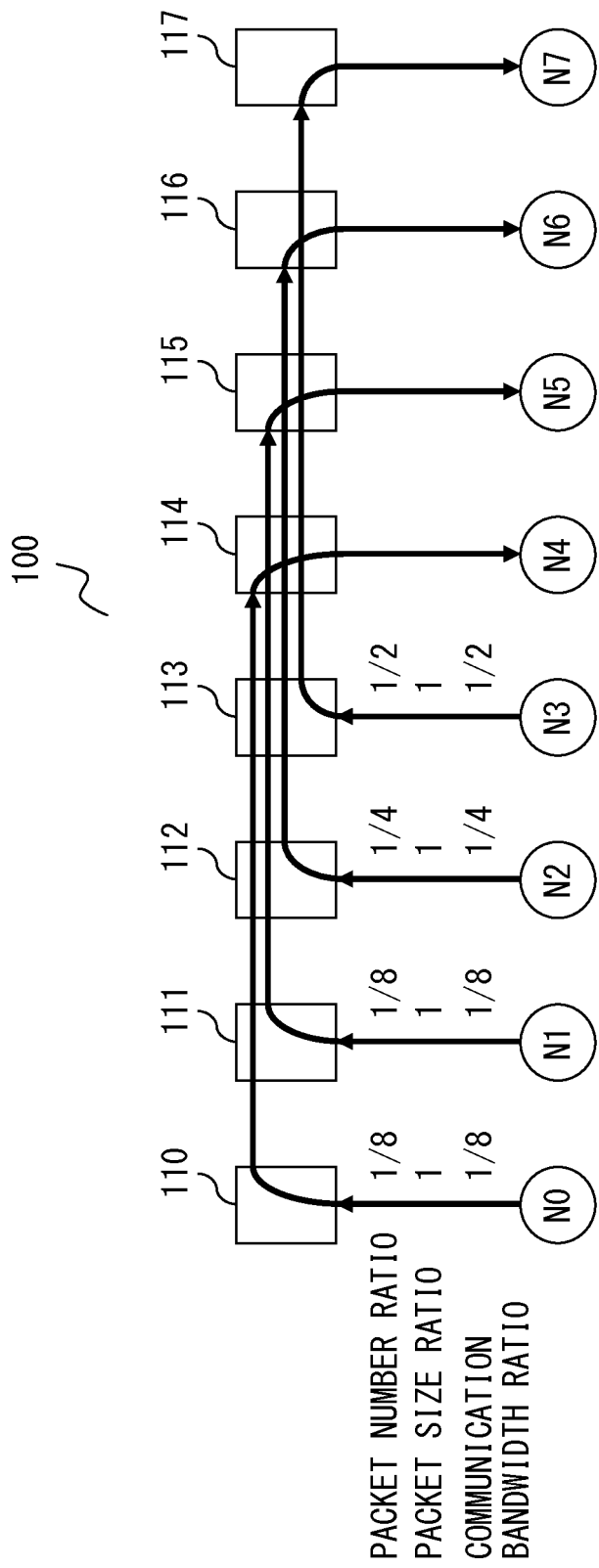

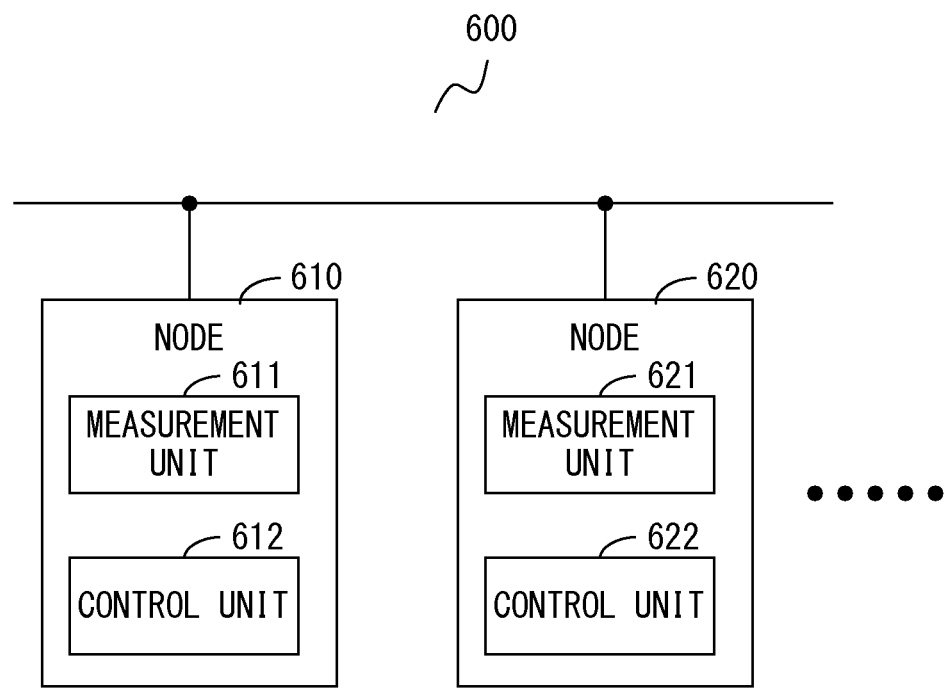
F I G. 6

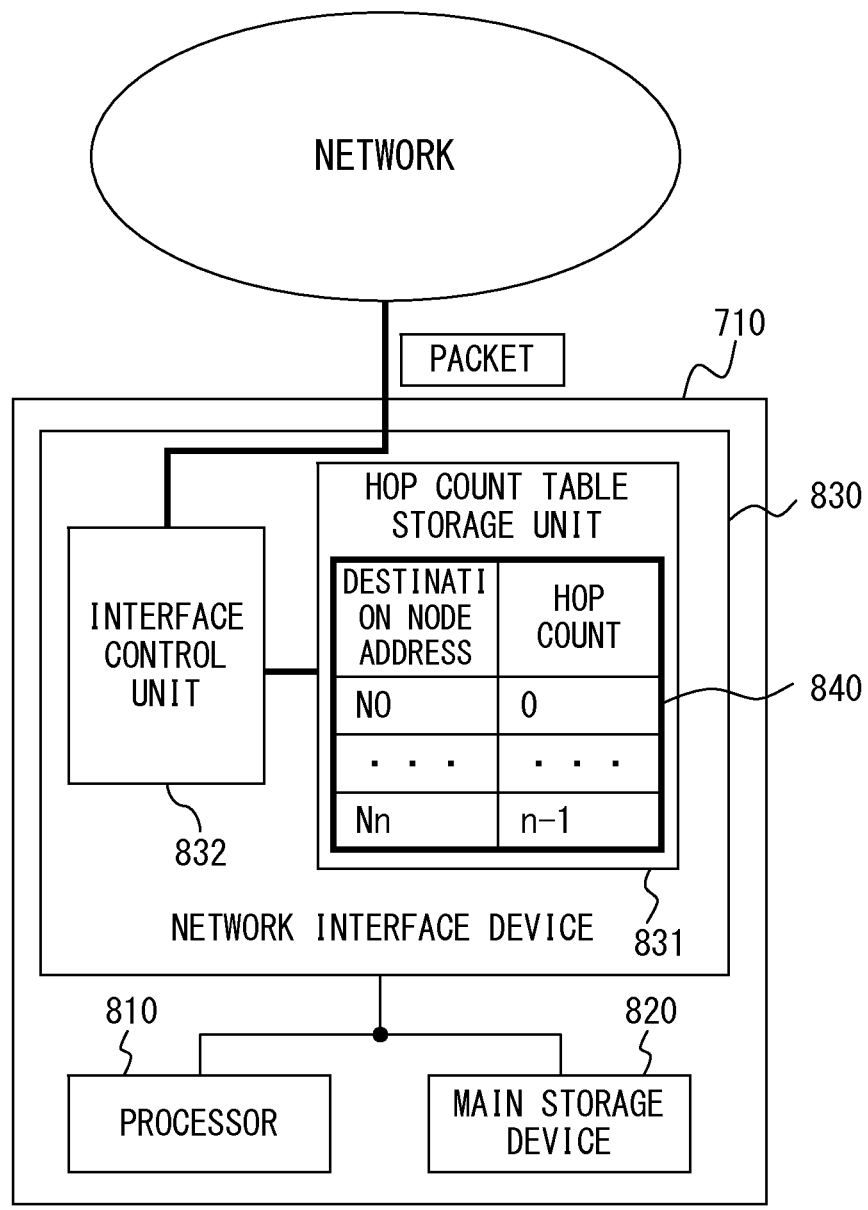
F I G. 8

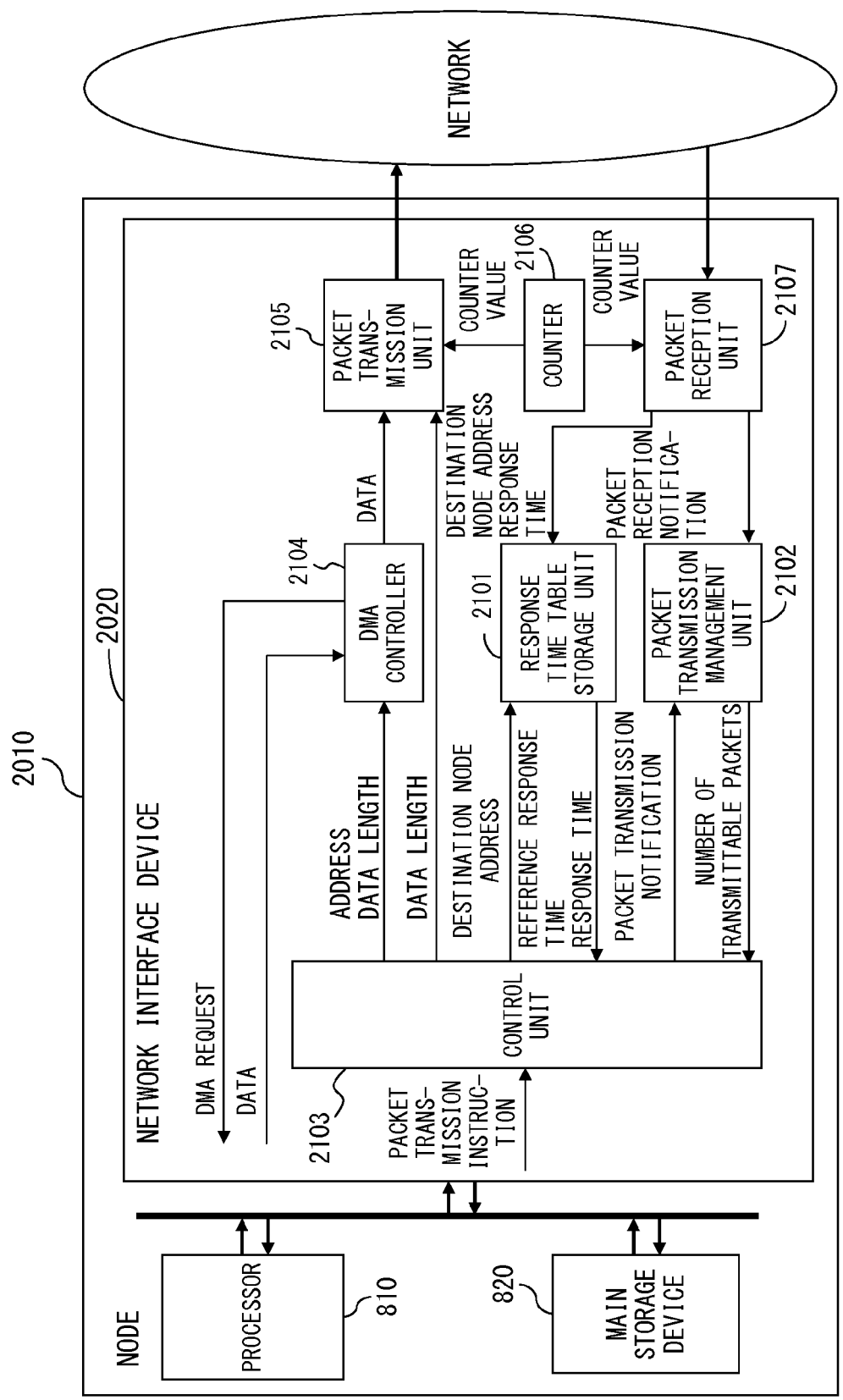
F I G. 21

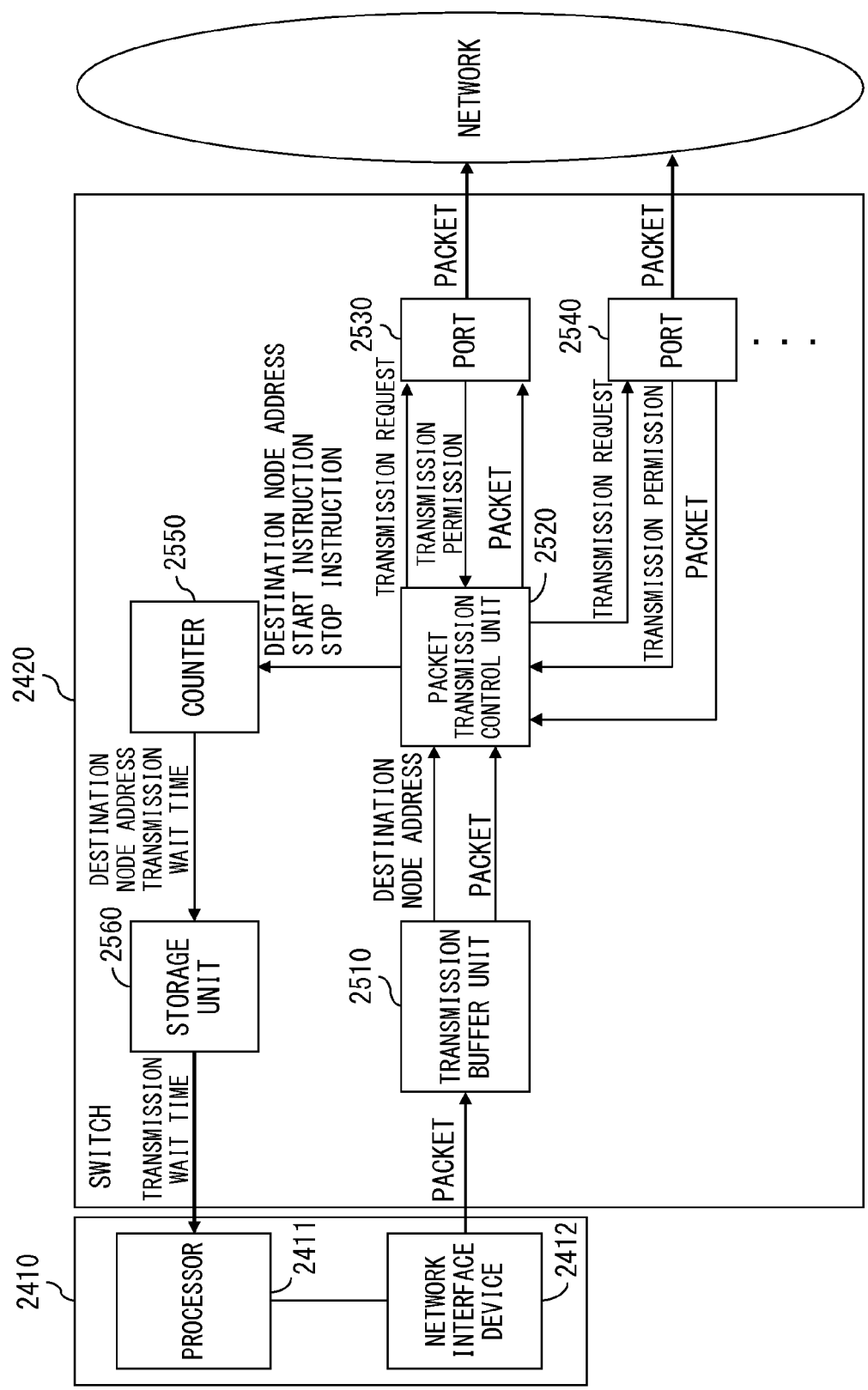
F I G. 25

2600

| COMMUNICATION PATTERN | DESTINATION NODE ADDRESS | TRANSMISSION WAIT TIME | |
|---|---|---|---|
| Allgather | n00 | p00 | t00 |
| | | p01 | t01 |
| | | ...... | ...... |
| | n01 | p00 | t00 |
| | | p01 | t01 |
| | | ...... | ...... |
| ...... | ...... | ...... | ...... |
| AlltoAll | ...... | ...... | ...... |
| ...... | ...... | ...... | ...... |

F I G. 2 6

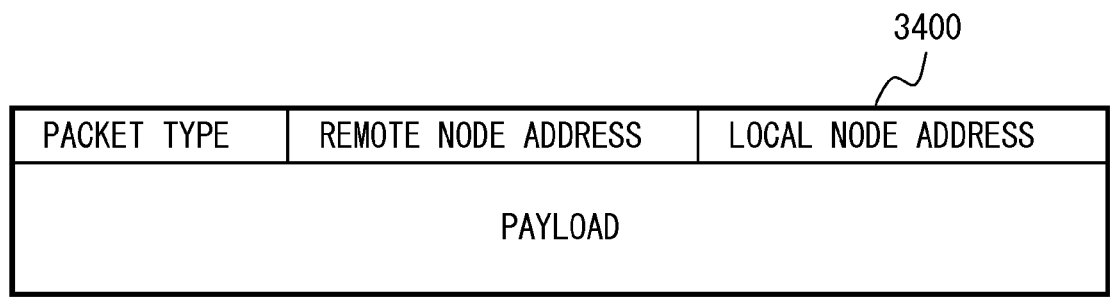
F I G. 3 4

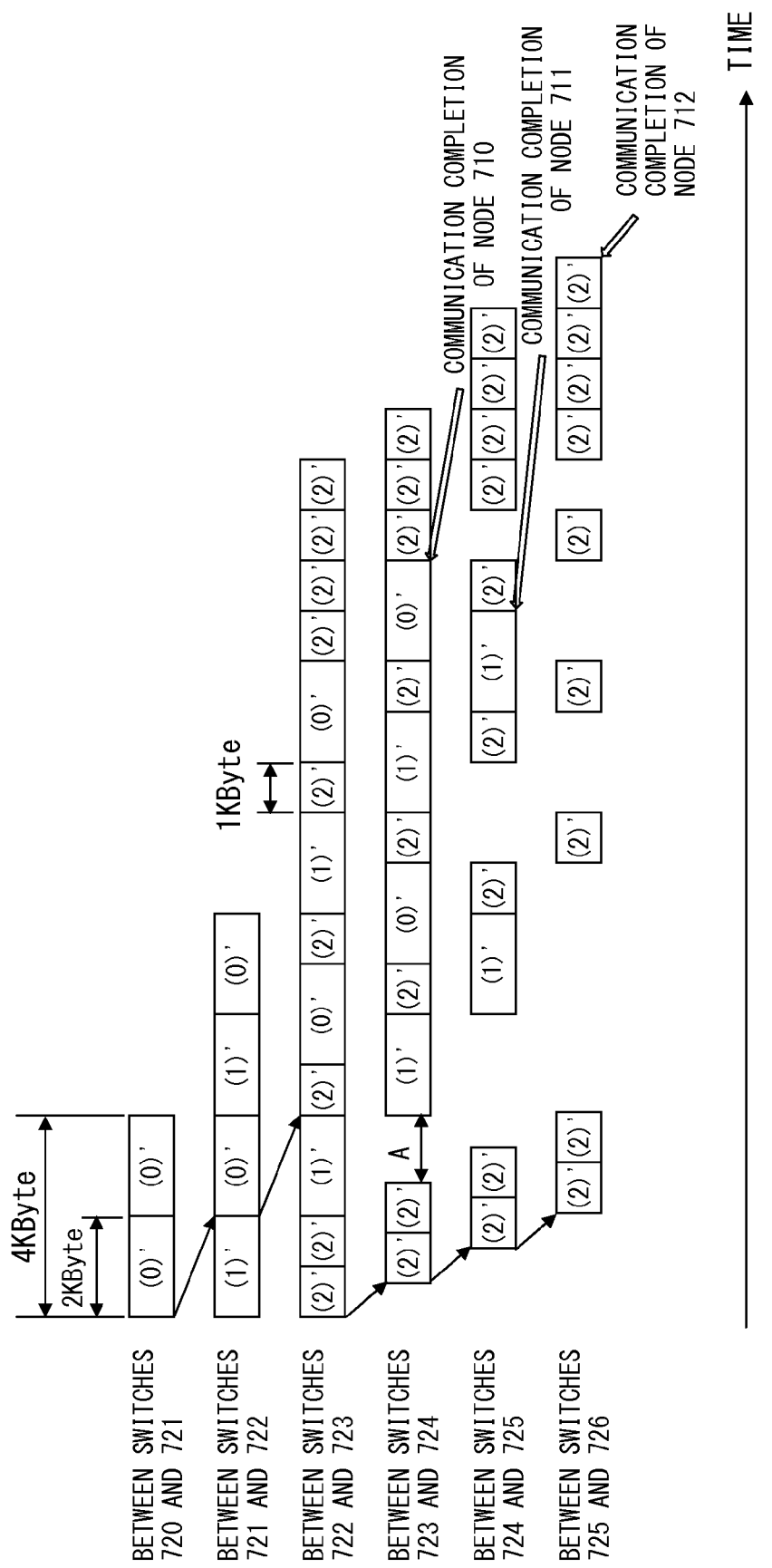
F I G. 45

PARALLEL COMPUTING DEVICE, COMMUNICATION CONTROL DEVICE, AND COMMUNICATION CONTROL METHOD

CROSS-REFERENCE TO RELATED APPLICATION

This application is a continuation application of International Application PCT/JP2011/056836 filed on Mar. 22, 2011 and designated the U.S., the entire contents of which are incorporated herein by reference.

FIELD

The embodiments discussed herein are related to a parallel computing device, a communication control device, and a communication control method.

BACKGROUND

A parallel computing device including a plurality of nodes for executing an arithmetic process is conventionally known. The nodes included in the parallel computing device are interconnected via a network including a plurality of communication appliances, such as switches or the like, and mutually perform a data communication.

FIG. 1 illustrates a configuration example of a parallel computing device 100. The parallel computing device 100 illustrated in FIG. 1 includes nodes N0-N7 for respectively performing a calculation, and switches 110-117 for transferring received data to a node at a specified destination. The switches 110-117 configure a one-dimensional mesh type network where the switches are linearly arranged.

Upon receipt of a packet via an input port to which a node or another switch is connected, a switch decides an output port to output the packet according to a destination of the received packet. Then, the switch outputs the packet to the decided output port.

When a switch receives a plurality of packets to be output to the same output port, the switch performs arbitration such that the numbers of packets to be respectively output from input ports to the output port become equal. Then, the switch transmits the packets via the output port according to a result of the arbitration.

Related to the above described technique, a wireless multi-hop network including a transmitting node for deciding a packet size according to the number of hops, which is the number of transfers up to a destination, and for fragmenting data to be transmitted into packets of a smaller size, and a relay node for transmitting the packets with a priority control according to the number of hops is known. (For example, Japanese Laid-open Patent Publication No. 2003-273788)

Additionally, a wireless data communication method for performing an efficient communication in all cases by deciding a length of a next packet based on a length of a packet that has been communicated is known. (For example, Japanese Laid-open Patent Publication No. 2001-326648)

When a communication is performed and concentrates on some of the switches in the above described parallel computing device 100, a communication bandwidth of a node having a larger number of hops up to a switch on which the communication concentrates becomes narrower. In this case, an arrival of data transmitted from a node having a large number of hops to a destination node is later than that of data transmitted from a node having a small number of hops to the destination node.

FIG. 2 illustrates an example of a collective communication with which the nodes N0-N6 transmit data to the node N7. Each of switches performs arbitration for input packets so that the numbers of the packets that are respectively input to input ports and output to an output port become equal, namely, 1/2 respectively. Accordingly, the number of packets that are transmitted from the node N6 to the switch 116 and further transmitted from the switch 116 to the switch 117 results in 1/2 of the total number of packets that are transmitted from the switch 116 to the switch 117.

In FIG. 2, a ratio of the number of packets transmitted from an arbitrary node to the number of packets transmitted to the node N7, namely, the number of packets transmitted to the switch 117 is called "packet number ratio". In this case, a packet number ratio of the node N6 is 1/2.

Additionally, the number of packets that are transmitted from the switch 115 to the switch 116 and further transmitted from the switch 116 to the switch 117 results in 1/2 of the total number of packets transmitted from the switch 116 to the switch 117. Moreover, the number of packets that are transmitted from the node N5 to the switch 115 and further transmitted from the switch 115 to the switch 116 results in 1/2 of the total number of packets transmitted from the switch 115 to the switch 116. Accordingly, a packet number ratio of the node N5 is 1/4.

Similarly, packet number ratios of the nodes N4, N3, N2, and N1 are 1/8, 1/16, 1/32, and 1/64, respectively. Moreover, the switch 110 transmits, to the switch 111, only packets transmitted from the node N0. Therefore, a packet number ratio of the node N0 is 1/64 as well as the node N1.

Here, a ratio of a size of packets transmitted from each of the nodes, which is a source of a collective communication, is referred to as a "packet size ratio". In the collective communication illustrated in FIG. 2, all the nodes output packets of the same size. Therefore, the packet size ratio of the nodes N6, N5, N4, N3, N2, N1, and N0 is 1:1:1:1:1:1:1.

Additionally, a ratio of a communication bandwidth that each of the source nodes uses to transmit packets to the entire communication bandwidth is referred to as a "communication bandwidth ratio". When all the nodes output packets of the same size, packet number ratios of the nodes result in communication bandwidth ratios unchanged. Therefore, the communication bandwidth ratios of the nodes N6, N5, N4, N3, N2, N1, and N0 are respectively 1/2, 1/4, 1/8, 1/16, 1/32, 1/64, and 1/64 when the entire communication bandwidth is assumed to be 1.

In the example of the collective communication illustrated in FIG. 2, the communication bandwidths of the nodes N0 and N1 far from the destination node N7 become significantly narrow. The collective communication is not complete if the communication of all the nodes is incomplete. Accordingly, an arrival of data transmitted from the node N0 or N1 to the destination node N7 is later than that of data transmitted from the node N6, which is close to the destination node N7, to the destination node N7. In this case, the communication bandwidths of the nodes N0 and N1 far from the destination node N7 cause a bottleneck. Namely, an arrival of data transmitted from a node having a large number of hops to the destination node is delayed.

Additionally, even when a communication concentrates on some of the switches in the communication other than a collective communication, a communication bandwidth of a node having a large number of hops, which is the number of transfers up to a switch on which the communication concentrates, becomes significantly narrow.

FIG. 3 illustrates an example of a case where communication bandwidths of some of the nodes become significantly narrow in a communication other than a collective communication. FIG. 3 illustrates the case where the nodes N0, N1, N2, and N3 perform a communication with each corresponding node separate by four hops at the same time. For ease of understanding of communication paths, the communication paths among the nodes are represented with solid lines marked with arrows. However, a configuration of the parallel computing device 100 is substantially the same as that of FIG. 1.

The number of packets that are transmitted from the node N3 to the switch 113 and further transmitted from the switch 113 to the switch 114 results in 1/2 of the total number of packets output from the switch 113 to the switch 114.

In FIG. 3, a ratio of the number of packets transmitted from an arbitrary node to the number of packets transmitted to the switch 113 is called "packet number ratio". In this case, the packet number ratio of the node N3 is 1/2.

Additionally, the number of packets that are transmitted from the switch 112 to the switch 113 and further transmitted from the switch 113 to the switch 114 results in 1/2 of the number of packets transmitted from the switch 113 to the switch 114. Moreover, the number of packets that are transmitted from the node N2 to the switch 112 and further transmitted from the switch 112 to the switch 113 results in 1/2 of the number of packets transmitted from the switch 112 to the switch 113. Accordingly, a packet number ratio of the node N2 is 1/4.

Similarly, a packet number ratio of the node N1 is 1/8. Moreover, the switch 110 transmits, to the switch 111, only packets transmitted from the node N0. Therefore, a packet number ratio of the node N0 results in 1/8 as well as the node N1.

When the nodes N0 to N3 output packets of the same size, the packet size ratio of the nodes N0, N1, N2, and N3 is 1:1:1:1. In this case, the packet number ratios result in communication bandwidth ratios unchanged. Therefore, the communication bandwidth ratios of the node N0, N1, N2, and N3 are respectively 1/2, 1/4, 1/8, and 1/8 when the entire communication bandwidth is assumed to be 1.

In the example of the communication illustrated in FIG. 3, the communication bandwidths of the nodes N0 and N1 become much narrower than those of the other nodes. In this case, the communication of the other nodes that execute a process depending on, for example, whether the communication of the node N0 or N1 is complete is not complete if the communication of the node N0 or N1, which is a node having a large number of hops up to the switch 114 on which the communications concentrates, is incomplete. Accordingly, the communication bandwidths of the nodes N0 and N1 cause a bottleneck.

FIGS. 1-3 have referred to the case of the one-dimensional mesh type network where the switches are linearly arranged. A similar problem occurs also in a multi-dimensional mesh type network. Moreover, the above described problem occurs in a case where the parallel computing device 100 has a network form other than a mesh type network.

FIG. 4 illustrates a configuration example of a parallel computing device 400 having a network form of a torus type. The parallel computing device 400 illustrated in FIG. 4 includes the nodes N0-N7 for performing a calculation, and switches 410-417 for transferring received data to a specified destination. The switches 410-417 configure a torus type network in the shape of a ring.

In FIG. 4, the node N4 performs a communication with the node N7 via a path including the switches 414, 415, 416, and 417. The node N5 performs a communication with the node N7 via a path including the switches 415, 416, and 417. The node N6 performs a communication with the node N7 via a path including the switches 416 and 417. Moreover, the node N3 performs a communication with the node N7 via a path including the switches 413, 412, 411, 410, and 417. The node N2 performs a communication with the node N7 via a path including the switches 412, 411, 410, and 417. The node N1 performs a communication with the node N7 via a path including the switches 411, 410, and 417. The node N0 performs a communication with the node N7 via a path including the switches 410 and 417.

The number of packets that are transmitted from the switch 416 to the switch 417 and further transmitted from the switch 417 to the node N7 results in 1/2 of the number of packets transmitted from the switch 417 to the node N7. Moreover, the number of packets that are transmitted from the node N6 to the switch 416 and further transmitted from the switch 416 to the switch 417 results in 1/2 of the number of packets transmitted from the switch 416 to the switch 417.

In FIG. 4, a ratio of the number of packets transmitted from an arbitrary node to the number of packets transmitted to the node N7 is called "packet number ratio". In this case, a packet number ratio of the node N6 is 1/4.

Additionally, the number of packets that are transmitted from the switch 415 to the switch 416 and further transmitted from the switch 416 to the switch 417 results in 1/2 of the number of packets transmitted from the switch 416 to the switch 417. Moreover, the number of packets that are transmitted from the node N5 to the switch 415 and further transmitted from the switch 415 to the switch 416 results in 1/2 of the number of packets transmitted from the switch 415 to the switch 416. In this case, a packet number ratio of the node N5 is 1/8.

The switch 414 outputs, to the switch 415, only packets input from the node N4. Therefore, a packet number ratio of the node N4 results in 1/8 as well as the node N5. Similarly, packet number ratios of the nodes N0, N1, N2, and N3 are 1/4, 1/8, 1/16, and 1/16, respectively.

When the nodes N0-N6 output packets of the same size, packet size ratio of the nodes N0-N6 is 1:1:1:1:1:1:1. In this case, the packet number ratios result in communication bandwidth ratios unchanged. Therefore, the communication bandwidth ratios of the nodes N0, N1, N2, N3, N4, N5, and N6 are 1/4, 1/8, 1/16, 1/16, 1/8, 1/8, and 1/4, respectively.

In the example of the collective communication illustrated in FIG. 4, the communication bandwidths of the nodes N2 and N3, which are nodes having a large number of hops up to the node N7, become much narrower than those of the other nodes. Therefore, the collective communication is not complete if the communication of all the nodes is incomplete. Therefore, the communication bandwidths of the nodes N2 and N3 cause a bottleneck. Namely, an arrival of data transmitted from a node having a large number of hops to a destination node is delayed.

FIG. 4 has referred to the case of the torus type network where the nodes are connected in the shape of a ring. However, a similar problem occurs also in a case of a multi-dimensional torus type network.

FIG. 5 illustrates a configuration example of a parallel computing device 500 in a case where a network form is of a fat-tree type. The parallel computing device 500 illustrated in FIG. 5 includes the nodes N0-N7 for performing a calculation, and switches 510 to 514 for transferring received data to a specified destination. The switches 510 to 514 are connected in the shape of a fat tree. Here, the fat-tree type is a connection form of a tree type where connections of switches are symmetrically branched from a higher-level switch to lower-level switches to which nodes are respectively connected.

FIG. 5 illustrates an example of a collective communication where the nodes N0-N6 transmit data to the node N7. The number of packets that are transmitted from the node N6 to the switch 514 and further transmitted from the switch 514 to the node N7 results in 1/2 of the number of packets transmitted from the switch 514 to the node N7.

In FIG. 5, a ratio of the number of packets transmitted from an arbitrary node to the number of packets transmitted to the node N7 is called "packet number ratio". In this case, a packet number ratio of the node N6 is 1/2.

The switch 510 transmits, to the switch 514, packets transmitted from the switches 511, 512, and 513. Accordingly, for example, the number of packets that are transmitted from the switch 513 to the switch 510 and further transmitted from the switch 510 to the switch 514 results in 1/3 of the total number of packets transmitted from the switch 510 to the switch 514.

Additionally, the switch 513 transmits packets transmitted from the nodes N4 and N5 to the switch 510. Accordingly, the number of packets that are transmitted from the node N4 to the switch 513 and further transmitted from the switch 513 to the switch 510 results in 1/2 of the total number of packets transmitted from the switch 513 to the switch 510. Similarly, the number of packets that are transmitted from the node N5 to the switch 513 and further transmitted from the switch 513 to the switch 510 results in 1/2 of the total number of packets transmitted from the switch 513 to the switch 510. Accordingly, packet number ratios of the nodes N4 and N5 are 1/12, respectively.

When the nodes N0-N6 output packets of the same size, packet size ratios of the nodes N0-N6 are 1, respectively. In this case, the packet number ratios result in communication bandwidth ratios unchanged. Therefore, the communication bandwidth ratios of the nodes N0, N1, N2, N3, N4, N5, and N6 are 1/12, 1/12, 1/12, 1/12, 1/12, 1/12, and 1/2, respectively.

In the example of the collective communication illustrated in FIG. 5, the communication bandwidths of the nodes N0-N5 become much narrower than that of the node N6. Accordingly, the communication bandwidths of the nodes N0-N5 cause a bottleneck. Therefore, an arrival of data transmitted from a node having a large number of hops to a destination node is delayed.

As described above, when a communication such as a collective communication concentrates on some of switches, a communication bandwidth of a node having a large number of hops up to a switch on which the communication concentrates becomes significantly narrow. Therefore, an arrival of data transmitted from a node having a large number of hops to a destination is delayed. Accordingly, arrival times of data transmitted to a destination node are not equalized depending on whether the number of hops is either large or small.

SUMMARY

According to an aspect of the invention, a parallel computing device includes a plurality of communicatively interconnected nodes for executing an arithmetic process. Each of the plurality of nodes includes: a measurement unit configured to measure a communication bandwidth up to a destination node based on a communication scheme among the nodes, and a control unit configured to control a size of a packet transmitted to the destination node according to the communication bandwidth measured by the measurement unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a case where communication bandwidths of some of the nodes become significantly narrow in a communication other than a collective communication in the parallel computing device illustrated in FIG. 1;

FIG. 6 schematically illustrates a parallel computing device 600;

FIG. 8 schematically illustrates a node included in the parallel computing device 700;

FIG. 21 illustrates a specific configuration example of the node illustrated in FIG. 20;

FIG. 25 illustrates a specific configuration example of the switch illustrated in FIG. 24;

FIG. 26 illustrates an example of a wait time table stored in a storage unit included in the switch illustrated in FIG. 25;

FIG. 34 illustrates an example of a packet used in an inter-node communication in the parallel computing device 600, 700, 2000, or 2400;

FIG. 45 is a time chart of packets that flow in the direction toward corresponding destination node among the switches when the nodes of the parallel computing device 700 illustrated in FIG. 42 respectively operate with Store-and-Forward scheme.

DESCRIPTION OF EMBODIMENTS

Figure 1:
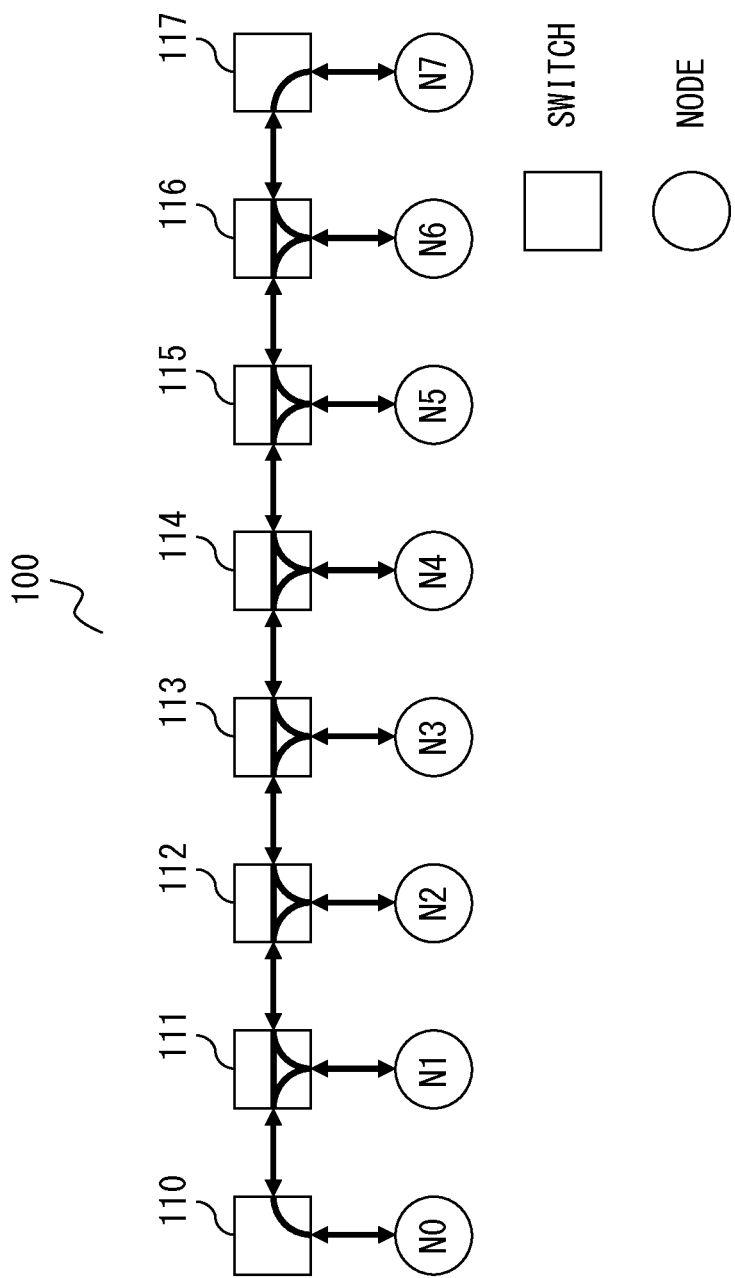
FIG. 1 illustrates a configuration example of a parallel computing device.
Figure 2:
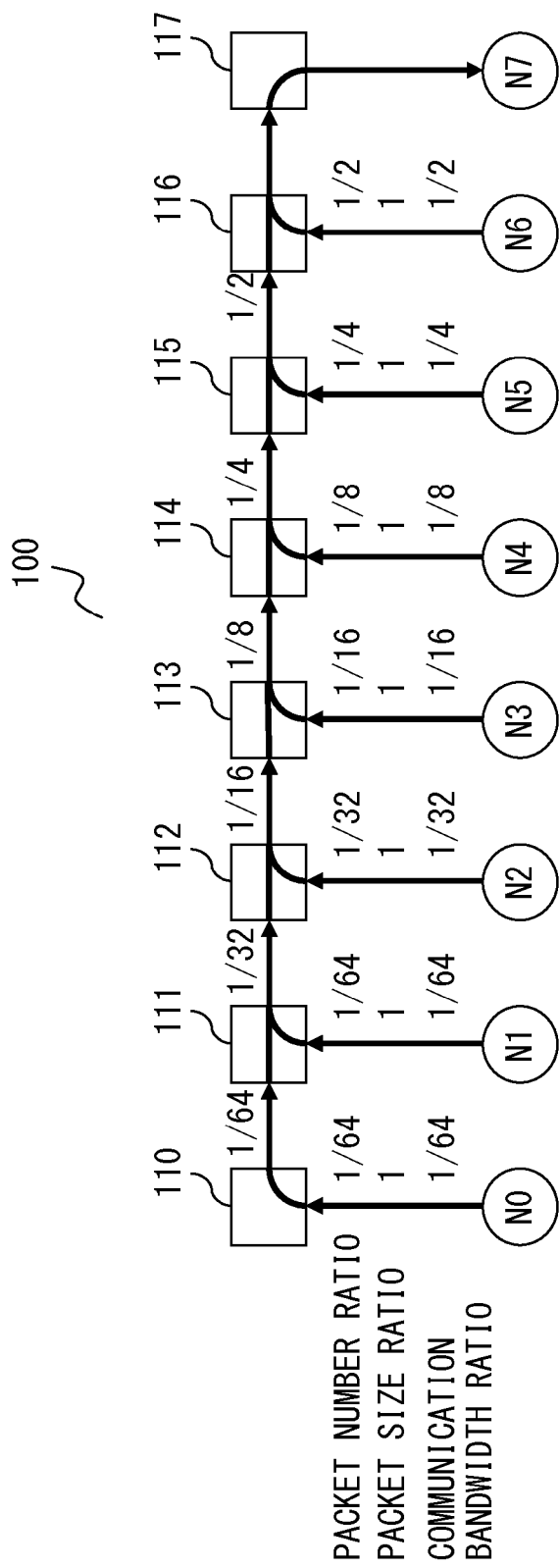
FIG. 2 illustrates an example of a collective communication with which nodes N0-N6 transmit data to a node N7 in the parallel computing device illustrated in FIG. 1.
Figure 4:
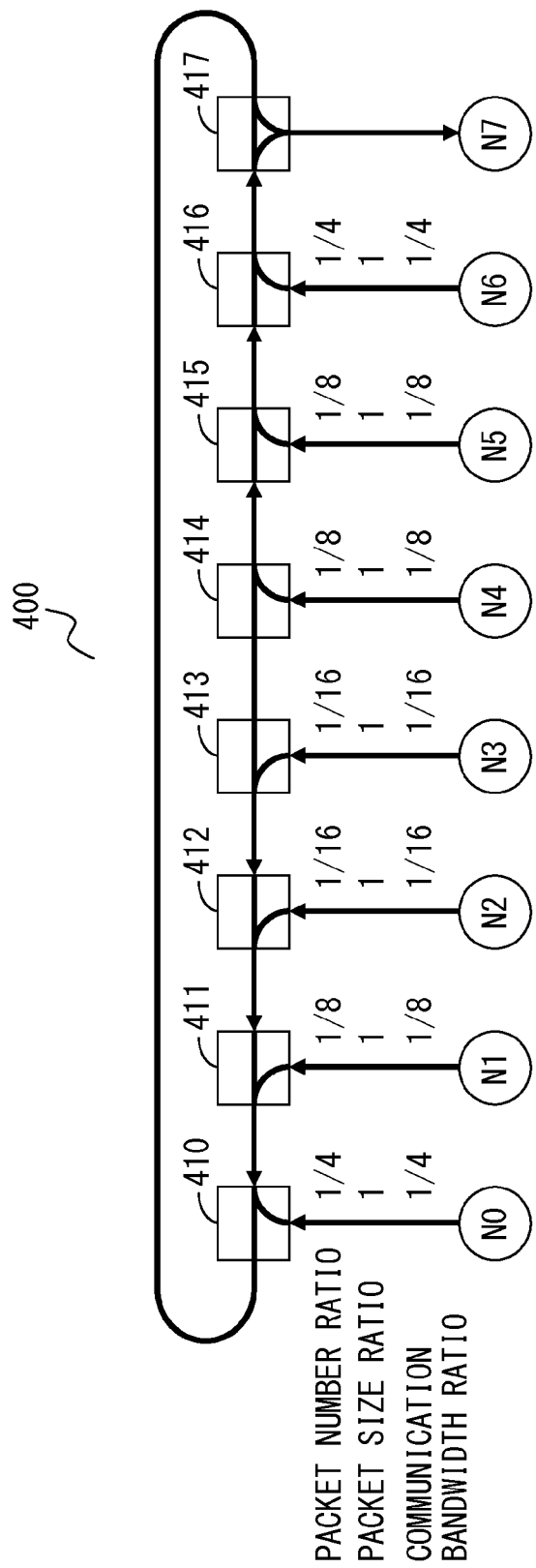
FIG. 4 illustrates a configuration example of a parallel computing device having a network form of a torus type.

Embodiments are described below with reference to FIGS. 6-45. The embodiments described below are merely examples, and not intended to preclude various modifications and technical applications, which are not explicitly recited below. Namely, the embodiments may be carried out by being variously modified, for example, by combining some of the embodiments within a scope that does not depart from the gist of the invention.

Embodiments

FIG. 6 schematically illustrates a parallel computing device 600 according to the embodiment. The parallel computing device 600 includes nodes 610, 620, .... The nodes are communicatively interconnected. Since the nodes 610, 620, ... have substantially the same configuration, the node 610 is described below as a representative.

The node 610 is an information processing device such as an arithmetic processing device or the like for performing an arbitrary arithmetic process. The node 610 includes components included in a general information processing device, such as a processor, a main storage device, and the like. The node 610 further includes measurement unit 611 and control unit 612.

The measurement unit 611 measures or counts the number of hops, which is the number of transfers of a transmitted packet between a local node and a destination node based on a communication condition between the local node and the destination node of a communication. The communication condition may include a condition of a network implemented by communicatively interconnecting the nodes 610, 620, ..., a communication distance or information indicating the communication distance between the local node and the destination node with which the local node performs a communication, such as the number of hops, which is the number of transfer units via which a transmitted packet passes from a source node to the destination node, and other information items. The transfer unit is a communication device, provided between nodes, such as a switch, a router, or the like, for transferring data or a packet in order to implement the network by communicatively interconnecting the nodes 610, 620, .... The transfer unit includes, for example, a plurality of input ports to which a packet is input, and an output port from which an input packet is output. Upon receipt of a plurality of packets to be output via the same output port, the transfer unit may perform arbitration such that the numbers of packets respectively guided from the input ports to the output port become equal. The transfer unit transmits the packets via the output port according to a result of the arbitration.

The control unit 612 controls a size of a packet used in a communication with the destination node so that an arrival time of a packet from the local node to the destination node and those of packets from the other nodes to the destination node are equalized according to a result of the measurement of the measurement unit 611. For example, if the number of hops, measured by the measurement unit 611, of a transmitted packet between the local node 610 and the destination node 620 is large, the control unit 612 increases the size of the packet transmitted to the destination node 620.

For example, the transfer unit performs arbitration such that the numbers of packets respectively guided from the input ports to the output port are equalized, and transfers the packets to the destination node. In this case, a ratio of the number of packets transferred from a node having a large number of hops to the destination node is lower than that of the number of packets transferred from a node having a small number of nodes to the destination node. Moreover, a ratio of a communication bandwidth available to the node having the large number of hops up to the destination node is narrower than that of a communication bandwidth available to the node having the small number of hops up to the destination node.

However, the nodes 610, 620, . . . control the size of a packet used in a communication for each destination node based on the number of hops, which is a communication distance to the destination node, as described above. For example, if the number of hops to the destination node is large, the nodes 610, 620, . . . increase the size of the packet transmitted to the destination node. As a result, it becomes possible to equalize a ratio of a communication bandwidth available to a node having a small number of hops and that of a communication bandwidth available to a node having a large number of hops. Consequently, the nodes 610, 620, . . . are enabled to perform an inter-node communication that equalizes an arrival time of a packet transmitted from the local node to the destination node and those of packets transmitted from the other nodes to the destination node.

Another Embodiment

Figure 7:
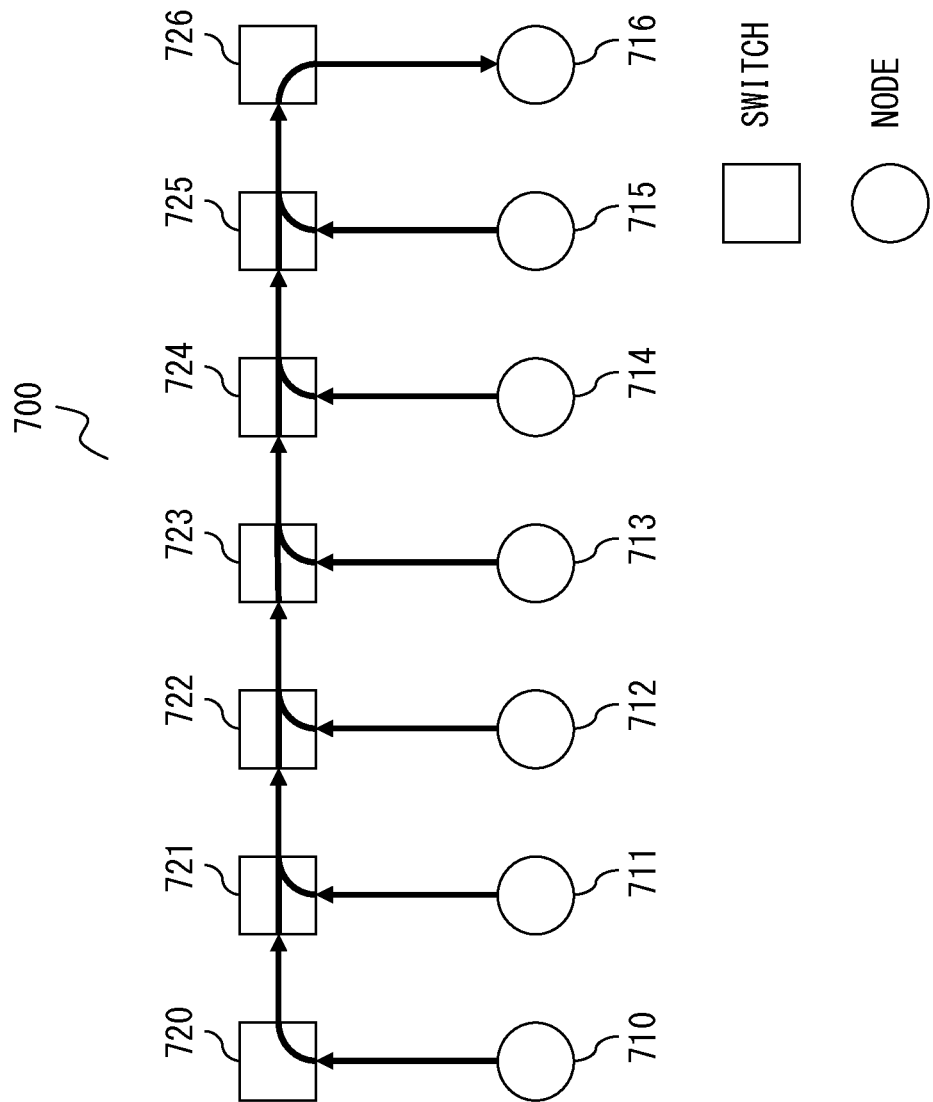
FIG. 7 illustrates a configuration example of a parallel computing device 700.

FIG. 7 illustrates a configuration example of a parallel computing device 700 according to this embodiment. The parallel computing device 700 includes nodes 710-716, and switches 720-726. The nodes 710-716 are communicatively interconnected via the switches 720-726. Part or the whole of the network including the nodes 710-716 and the switches 720-726 is referred to simply as a network.

Each of the nodes 710-716 is an arithmetic processing device including a processor for executing an arithmetic process, for example, according to a specified program, a main storage device for storing the specified program, and other components. Moreover, each of the nodes 710-716 includes a network interface device for performing a communication with another node via the network.

Each of the switches 720-726 is a communication device for transferring received data to a specified destination.

FIG. 7 illustrates the configuration example of the parallel computing device 700 including the seven nodes 710-716. However, this figure does not intend to limit the number of nodes. Additionally, FIG. 7 illustrates the parallel computing device 700 in a case where a network configuration is of a mesh type. However, the nodes and the switches according to this embodiment are applicable to a network configuration of a torus type or a fat-tree type.

FIG. 8 schematically illustrates the node included in the parallel computing device 700 according to this embodiment. Since all the nodes 710 to 716 have substantially the same configuration, FIG. 8 illustrates the node 710 as a representative of the nodes included in the parallel computing device 700.

The node 710 includes a processor 810, a main storage device 820, and a network interface device 830. The processor 810 is an arithmetic processing device for executing an arithmetic process according to a specified program. The main storage device 820 stores the program, and the like. The main storage device 820 may include a DMA (Direct Memory Access) circuit for implementing a DMA transfer intended to transfer data stored in the main storage device 820 to an interface control unit 832 not via the processor 810. The network interface device 830 provides an interface with which the node performs a communication with another node via the network.

The network interface device 830 includes a hop count table storage unit 831 and the interface control unit 832. The hop count table storage unit 831 includes a storage device for storing a hop count table 840 including, for each destination node, a destination to which the packet is transmitted, a destination node address for identifying a destination node, and the number of switches via which a packet passes up to the destination node. The number of switches via which a packet transmitted from a source node reaches a destination node is hereinafter referred to as a "hop count".

The interface control unit 832 transmits a packet including part or the whole of data designated by the processor 810 according to a protocol used in the network. At the time of this transmission, the interface control unit 832 obtains the hop count up to the destination node of the packet by referencing the hop count table 840 stored in the hop count table storage unit 831. If the interface control unit 832 determines that the number of hops up to the destination node is large, the interface control unit 832 increases the size of the packet transmitted to the destination node. Alternatively, if the interface control unit 832 determines that the number of hops up to the destination node is small, the interface control unit 832 reduces the size of the packet transmitted to the destination node. Additionally, the interface control unit 832 guides data received from the network to the processor 810.

Figure 9:
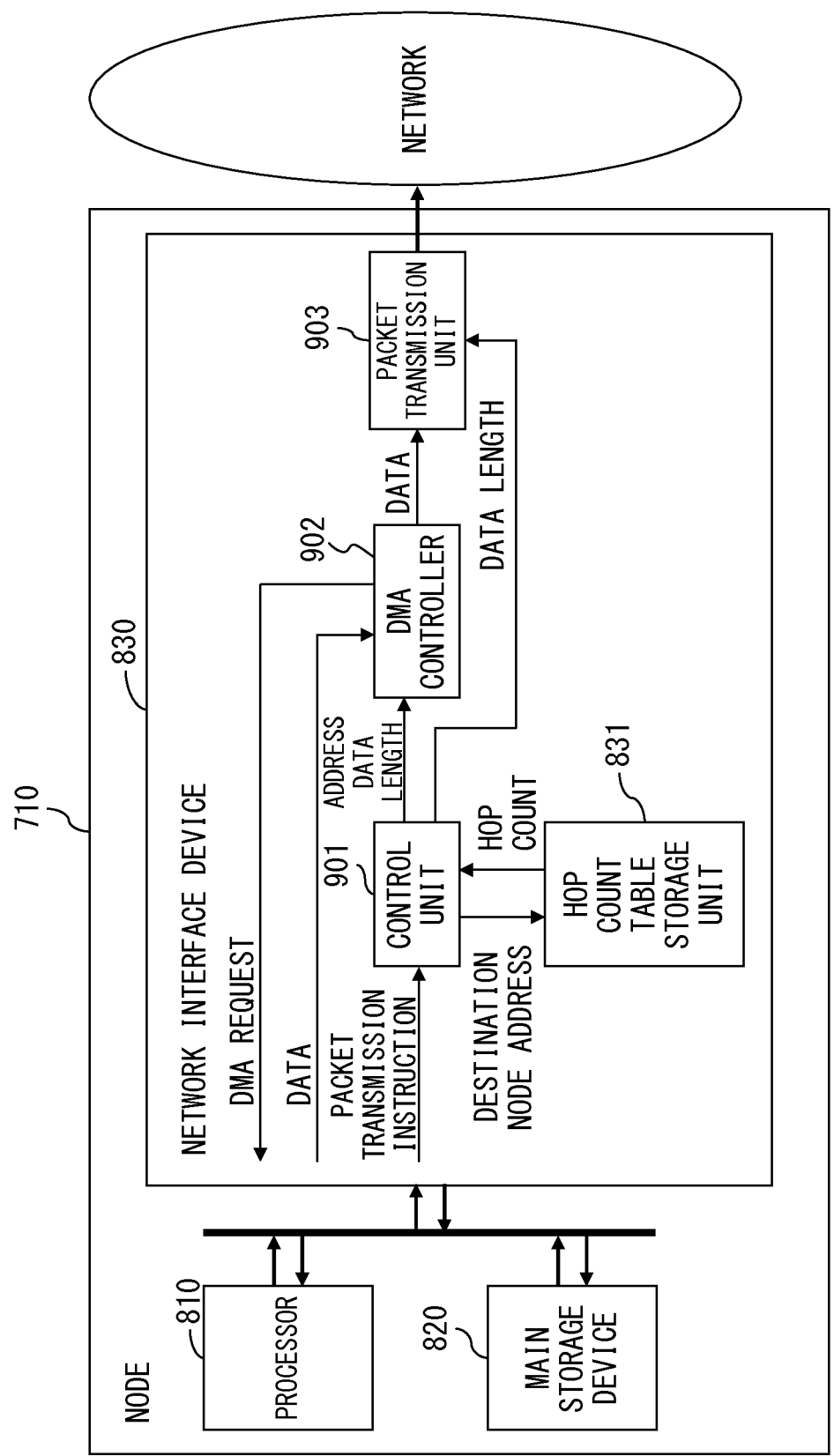
FIG. 9 illustrates a specific configuration example of the node illustrated in FIG. 8.

FIG. 9 illustrates a specific configuration example of the node 710 illustrated in FIG. 8. The node 710 includes the processor 810, the main storage device 820, and the network interface device 830 as illustrated in FIG. 8.

The network interface device 830 includes the hop count table storage unit 831, a control unit 901, a DMA controller 902, and a packet transmission unit 903. However, FIG. 9 does not intend that the network interface device 830 includes only the components illustrated in FIG. 9. The network interface device 830 may include a function such as a packet reception function or the like.

Upon receipt of a packet transmission instruction from the processor 810, the control unit 901 executes a packet transmission process by controlling the DMA controller 902 and the packet transmission unit 903. At this time, the control unit 901 designates a data length of data included in one packet for the DMA controller 902 and the packet transmission unit 903. Moreover, the control unit 901 measures a communication bandwidth of the local node based on the number of hops from the local node to a destination of the packet. According to the measurement, the control unit 901 may change the data length, designated for the DMA controller 902 and the packet transmission unit 903, of the packet transmitted to the destination node.

The control unit 901 may quantitatively obtain the data length of the packet transmitted to the destination node with a mathematical expression that represents a relationship between the measurement of the communication bandwidth of the local node based on the number of hops up to the destination of the packet and the data length decided according to the measurement.

When an address and the data length of data to be DMA-transferred are notified from the control unit 901, the DMA controller 902 issues a DMA request to the main storage device 820 by designating the address and the data length, which are notified from the control unit 901. Then, the main storage device 820 DMA-transfers the data stored at the designated address to the DMA controller 902 by the designated data length. The DMA controller 902 transmits, to the packet transmission unit 903, the data that is DMA-transferred from the main storage device 820.

The packet transmission unit 903 creates a packet including the data having the data length designated by the control unit 901 based on the data transferred from the DMA controller 902, and transmits the packet to the destination node.

Figure 10:
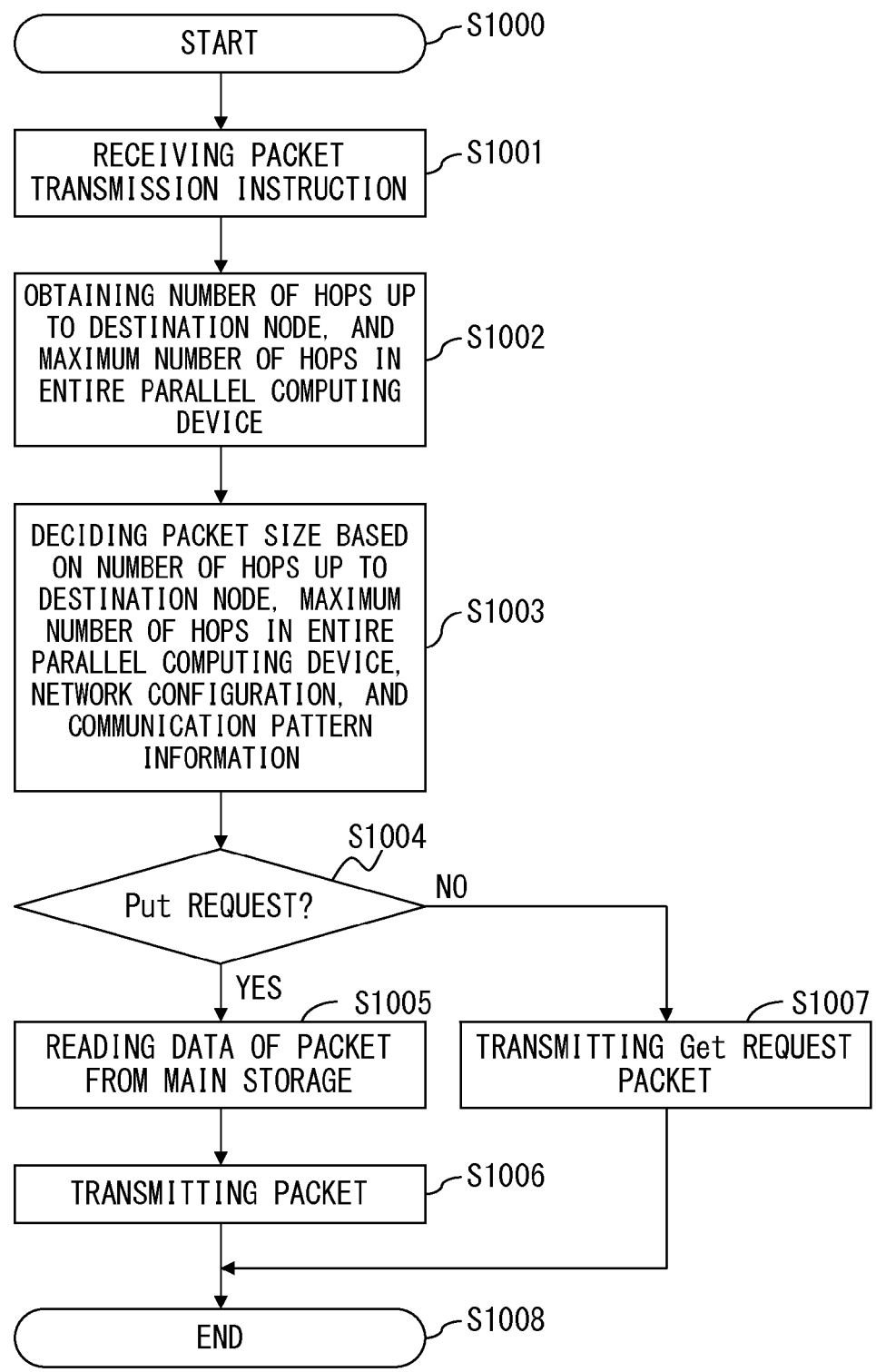
FIG. 10 is a flowchart illustrating a packet transmission process of the parallel computing device 700.

FIG. 10 is a flowchart illustrating the packet transmission process of the parallel computing device 700 according to this embodiment. After the process is started in step S1000 and the control unit 901 receives a packet transmission instruction from the processor 810 in step S1001, the control unit 901 obtains a destination node address, a network configuration, and communication pattern information, which are included in the packet transmission instruction.

The network configuration indicates a configuration of the network including the nodes 710-716 and the switches 720-726, which are included in the parallel computing device 700. Examples of the network configuration included in the packet transmission instruction include a mesh type for connecting nodes in the shape of a mesh, a torus type for connecting nodes in the shape of a ring, and a fat-tree type for connecting nodes so that connections among switches are symmetrically branched from a higher-level switch to lower-level switches to which the nodes are connected. The communication pattern information may include communication patterns to be described later with reference to FIG. 26.

In step S1002, the control unit 901 references the hop count table 840 stored in the hop count table storage unit 831. Then, the control unit 901 obtains, from the hop count table 840, the number of hops from the local node to the destination node obtained in step S1001, and a maximum number of hops in the entire parallel computing device 700.

In S1003, the control unit 901 decides the size of a packet transmitted to the destination node based on the network configuration and the communication pattern information, which are obtained in step S1001, and the number of hops from the local node to the destination node and the maximum number of hops in the entire parallel computing device 700, which are obtained in step S1002.

If the packet transmission instruction from the processor 810 is issued as a Put request ("YES" in step S1004), the process of the control unit 901 moves to step S1005. In this case, the control unit 901 reads data designated by the processor 810 according to the decided packet size from the main storage device 820 (step S1005). Here, the Put request is a request by which a communicating node designates an area of a main storage device of the local node and that of a main storage device of a destination node, and writes data stored in the area of the main storage device of the local node to that of the main storage device of the destination node. As a specific process of the Put request, for example, the following process is executed.

The DMA controller 902 issues a DMA request by designating an address, which is designated by the control unit 901 according to the packet transmission instruction and at which data to be transmitted is stored, and the data length of data to be included in a packet. Then, the main storage device 820 DMA-transfers the data stored at the designated address to the DMA controller 902 by the designated data length. The DMA controller 902 transmits the transferred data to the packet transmission unit 903. As the data length, a value obtained by excluding a header length in the packet from the packet size decided in step S1003 is available.

In S1006, upon receipt of the data from the DMA controller 902, the packet transmission unit 903 creates a packet including the data having the data length designated by the control unit 901. Then, the packet transmission unit 903 transmits the created packet to the destination node.

In the meantime, if the packet transmission instruction from the processor 810 is issued as a Get request ("NO" in step S1004), the process of the control unit 901 moves to step S1007. In this case, the packet transmission unit 903 creates a Get request packet for designating the packet size decided in step S1003, and transmits the created packet to the destination node (step S1007). Here, the Get request is a request by which a communicating node designates an area of a main storage device of the local node and that of a main storage device of a destination node, and reads data stored in the area of the main storage device of the destination node into that of the main storage device of the local node. Upon termination of the above described process, the control unit 901 ends the packet transmission process (step S1008).

Figure 11:
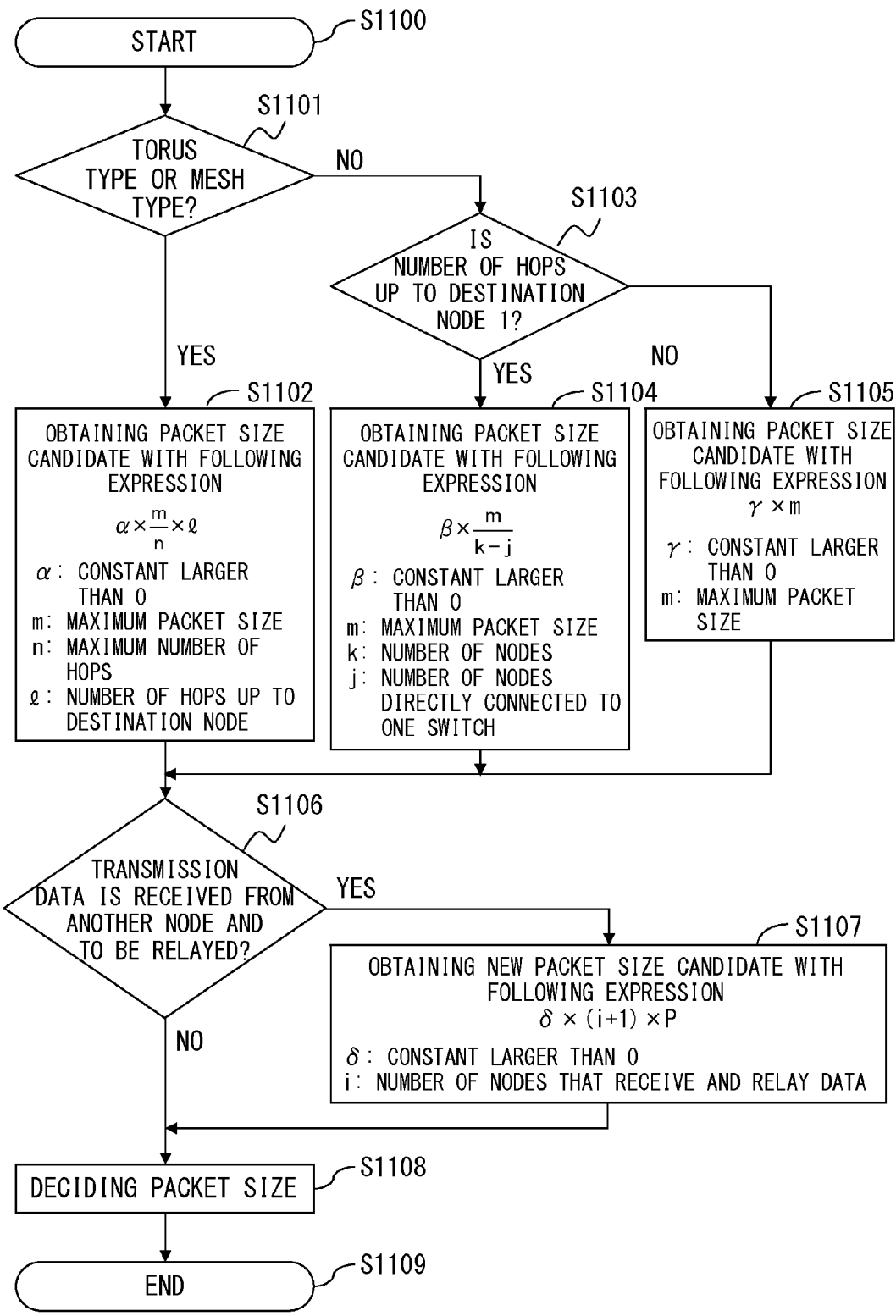
FIG. 11 is a flowchart illustrating a specific process of step S1003 illustrated in FIG. 10.

FIG. 11 is a flowchart illustrating details of the packet size decision process (step S1003) according to this embodiment. If the network configuration obtained in step S1001 is of a torus type or a mesh type ("YES" in step S1101), the process of the control unit 901 moves to step S1102. In this case, the control unit 901 calculates a packet size candidate with the following expression (step S1102).

$$\alpha \times (m/n) \times 1 \quad (1)$$

where $\alpha$ is a constant, which is larger than 0, for adjusting a packet size, m is a maximum packet size, n is a maximum number of hops, and 1 is the number of hops up to a destination node.

Alternatively, if the network configuration obtained in step S1001 is of a fat-tree type ("NO" in step S1101), the process of the control unit 901 moves to step S1103. In this case, the control unit 901 determines whether or not the number of hops up to the destination node is 1 (step S1103).

If the number of hops up to the destination node is 1 ("YES" in step S1103), the process of the control unit 901 moves to step S1104. In this case, the control unit 901 calculates a packet size candidate with the following expression (step S1104).

$$\beta \times m/(k-j) \quad (2)$$

where $\beta$ is a constant, which is larger than 0, for adjusting a packet transmission interval, j is the number of nodes directly connected to one switch, and k is a total number of nodes.

Alternatively, if the number of hops up to the destination node is not 1 in step S1103 ("NO" in step S1103), the process of the control unit 901 moves to step S1105. In this case, the control unit 901 calculates a packet size candidate with the following expression (step S1105).

$$\gamma \times m \quad (3)$$

where $\gamma$ is a constant, which is larger than 0, for adjusting a packet size.

After the control unit 901 calculates the packet size candidate with the above described process, the process of the control unit 901 moves to step S1106.

If transmission data is data that is received from another node and to be relayed ("YES" in step S1106), the process of the control unit 901 moves to step S1107. In this case, the control unit 901 calculates a new packet size candidate with the following expression (step S1107).

$$\delta \times (i+1) \times P \quad (4)$$

where $\delta$ is a constant, which is larger than 0, for adjusting a packet size, i is the number of nodes that receive and relay data, P is the packet size candidate calculated in step S1102, S1104, or S1105.

After the control unit 901 calculates the new packet size candidate with the expression (4), the process of the control unit 901 moves to step S1108. Alternatively, if the transmission data is not the data that is received from another node and to be relayed in step S1006 ("NO" in step S1106), the process of the control unit 901 also moves to step S1108.

If the packet size candidate obtained in step S1102, S1104, S1105, or S1108 is equal to or larger than an available maximum value of the packet size in step S1108, the control unit 901 decides the available maximum value is the packet size. Alternatively, if the packet size candidate obtained in step S1102, S1104, S1105, or S1107 is equal to or smaller than an available minimum value of the packet size, the control unit 901 decides the available minimum value is the packet size. Further alternatively, if the packet size candidate obtained in step S1102, S1104, S1105, or S1107 is larger than the available minimum value and smaller than the available maximum value, the control unit 901 decides calculated packet size candidate is the packet size.

Upon termination of the above described process, the control unit 901 ends the packet size decision process (step S1109).

Modification Example

Figure 12:
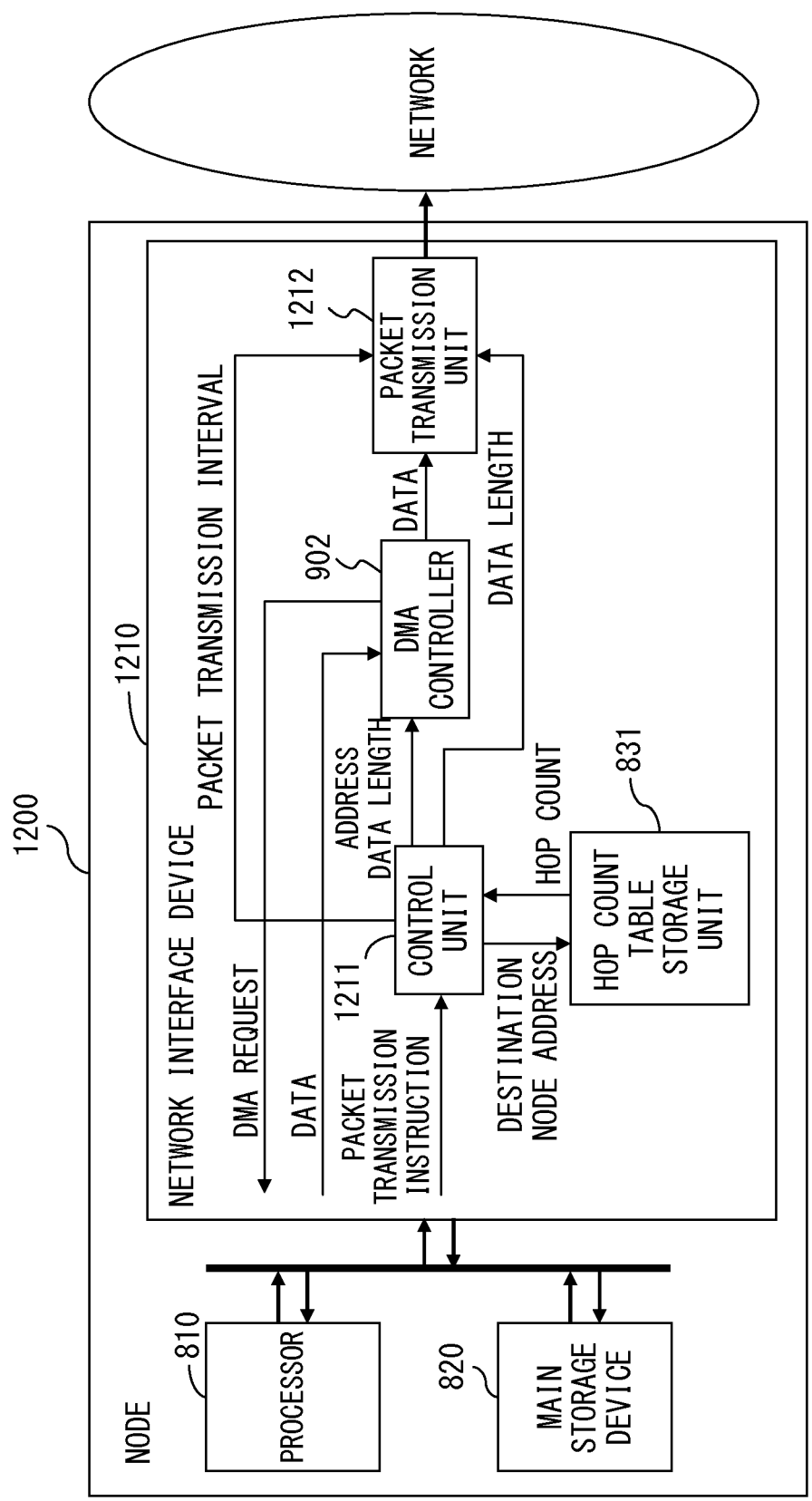
FIG. 12 illustrates a modification example of the node illustrated in FIG. 9.

FIG. 12 illustrates a modification example of the node 710 illustrated in FIG. 9. A node 1200 illustrated in FIG. 12 includes the processor 810, the main storage device 820, and a network interface device 1210.

The network interface device 1210 includes the hop count table storage unit 831, a control unit 1211, the DMA controller 902, and a packet transmission unit 1212. However, FIG. 12 does not intend that the network interface device 1210 includes only the components illustrated in FIG. 12. The network interface device 1210 may include a function such as a packet reception function or the like.

Upon receipt of a packet transmission instruction from the processor 810, the control unit 1211 executes a packet transmission process by controlling the DMA controller 902 and the packet transmission unit 1212. At this time, the control unit 1211 designates a packet transmission interval for the packet transmission unit 1212. Moreover, the control unit 1211 measures a communication bandwidth between the local node and a destination node based on the number of hops up to the destination of the packet. According to the measurement, the control unit 1211 may change the packet transmission interval designated for the packet transmission unit 1212.

The control unit 1211 may quantitatively obtain the packet transmission interval designated for the packet transmission unit 1212 with a mathematical expression that represents a relationship between the measurement of the communication bandwidth of the local node based on the number of hops up to the destination of the packet and the packet transmission interval decided according to the measurement.

The packet transmission unit 1212 creates a packet from data transferred from the DMA controller 902. Then, the packet transmission unit 1212 transmits the packet to the destination node at the packet transmission interval designated from the control unit 1211.

Figure 13:
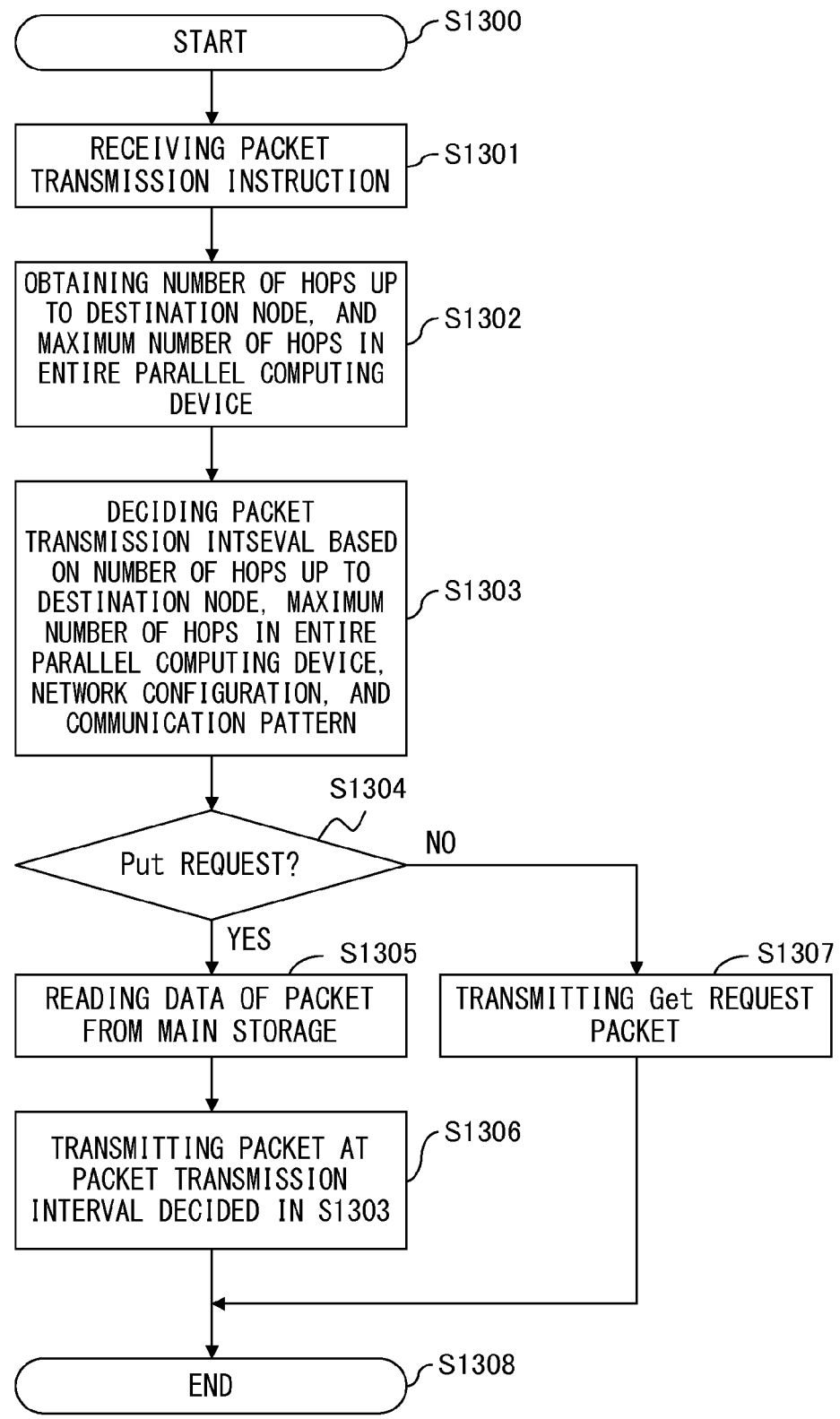
FIG. 13 is a flowchart illustrating a packet transmission process of the parallel computing device 700 employing the node described with reference to FIG. 12.

FIG. 13 is a flowchart illustrating the packet transmission process of the parallel computing device 700 employing the node 1200 described with reference to FIG. 12. Since a process of steps S1301 and S1302 is substantially the same as that of steps S1001 and S1002 illustrated FIG. 10, explanations of these steps are omitted.

In step S1303, the control unit 1211 decides a packet transmission interval based on a network configuration and communication pattern information, which are obtained in step S1301, and the number of hops up to a destination node and a maximum number of hops in the entire parallel computing device 700, which are obtained in step S1302.

If the packet transmission instruction from the processor 810 is issued as a Put request ("YES" in step S1304), the process of the control unit 1211 moves to step S1305. In this case, the control unit 1211 reads data designated by the processor 810 from the main storage device 820 (step S1305). Specifically, the following process is executed in step S1305.

The DMA controller 902 issues a DMA request to the main storage device 820 by designating an address at which data to be transmitted is stored, and a data length of data included in a packet, which are designated by the control unit 901 according to the packet transmission instruction. Then, the main storage device 820 DMA-transfers the data stored at the designated address to the DMA controller 902 by the designated data length. The DMA controller 902 transmits the transferred data to the packet transmission unit 1212. The packet transmission unit 1212 transmits the packet at the packet transmission interval decided in step S1303 (step S1306).

As the data length, a value obtained by excluding a header length included in the packet from a predetermined packet size, which is designated by the processor 810, is available.

Alternatively, if the packet transmission instruction from the processor 810 is issued as a Get request ("NO" in step S1304), the process of the control unit 1211 moves to step S1307. In this case, the packet transmission unit 1212 creates a Get request packet for designating a packet size, designated by the processor 810 along with the packet transmission instruction, including data having the designated data length. Then, the packet transmission unit 1212 transmits the created Get request packet to the destination node at the packet transmission interval decided in step S1303 (step S1307). Upon termination of the above described process, the control unit 1211 ends the packet transmission process (step S1308).

Figure 14:
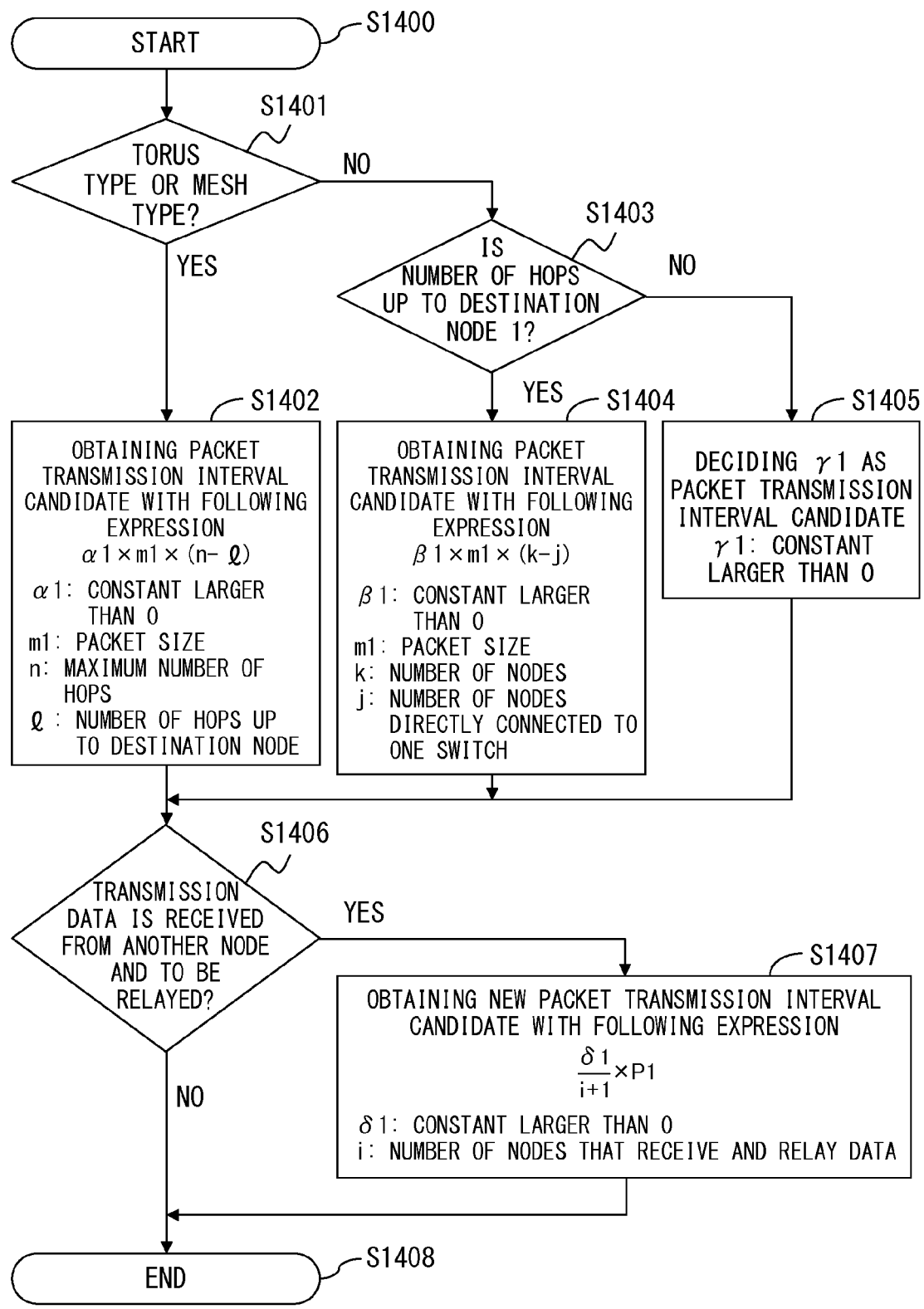
FIG. 14 is a flowchart illustrating a specific process of step S1303 illustrated in FIG. 13.

FIG. 14 is a flowchart illustrating details of the packet transmission interval decision process (step S1303) according to this embodiment. If the network configuration obtained in step S1301 is of a torus type or a mesh type ("YES" in step S1401), the process of the control unit 1211 moves to step S1402. In this case, the control unit 1211 calculates a packet transmission interval candidate with the following expression (step S1402).

$$\alpha 1 \times m 1 \times (n-1) \tag{5}$$

where $\alpha 1$ is a constant, which is larger than 0, for adjusting a packet transmission interval, m1 is a preset packet size, n is the maximum number of hops, and l is the number of hops up to a destination node.

Alternatively, if the network configuration obtained in step S1301 is of a fat-tree type ("NO" in step S1401), the process of the control unit 1211 moves to step S1403. In this case, the control unit 1211 determines whether or not the number of hops up to the destination node is 1 (step S1403).

If the number of hops up to the destination node is 1 ("YES" in step S1403), the process of the control unit 1211 moves to step S1404. In this case, the control unit 1211 calculates a packet transmission interval candidate with the following expression (step S1404).

$$\beta 1 \times m 1 \times (k-j) \tag{6}$$

where $\beta 1$ is a constant, which is larger than 0, for adjusting a packet transmission interval, j is the number of nodes directly connected to one switch, and k is a total number of nodes.

If the number of hops up to the destination node is not 1 in step S1403 ("NO" in step S1403), the process of the control unit 1211 moves to step S1405. In this case, the control unit 1211 decides the packet transmission interval candidate to be $\gamma 1$. Note that $\gamma 1$ is a constant, which is larger than 0, for adjusting a packet transmission interval, and defined to be a value smaller than a preset value used in a normal communication.

After the control unit 1211 obtains the packet transmission interval with the above described process, the process of the control unit 1211 moves to step S1406.

If transmission data is data that is received from a different node and to be relayed to the destination node in step S1406 ("YES" in step S1406), the process of the control unit 1211 moves to step S1407. In this case, the control unit 1211 calculates a new packet transmission interval candidate from the different node to the destination node with the following expression (step S1407).

$$\delta 1/(i+1) \times P1 \quad (7)$$

where $\delta 1$ is a constant, which is larger than 0, for adjusting a packet transmission interval, i is the number of nodes that receive and relay data, and P1 is the packet transmission interval candidate calculated in step S1402, S1404, or S1405.

After the control unit 1211 calculates the new packet transmission interval candidate with the expression (7), the process of the control unit 1211 moves to step S1408. Alternatively, if the transmission data is not the data that is received from the different node and to be relayed ("NO" in step S1406), the process of the control unit 1211 also moves to step S1408. Upon termination of the above described process, the control unit 1211 ends the packet transmission interval decision process (step S1408).

Further Modification Example

Figure 15:
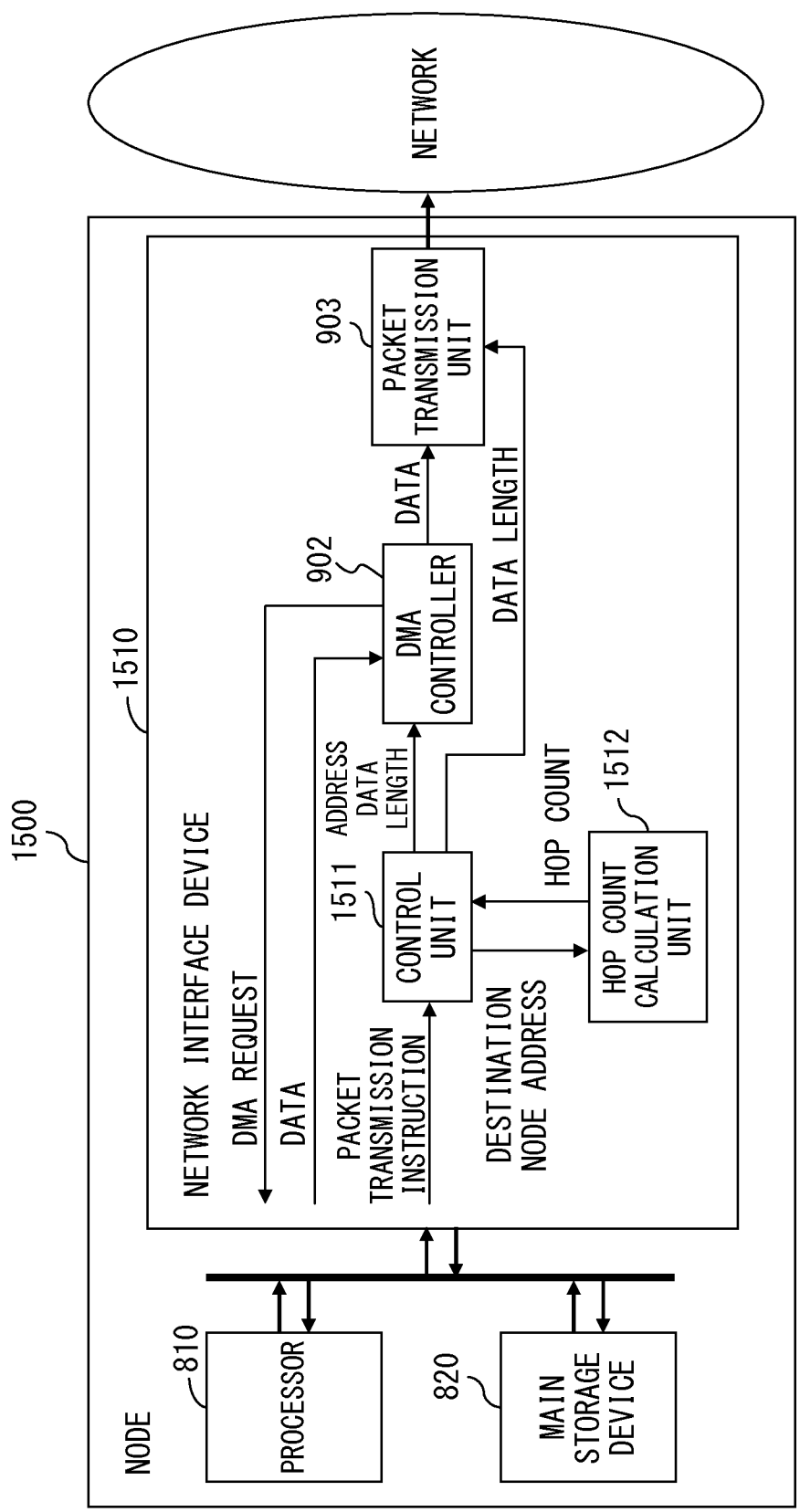
FIG. 15 illustrates another modification example of the node illustrated in FIG. 9.

FIG. 15 illustrates a further modification example of the node 710 illustrated in FIG. 9. A node 1500 in this modification example is available in a case where the network configuration is of a multi-dimensional mesh type or torus type. The following description refers to a case where the network configuration of the parallel computing device 700 is of a three-dimensional mesh type or torus type.

The node 1500 illustrated in FIG. 15 includes the processor 810, the main storage device 820, and a network interface device 1510. The network interface device 1510 includes a control unit 1511, a hop count calculation unit 1512, the DMA controller 902, and the packet transmission unit 903. However, FIG. 15 does not intend that the network interface device 1510 includes only the components illustrated in FIG. 15. The network interface device 1510 may include a function such as a packet reception function or the like.

Upon receipt of a packet transmission instruction from the processor 810, the control unit 1511 executes a packet transmission process by controlling the DMA controller 902 and the packet transmission unit 903. The control unit 1511 obtains the number of hops up to the destination of a packet from the hop count calculation unit 1512. At this time, the control unit 1511 designates a data length of data included in one packet for the DMA controller 902 and the packet transmission unit 903. Moreover, the control unit 1511 measures a communication bandwidth between the local node and the destination node based on the number of hops up to the destination of the packet. According to the measurement, the control unit 1511 may change the data length of the packet, which is designated for the DMA controller 902 and the packet transmission unit 903 and to be transmitted to the destination node.

The control unit 1511 may quantitatively obtain the data length of the packet transmitted to the destination node with a mathematical expression that represents a relationship between the measurement of the communication bandwidth of the local node based on the number of hops up to the destination of the packet and the data length decided according to the measurement.

Upon receipt of a notification of a destination node address from the control unit 1511, the hop count calculation unit 1512 calculates the number of hops based on the destination node address, a local node address, and the network configuration. The hop count calculation unit 1512 notifies the control unit 1511 of the calculated number of hops.

Figure 16:
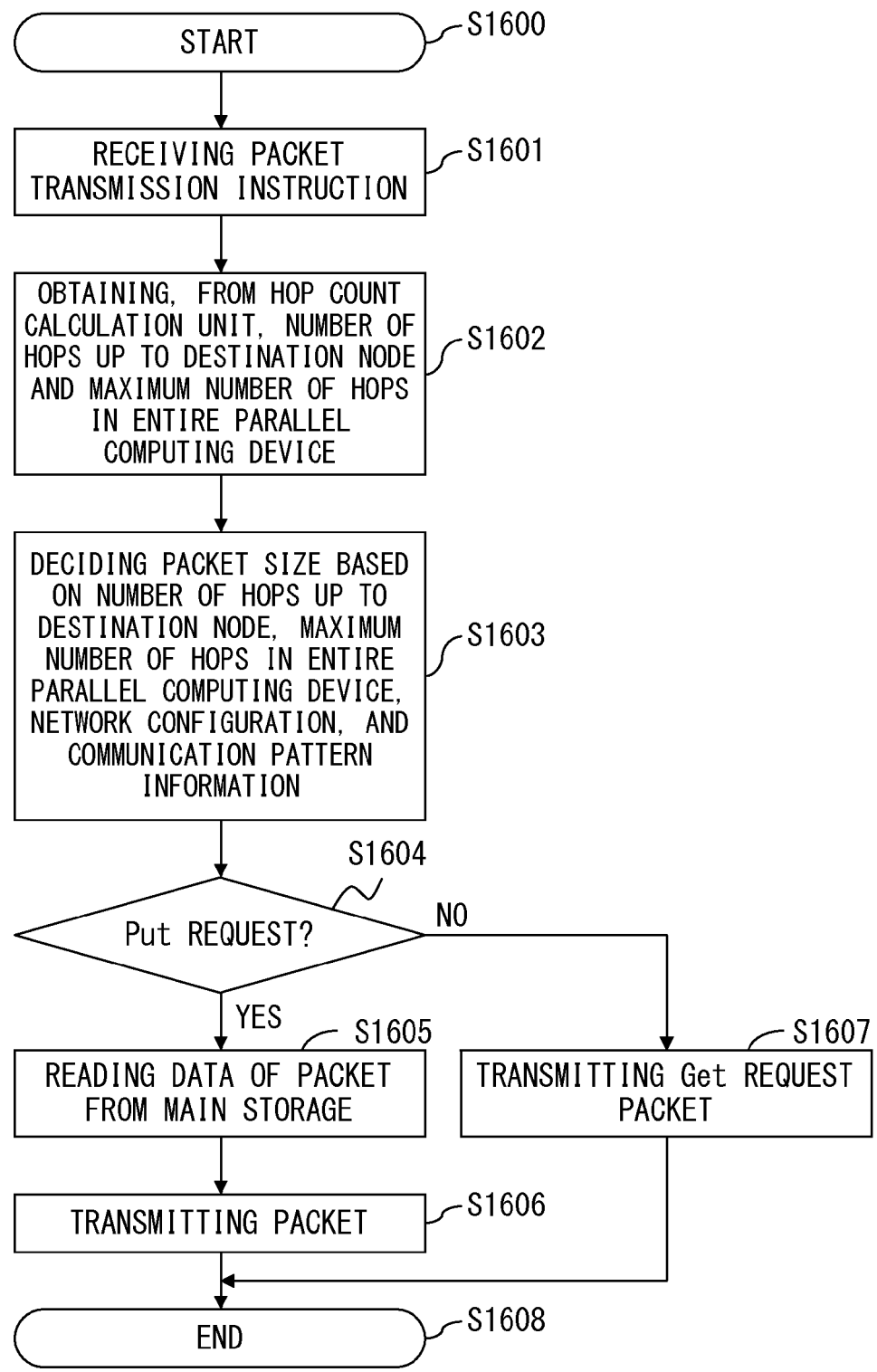
FIG. 16 is a flowchart illustrating a packet transmission process of the parallel computing device 700 employing the node described with reference to FIG. 15.

FIG. 16 is a flowchart illustrating the packet transmission process of the parallel computing device 700 employing the node 1500 described with reference to FIG. 15. Since a process of step S1601 is substantially the same as that of step S1001 illustrated in FIG. 10, an explanation of this step is omitted.

In step S1602, the control unit 1511 obtains the number of hops up to the destination node, and the maximum number of hops in the entire parallel computing device 700 from the hop count calculation unit 1512. Specifically, for example, the following process is executed at this time.

The control unit 1511 notifies the hop count calculation unit 1512 of a destination node address and a network configuration, which are obtained in step S1601. Then, the hop count calculation unit 1512 calculates the number of hops up to the destination node with the following expression based on the destination node address and the network configuration, which are notified from the control unit 1511. In a case where the network configuration is of a mesh type:

$$|x1-x0|+|y1-y0|+|z1-z0| \quad (8)$$

In a case where the network configuration is of a torus type:

$$\min(|x1-x0|, Nx-|x1-x0|)+\min(|y1-y0|, Ny-|y1-y0|)+ \\ \min(|z1-z0|, Nz-|z1-z0|) \quad (9)$$

Assume that a node address is represented with coordinate values of an XYZ axes coordinate system. Also assume that the local node address and the destination node address are $(x0, y0, z0)$ and $(x1, y1, z1)$, respectively. Further assume that the numbers of nodes included in x axis, y axis, and z axis directions are Nx, Ny, and Nz, respectively.

After the hop count calculation unit 1512 calculates the number of hops up to the destination node, the hop count calculation unit 1512 notifies the control unit 1511 of the calculated number of hops up to the destination node, and the maximum number of hops in the entire parallel computing device 700. Upon termination of the above described process, the process of the control unit 1511 moves to step S1603. Since steps S1603 to 1608 are substantially the same as steps S1003 to S1008 illustrated in FIG. 10, explanations of these steps are omitted.

Still Further Modification Example

Figure 17:
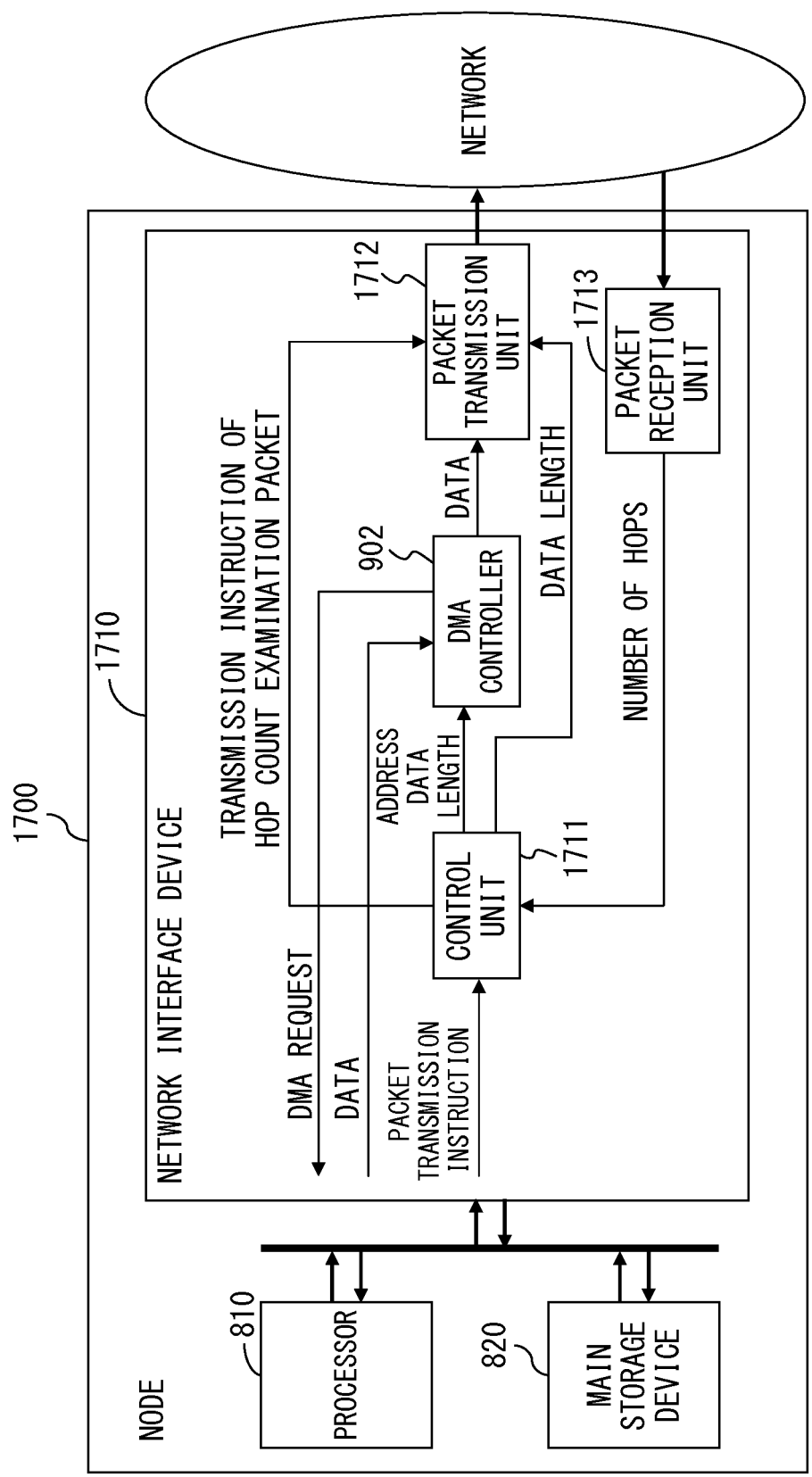
FIG. 17 illustrates a further modification example of the node illustrated in FIG. 9.

FIG. 17 illustrates a still further modification example of the node 710 illustrated in FIG. 9. A node 1700 illustrated in FIG. 17 includes the processor 810, the main storage device 820, and a network interface device 1710.

The network interface device 1710 includes a control unit 1711, a packet transmission unit 1712, a packet reception unit 1712, and the DMA controller 902. However, FIG. 17 does not intend that the network interface device 1710 includes only the components illustrated in FIG. 17. The network interface device 1710 may include a known function such as a packet reception function or the like.

Upon receipt of a packet transmission instruction from the processor 810, the control unit 1711 executes the packet transmission process by controlling the DMA controller 902 and the packet transmission unit 1712. At this time, the control unit 1711 designates a data length of data included in one packet for the DMA controller 902 and the packet transmission unit 1712.

The control unit 1711 may quantitatively obtain the data length of data included in one packet with a mathematical expression that represents a relationship between a measurement of a communication bandwidth of the local node based on the number of hops up to the destination of a packet and the data length changed according to the measurement.

Additionally, the control unit 1711 issues a transmission instruction of a hop count examination packet to the packet transmission unit 1712 in order to examine the number of hops up to the destination node. The control unit 1711 receives, from the packet reception unit 1712, a notification of a value included in a hop count field of a reply packet to the hop count examination packet. This notified value is the number of hops up to the destination node. The control unit 1711 measures a communication bandwidth between the local node and the destination node based on the number of hops up to the destination node. According to the measurement, the control unit 1711 may decide the data length designated for the DMA controller 902 and the packet transmission unit 903.

The packet transmission unit 1712 creates a packet including the data having the data length designated by the control unit 1711 from data transferred from the DMA controller 902, and transmits the packet to the destination node. Moreover, the packet transmission unit 1712 creates a hop count examination packet upon receipt of the transmission instruction of the hop count examination packet from the control unit 1711. Then, the packet transmission unit 1712 transmits the created hop count examination packet to the destination node.

The hop count examination packet is a packet including the hop count field. When the hop count examination packet is transmitted, an initial value of the hop count field is set to 0. The hop count field is a field updatable by each switch via which the hop count examination packet passes. Upon receipt of the hop count examination packet, each switch updates the value stored in the hop count field to a value incremented by 1.

The destination node that has received the hop count examination packet transmits a reply packet to the hop count examination packet to a source node of the hop count examination packet. In this case, the reply packet to the hop count examination packet includes the hop count field of the hop count examination packet that has been received by the destination node unchanged.

The packet reception unit 1713 receives a packet from the network. If the received packet is a reply packet to the hop count examination packet, the packet reception unit 1713 obtains the number of hops from the hop count field included in the received reply packet. Then, the packet reception unit 1713 notifies the control unit 1711 of the obtained number of hops.

The control unit 1711 included in the above described node 1710 may control a packet transmission interval by changing the packet transmission interval designated for the packet transmission unit 903 like the control unit 1211 included in the node 1210 illustrated in FIG. 12. In this case, the node 1710 may execute the process of steps S1303 to S1307 illustrated in FIG. 13 as a replacement for that of steps S1603 to S1607 illustrated in FIG. 16.

Figure 18:
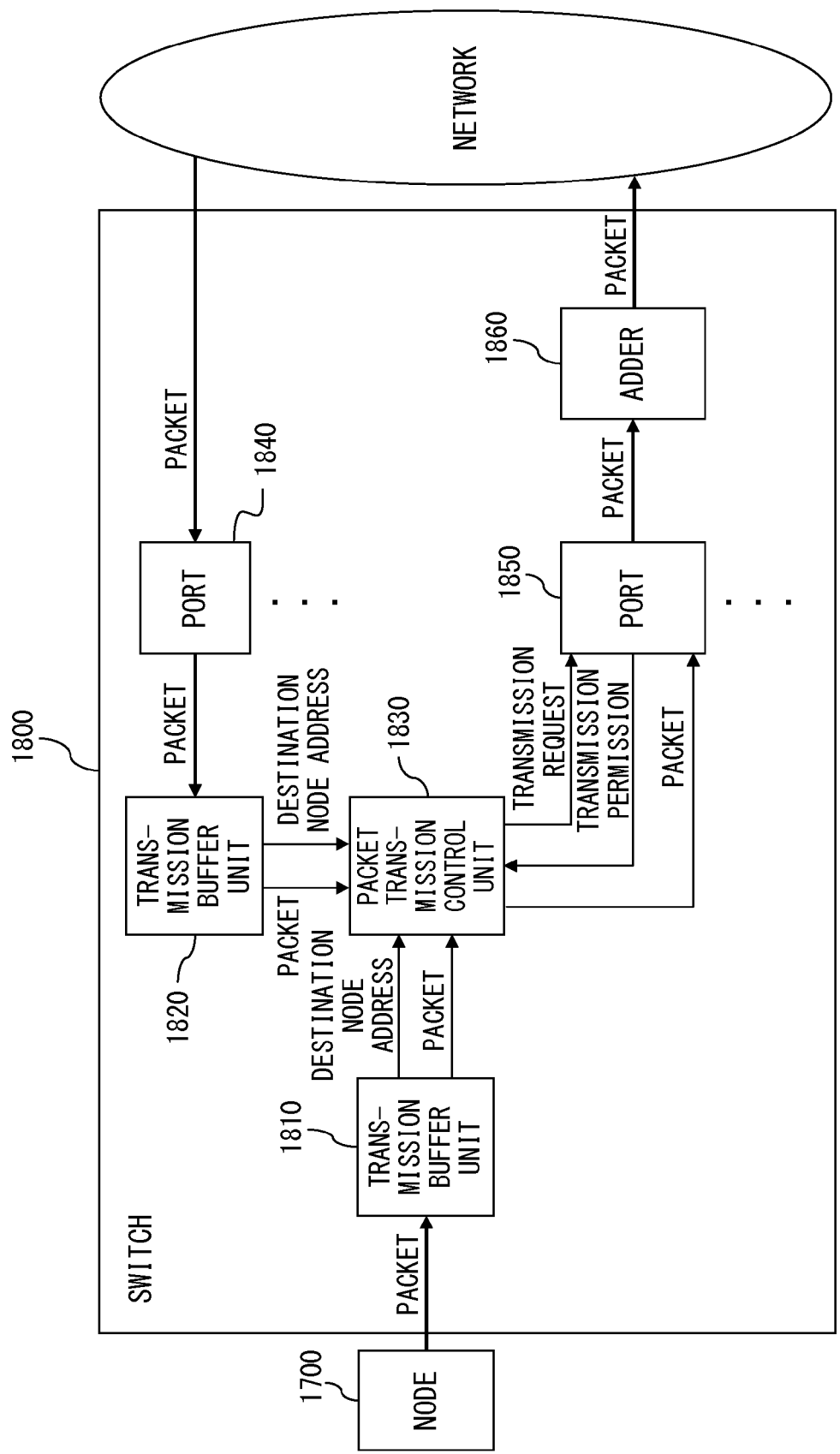
FIG. 18 illustrates a configuration example of a switch used in the parallel computing device 700 employing the node described with reference to FIG. 17.

FIG. 18 illustrates a configuration example of a switch 1800 used in this modification example. The switch 1800 includes transmission buffer units 1810 and 1820, a packet transmission control unit 1830, ports 1840 and 1850, and an adder 1860.

The transmission buffer unit 1810 includes a storage device for storing a packet received from the node 1700. After the transmission buffer unit 1810 stores the packet in the storage device, the transmission buffer unit 1810 transmits a destination node address included, for example, in a header of the packet stored in the storage device to the packet transmission control unit 1830. Moreover, the transmission buffer unit 1810 transmits the packet to the packet transmission control unit 1830 in response to a request from the packet transmission control unit 1830.

The transmission buffer unit 1820 includes a storage device for storing a packet received from the network. After the packet buffer unit 1820 stores the packet in the storage device, the transmission buffer unit 1820 outputs a destination node address included, for example, in a header of the packet stored in the storage device to the packet transmission control unit 1830. Moreover, the transmission buffer unit 1820 transmits the packet to the packet transmission control unit 1830 in response to a request from the packet transmission control unit 1830.

Upon receipt of a notification of the destination node address of a packet from the transmission buffer unit 1810 or 1820, the packet transmission control unit 1830 decides a port used to transmit the packet based on the notified destination node address. Moreover, when the packet transmission control unit 1830 obtains a packet from the transmission buffer unit 1810 or 1820, the packet transmission control unit 1830 guides the packet to the decided port.

Upon receipt of a packet from the network, the port 1840 transmits the received packet to the transmission buffer unit 1820. When the port 1850 receives a transmission request from the packet transmission control unit 1830, the port 1850 issues a notification of transmission permission to the packet transmission control unit 1830. Thereafter, upon receipt of the packet from the packet transmission control unit 1830, the port 1850 transmits the received packet to the destination node via the adder 1860.

The adder 1860 updates a value stored in the hop count field included in the packet transmitted from the port 1850 to a value incremented by 1. Note that FIG. 18 illustrates the single port 1840, the single port 1850, and the single adder 1860. However, pluralities of ports 1840 and 1850, and adders 1860 may be included.

Figure 19:
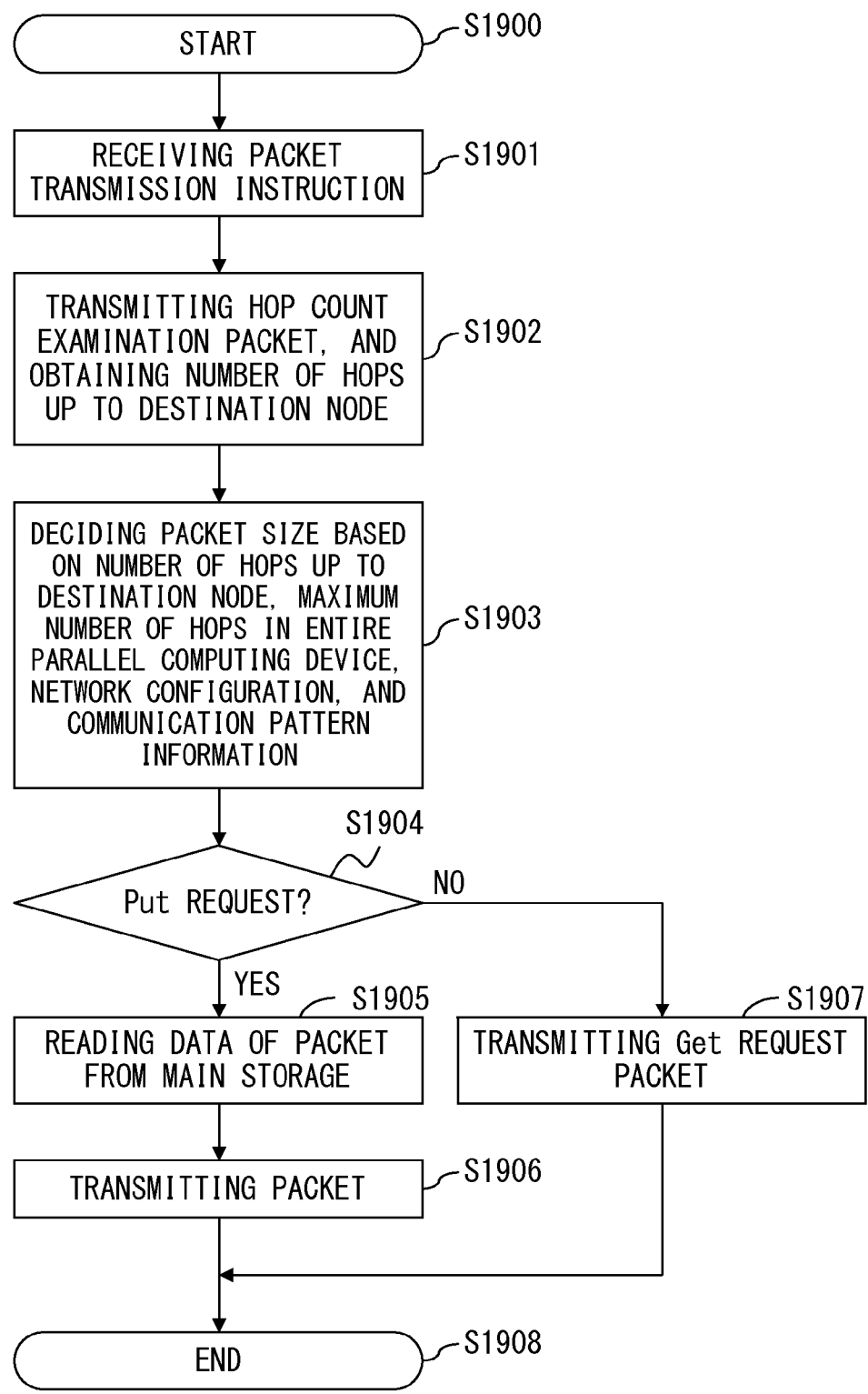
FIG. 19 is a flowchart illustrating a packet transmission process of the parallel computing device 700 employing the node described with reference to FIG. 17 and the switch described with reference to FIG. 18.

FIG. 19 is a flowchart illustrating the packet transmission process of the parallel computing device 700 employing the node 1700 described with reference to FIG. 17, and the switch 1800 described with reference to FIG. 18. Since a process of step S1901 is substantially the same as that of step 1001 illustrated in FIG. 10, an explanation of this step is omitted.

In step S1902, the control unit 1711 obtains the number of hops up to a destination node by transmitting a hop count examination packet to the destination of the packet, namely, the node indicated by a destination node address. Specifically, for example, the following process is executed at this time.

The control unit 1711 issues, to the packet transmission unit 1712, a transmission instruction of the hop count examination packet to the destination node address obtained in step S1901. Upon receipt of the transmission instruction of the hop count examination packet from the control unit 1711, the packet transmission unit 1712 transmits the hop count examination packet to the node indicated by destination node address obtained in step S1901.

Upon receipt of a reply packet to the hop count examination packet, the packet reception unit 1713 obtains the number of hops up to the destination node by referencing the hop count field included in the reply packet. Then, the packet reception unit 1713 notifies the control unit 1711 of the number of hops up to the destination node.

After the above described process is terminated, the process of the control unit 1711 moves to step S1903. Since a process of steps S1903-S1907 is substantially the same as that of steps S1003-S1007 illustrated in FIG. 10, explanations of these steps are omitted.

The control unit 1711 included in the above described node 1710 may control a packet transmission interval by changing the packet transmission interval designated for the packet transmission unit 1712 like the control unit 1211 included in the node 1210 illustrated in FIG. 12. In this case, the node 1710 may execute the process of steps S1303-S1307 illustrated in FIG. 13 as a replacement for that of steps S1903-S1907 illustrated in FIG. 19.

Still Further Embodiment

Figure 20:
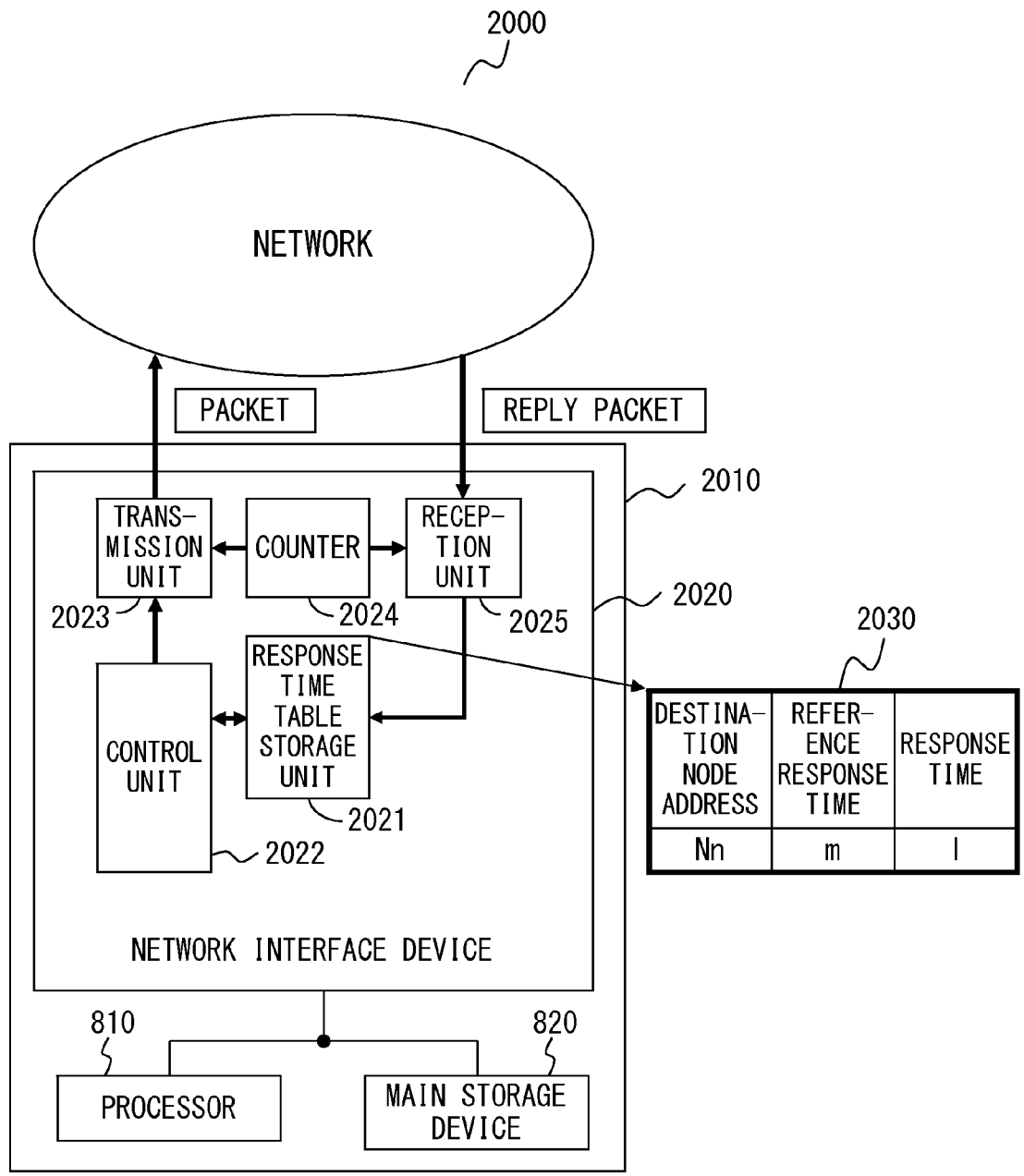
FIG. 20 schematically illustrates a node included in a parallel computing device 2000 according to another embodiment.

FIG. 20 schematically illustrates a node included in a parallel computing device 2000 according to this embodiment. The parallel computing device 2000 according to this embodiment employs the node 2010 illustrated in FIG. 20 as a replacement for each of the nodes 710 to 716 illustrated in FIG. 7.

The node 2010 includes the processor 810, the main storage device 820, and a network interface device 2020. The network interface device 2020 includes a response time table storage unit 2021, an interface control unit 2022, a transmission unit 2023, a counter 2024, and a reception unit 2025.

The response time table storage unit 2021 includes a storage device for storing a response time table 2030 configured to store a reference response time and a response time for each destination node, which is a destination to which a packet is transmitted. The response time is the length of time needed from when a packet is transmitted to a destination node until a reply packet to the transmitted packet is received from the destination node. As the response time in the response time table 2030, actually measured response time is stored. The reference response time is a reference value of the response time, which is used to measure a communication bandwidth. The reference response time may be decided based on a network configuration, the number of hops up to a destination node, an actually measured value or a logical value in a standard environment, or the like is used.

The interface control unit 2022 issues, to the transmission unit 2023, an instruction to transmit a packet including part or the whole of data designated by the processor 810 according to a protocol used in the network to a specified destination node. At the time of this instruction, the interface control unit 2022 references the response time table 2030 stored in the response time table storage unit 2021, and obtains a reference response time and a response time between the local node and the destination node. The interface control unit 2022 measures a communication bandwidth between the local node 2010 and the destination node based on the obtained reference response time and response time. Then, the interface control unit 2022 decides a size of the packet to be transmitted based on the measurement. The interface control unit 2022 designates a data length based on the decided size of the packet for the transmission unit 2023.

The transmission unit 2023 creates a packet including part or the whole of data designated from the processor 810 by a data length designated from the interface control unit 2022. At this time, the transmission unit 2023 obtains a count value by referencing the counter 2024. Then, the transmission unit 2023 sets the obtained count value in a specified area of the packet.

If the packet to be transmitted is a reply packet, the transmission unit 2023 sets the count value stored in the specified area of the received packet in a specified area of the reply packet. Then, the transmission unit 2023 transmits the reply packet to the source node.

The counter 2024 is a counter for counting a number at certain intervals. The reception unit 2025 obtains a count value A stored in a specified area of the received packet. Moreover, the reception unit 2025 obtains a count value B by referencing the counter 2024. Then, the reception unit 2025 calculates a response time based on a difference between the count value B and the count value A. The reception unit 2025 stores the calculated response time in the response time table 2030.

Additionally, the reception unit 2025 stores the received packet in the main storage device 820. When the reception of the packet is notified from the reception unit 2025, the interface control unit 2022 notifies the processor 810 of the reception of the packet along with a storage area of the packet.

FIG. 21 illustrates a specific configuration example of the node 2010 illustrated in FIG. 20. The node 2010 includes the processor 810, the main storage device 820, and the network interface device 2020.

The network interface device 2020 includes a response time table storage unit 2101, a packet transmission management unit 2102, a control unit 2103, a DMA controller 2104, a packet transmission unit 2105, a counter 2106, and a packet reception unit 2107.

The response time table storage unit 2101 is substantially the same as the response time table storage unit 2021 illustrated in FIG. 20. Accordingly, the response time table storage unit 2101 includes a storage device for storing a response time table 2030 configured to store a reference response time and a response time for each destination node, which is a destination to which a packet is transmitted.

The packet transmission management unit 2102 manages the number of transmittable packets by using the number of packets q transmittable in a state where a reply packet to a transmitted packet has not been received yet, and the number of packets p transmittable when one reply packet is received. Note that p and q are integers equal to or larger than 0. Specifically, the packet management unit 2102 manages the number of transmittable packets with the following operations.

(1) The number of packets q is notified from the processor 810 as an initial value. Then, the packet transmission management unit 2102 holds the number of packets q as the number of transmittable packets.

(2) Upon receipt of a notification indicating that a packet has been transmitted from the control unit 2103, the packet transmission management unit 2102 updates the number of transmittable packets q to a value obtained by subtracting "1".

(3) Upon receipt of a notification indicating that a reply packet has been received from the packet reception unit 2107, the packet transmission management unit 2102 updates the number of transmittable packets q to a value obtained by adding "p".

Upon receipt of an inquiry about the number of transmittable packets from the control unit 2103, the packet transmission management unit 2102 notifies the control unit 2103 of the number of transmittable packets. Upon receipt of a packet transmission instruction from the processor 810, the control unit 2103 obtains the number of transmittable packets by making an inquiry to the packet transmission management unit 2102. If a packet is transmittable, the control unit 2103 obtains a reference response time and a response time between the local node and a destination node by referencing the response time table 2030 stored in the response time table storage unit 2101. The control unit 2103 decides a size of the packet to be transmitted based on the obtained reference response time and the response time.

For example, if the response time is longer than the reference response time, the control unit 2103 predicts that a communication bandwidth of the local node, namely, the node 2010 becomes narrow. In this case, the control unit 2103 increases the size of the packet to be transmitted. Alternatively, if the response time is shorter than the reference response time, the control unit 2103 predicts that the communication bandwidth of the local node, namely, the node 2010 becomes wide. In this case, the control unit 2103 decreases the size of the packet to be transmitted.

The control unit 2103 calculates a data length of data included in the packet so that the packet has the decided size. Then, the control unit 2103 notifies the DMA controller 2104 of the calculated data length and an address of the data to be transmitted.

The control unit 2103 may quantitatively obtain the data length of the packet to be transmitted to the destination node with a mathematical expression that represents a relationship between the measurement of the communication bandwidth of the local node based on the response time and the data length changed according to the measurement.

When the address and the data length are notified from the control unit 2103, the DMA controller 2104 issues a DMA request to the main storage device 802 by designating the address and the data length, which are notified from the control unit 2103. Then, the main storage device 820 DMA-transfers the data stored at the designated address to the DMA controller 2104 by the designated data length. The DMA controller 2104 transmits, to the packet transmission unit 2105, the data DMA-transferred from the main storage device 820.

The packet transmission unit 2105 creates a packet including the data transmitted from the DMA controller 2104. At this time, the packet transmission unit 2105 obtains a count value by referencing the counter 2106. Then, the packet transmission unit 2105 sets the obtained count value in a specified area of the packet. Next, the packet transmission unit 2105 transmits the created packet to the destination node.

Alternatively, if the packet to be transmitted is a reply packet, the packet transmission unit 2105 sets the count value stored in the specified area of the received packet in a specified area of the reply packet. Then, the packet transmission unit 2105 transmits the reply packet to the destination node.

The counter 2106 is a counter for counting a number at certain intervals. The packet reception unit 2107 obtains a count value A stored in the specified area of the received packet. The packet reception unit 2107 also obtains a count value B by referencing the counter 2106. Then, the packet reception unit 2107 calculates a response time based on a difference between the count value B and the count value A. The packet reception unit 2107 stores the calculated response time in the response time table 2030 stored in the response time table storage unit 2101. Moreover, the packet reception unit 2107 notifies the packet transmission unit 2105 of the reception of the reply packet.

Additionally, the packet reception unit 2107 stores the received packet in the main storage device 820. When the reception of the packet is notified from the packet reception unit 2107, the control unit 2103 notifies the processor 810 of the reception of the packet along with a storage area of the packet.

Figure 22:
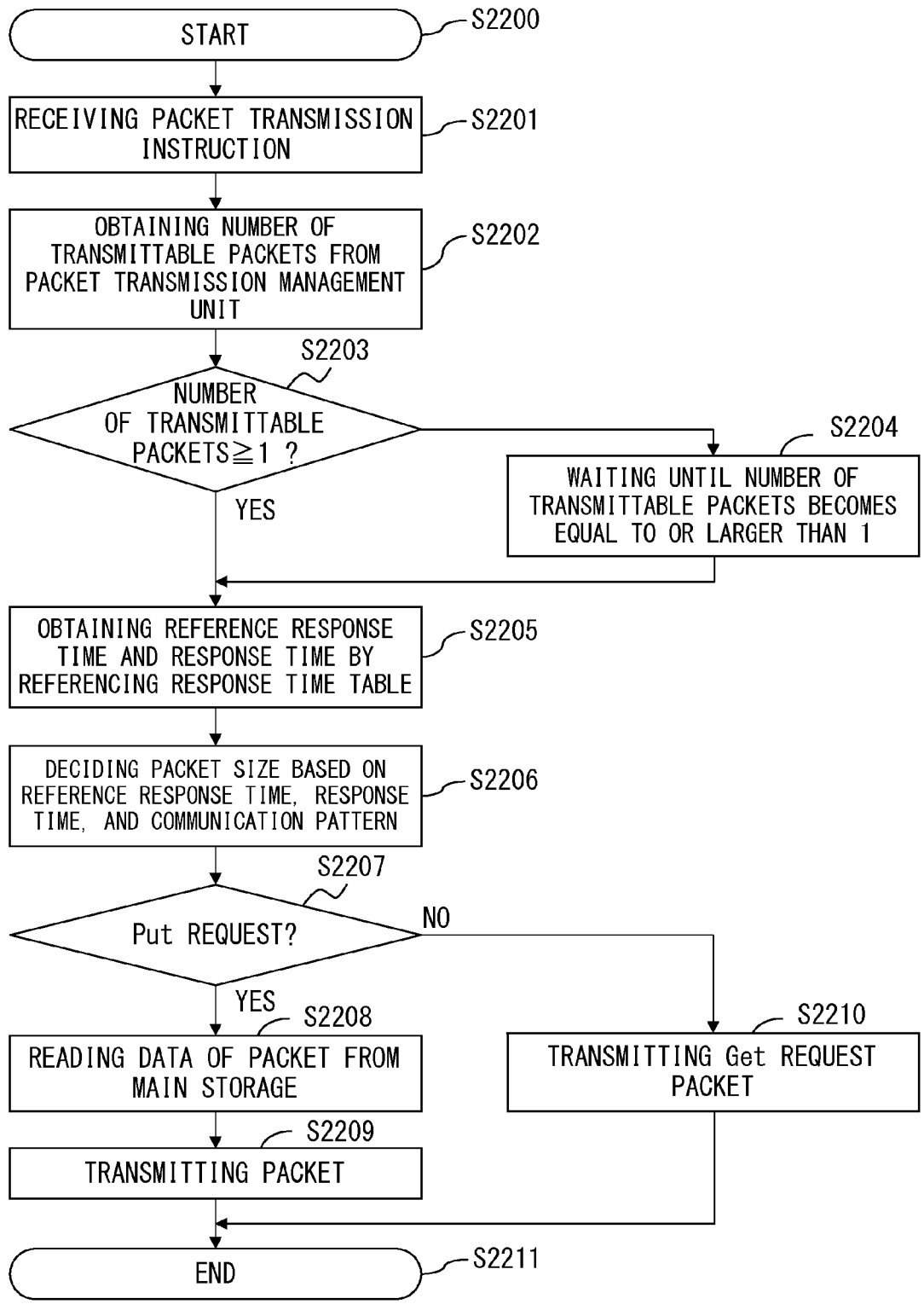
FIG. 22 is a flowchart illustrating a packet transmission process of the parallel computing device 2000 employing the node described with reference to FIG. 21.

FIG. 22 is a flowchart illustrating the packet transmission process of the parallel computing device 700 employing the node 2010 described with reference to FIG. 21. Since a process of step S2201 is substantially the same as that of step S1001 illustrated in FIG. 10, an explanation of this step is omitted.

In step S2202, the control unit 2103 obtains the number of transmittable packets from the packet transmission management unit 2102. If the number of transmittable packets, which is obtained from the packet transmission management unit 2102, is smaller than 1 ("NO" in step S2203), the process of the control unit 2103 moves to step S2204. In this case, the control unit 2103 waits until the number of transmittable packets becomes equal to or larger than 1, for example, by making an inquiry to the packet transmission management unit 2102 at specified time interval (step S2204). When the number of transmittable packets becomes equal to or larger than 1, the process of the control unit 2103 moves to step S2205.

Alternatively, if the number of transmittable packets, which is obtained from the packet transmission management unit 2102, is equal to or larger than 1 ("YES" in step S2203), the process of the control unit 2103 moves to step S2205.

In step S2205, the control unit 2103 references the response time table 2030 stored in the response time table storage unit 2101. Then, the control unit 2103 obtains, from the response time table 2030, a reference response time and a response time for a destination node.

In step S2206, the control unit 2103 decides a size of the packet based on the reference response time and the response time, which are obtained in step S2205, and a communication pattern. If the packet transmission instruction from the processor 810 is issued as a Put request ("YES" in step S2207), the process of the control unit 2103 moves to step S2208. In this case, the control unit 2103 reads data designated by the processor 810 from the main storage device 820 (step S2208). Specifically, for example, the following process is executed.

The DMA controller 2104 makes a DMA request to the main storage device 820 by designating an address at which data to be transmitted is stored, and a data length of the data included in the packet, which are designated from the control unit 2103 according to the packet transmission instruction. Then, the main storage device 820 DMA-transfers the data stored at the designated address to the DMA controller 2104 by the designated data length. The DMA controller 2104 transmits the transferred data to the packet transmission unit 2105. As the data length, a value obtained by excluding a header length included in the packet from the packet size decided in step S2206 is available.

In step S2209, the control unit 2103 creates a packet including the data having the data length designated by the control unit 2103 upon receipt of the data from the DMA controller 2104. Moreover, the packet transmission unit 2105 obtains a count value from the counter 2106, and sets the obtained count value in a specified area of the packet. Then, the packet transmission unit 2105 transmits the packet to the destination node.

Alternatively, if the packet transmission instruction from the processor 810 is issued as a Get request ("NO" in step S2207), the process of the control unit 2103 moves to step S2210. In this case, the control unit 2103 creates a Get request packet for designating the packet size decided in step S2206, and transmits the created packet to the destination node (step S2210). Upon termination of the above described process, the control unit 2103 ends the packet transmission process (step S2211).

Figure 23:
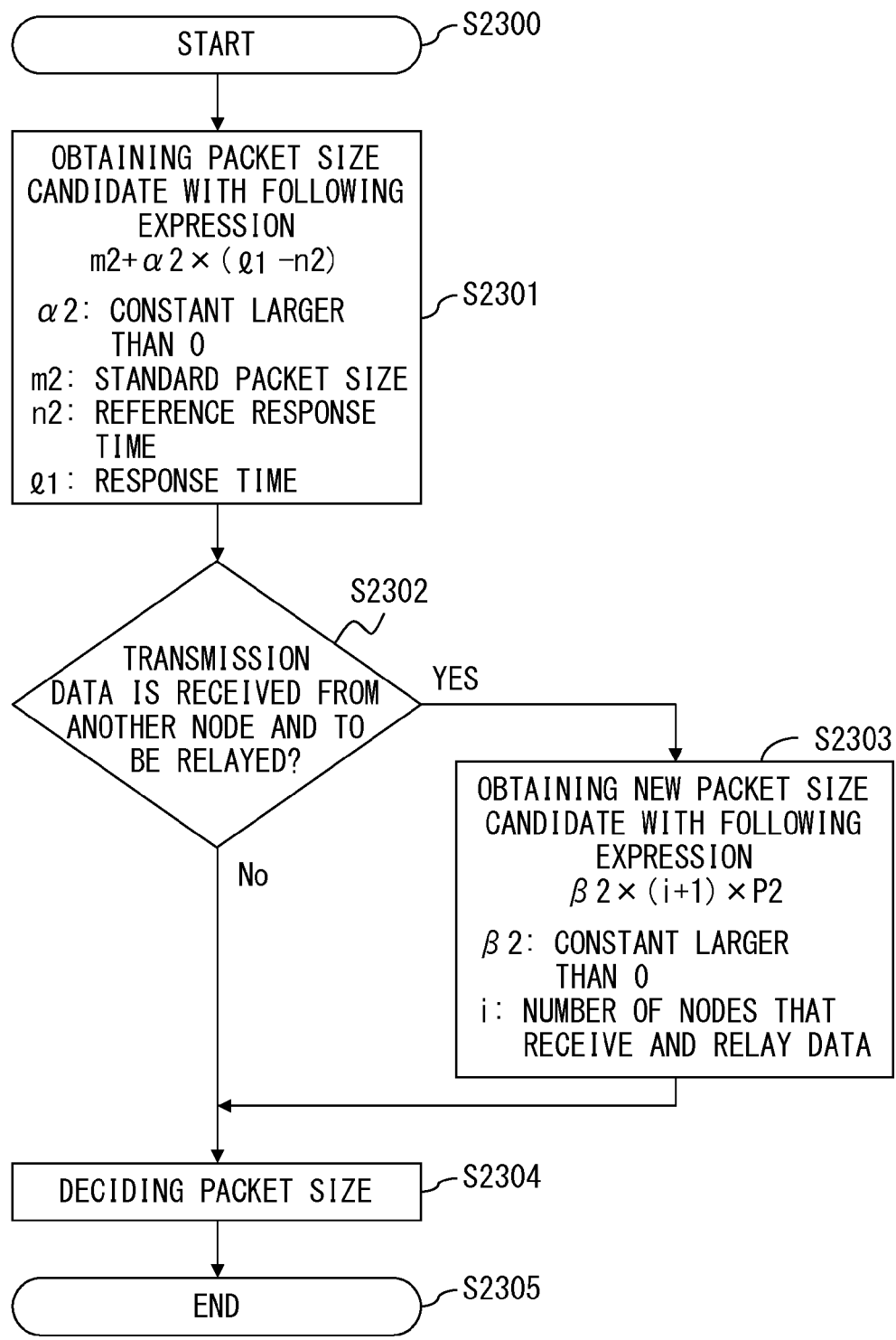
FIG. 23 is a flowchart illustrating a specific process of step S2206 illustrated in FIG. 22.

FIG. 23 is a flowchart illustrating details of the packet size decision process (step S2206) according to this embodiment. In step S2301, the control unit 2103 calculates a packet size candidate with the following expression.

$$m2 + \alpha 2 \times (l1 - n2) \quad (10)$$

where α2 is a constant, which is larger than 0, for adjusting a packet size, m2 is a standard packet size, n2 is the reference response time obtained in step S2205, and l1 is the response time obtained in step S2205. As m2, a size of a packet transmitted when the response time is equal to the reference response time, or the like is available. The standard packet size is a size of a packet used in an inter-node communication in the parallel computing device 2000.

If the transmission data is received from a different node and to be relayed to a destination node in step S2302 ("YES" in step S2302), the process of the control unit 2103 moves to step S2303. In this case, the control unit 2103 calculates, with the following expression, a new packet size candidate of the packet that is received from the different node and to be relayed to the destination node (step S2303).

$$\beta 2 \times (i+1) \times P2 \quad (11)$$

where β2 is a constant, which is larger than 0, for adjusting a packet size, i is the number of nodes that receive and relay data, and P2 is the packet size candidate calculated in step S2301.

After the control unit 2103 calculates the new packet size candidate with the expression (11), the process of the control unit 2103 moves to step S2304. Alternatively, if the transmission data is not the data of the packet that is received from the different node and to be relayed to the destination node ("NO" in step S2302), the process of the control unit 2103 moves to step S2304.

If the packet size candidate obtained in step S2301 or S2303 is equal to or larger than an available maximum value of the packet size in step S2304, the control unit 2103 decides the available maximum value is the packet size. Alternatively, if the packet size candidate obtained in step S2301 or S2303 is equal to or smaller than an available minimum value of the packet size, the control unit 2103 decides the available minimum value is the packet size. Further alternatively, if the packet size candidate obtained in step S2301 or S2303 is larger than the available minimum value and smaller than the available maximum value, the control unit 2103 decides the packet size candidate is the packet size.

Upon termination of the above described process, the control unit 2103 ends the packet size decision process (step S2305).

The control unit 2103 included in the above described node 2020 may control a packet transmission interval by designating the packet transmission interval for the packet transmission unit 2105 like the control unit 1211 included in the node 1210 illustrated in FIG. 12. In this case, the node 2020 may execute the process of steps S1303 to S1307 illustrated in FIG. 13 as a replacement for that of steps S2206 to S2210 illustrated in FIG. 22.

Still Further Embodiment

Figure 24:
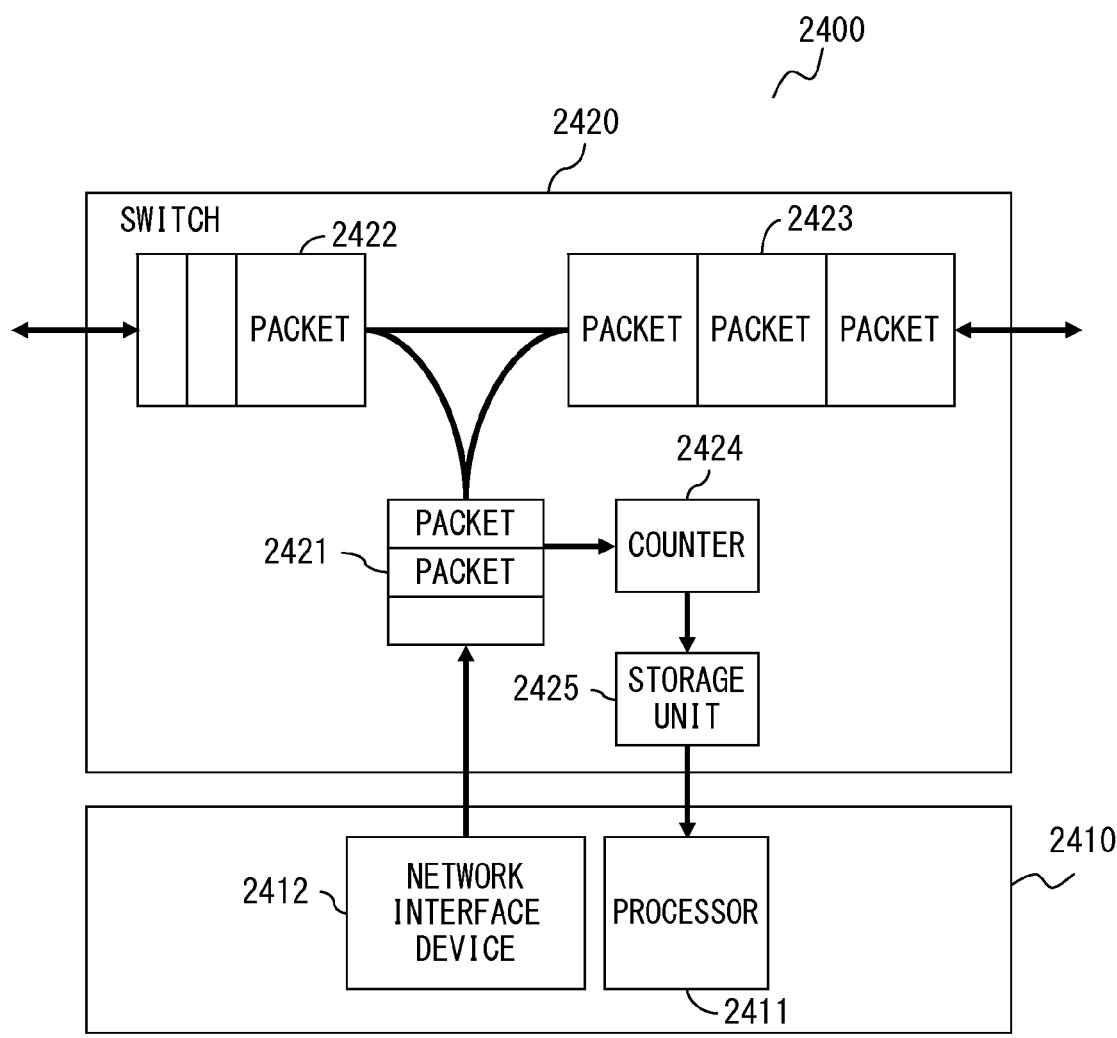
FIG. 24 schematically illustrates a node and a switch, which are included in a parallel computing device 2400 according to a further embodiment.

FIG. 24 schematically illustrates a node and a switch, which are included in a parallel computing device 2400 according to this embodiment. The parallel computing device 2400 according to this embodiment employs the node 2410 and the switch 2420, which are illustrated in FIG. 24, as a replacement for each of the nodes 710-716 and each of the switches 720-726, which are illustrated in FIG. 7.

The node 2410 includes a processor 2411 and a network interface device 2412. The node 2410 is communicatively connected to the switch 2420 via a LAN cable or the like. Moreover, the processor 2411 included in the node 2410 may be communicatively connected to a storage device 2560 included in the switch 2420 via a dedicated line, a LAN cable, or the like.

The processor 2411 is an arithmetic processing device for executing an arithmetic process according to a specified program. Moreover, the processor 2411 issues a packet transmission instruction to the network interface device 2412 in order to transmit desired data to another node. At this time, the processor 2411 designates a packet size along with the packet transmission instruction.

The processor 2411 may designate a packet transmission interval for the network interface device 2412 like the control unit 1211 included in the node 1210 illustrated in FIG. 12. In this case, the processor 2411 may obtain the packet transmission interval with the process illustrated in FIG. 14 as a replacement for that of steps S2206-S2209 illustrated in FIG. 22.

The packet size may be decided, for example, based on a transmission wait time of a packet, which is stored in a wait time table 2600 in a storage unit 2425 included in the switch 2420. The wait time table 2600 will be described later with reference to FIG. 26.

Upon receipt of the packet transmission instruction from the processor 2411, the network interface device 2412 creates a packet of the packet size designated along with the packet transmission instruction, and transmits the created packet to the switch 2420.

The switch 2420 includes transmission buffers 2421, 2422, and 2423, a counter 2424, and a storage unit 2425. The transmission buffer 2421 is a storage device for holding a packet received from the node 2410 until the packet is transmitted. The transmission buffers 2422 and 2423 are storage devices for holding a packet received from a different node until the packet is transmitted.

The counter 2424 counts a transmission wait time needed from when a packet is received from the node 2410 until the received packet is transmitted to the next node. The counter 2424 sets the counted transmission wait time in the wait time table 2600 stored in the storage unit 2425.

The storage unit 2425 is a storage device for storing the wait time table 2600 configured to store, for each communication pattern, a transmission wait time needed when a packet is received until the packet is transmitted to a destination node.

For example, a case where the processor 2411 processes a packet in the above described configuration is considered. In this case, the processor 2411 obtains, from the wait time table 2600 stored in the storage unit 2425, a transmission wait time needed from when the packet is received until the packet is transmitted to the destination node. Then, the processor 2411 measures a communication bandwidth between the local node 2410 and the destination node based on the obtained transmission wait time. Next, the processor 2411 decides a size of the packet based on a result of the measurement.

The processor 2411 may quantitatively obtain a data length of the packet transmitted to the destination node with a mathematical expression that represents a relationship between the measurement of the communication bandwidth of the local node based on the transmission wait time and the data length decided according to the measurement.

The processor 2411 designates the size of the packet for the network interface device 2412 along with the packet transmission instruction. Then, the network interface device 2412 creates a packet of the size designated by the processor 2411, and transmits the created packet to the switch 2420.

The packet input to the switch 2420 is stored in the transmission buffer 2421. After the packet is stored in the transmission buffer 2421, the counter 2424 counts a transmission wait time until the packet stored in the transmission buffer 2421 is transmitted. Then, the counter 2424 sets the counted transmission wait time in the wait time table 2600 stored in the storage unit 2425.

For ease of understanding of the state where the packet is waiting to be transmitted, FIG. 24 illustrates the three transmission buffers 2421, 2422, and 2423. However, the transmission buffers 2421, 2422, and 2423 may be implemented with one or a plurality of transmission buffers.

Additionally, FIG. 24 does not intend that the node 2410 includes only the components illustrated in FIG. 24. The node 2410 may include a function of executing an informational process, such as the main storage device 820 illustrated in FIG. 8, or the like.

FIG. 25 illustrates a specific configuration example of the switch 2420 illustrated in FIG. 24. The switch 2420 includes a transmission buffer unit 2510, a packet transmission control unit 2520, ports 2530 and 2540, a counter 2550, and a storage unit 2560.

The transmission buffer unit 2510 includes a storage device for storing a packet received from the network interface device 2412 included in the node 2410. After the transmission buffer unit 2510 stores the packet in the storage device, the transmission buffer unit 2510 transmits a destination node address included, for example, in a header of the packet stored in the storage device to the packet transmission control unit 2520. Moreover, the transmission buffer unit 2510 transmits the packet to the packet transmission control unit 2520 in response to a request from the packet transmission control unit 2520.

Upon receipt of a notification of the destination node address of the packet from the transmission buffer unit 2510, the packet transmission control unit 2520 decides a port used to transmit the packet based on the notified destination node address. The packet transmission control unit 2520 issues a transmission request to the decided port, for example, the port 2530 or 2540. When the notification of transmission permission is issued from the port to which the transmission request has been issued, the packet transmission control unit 2520 obtains the packet from the transmission buffer unit 2510. After the packet transmission control unit 2520 obtains the packet from the transmission buffer unit 2510, the packet transmission control unit 2520 transmits the packet to the decided port.

Additionally, the packet transmission control unit 2520 notifies the counter 2550 of the destination node address notified from the transmission buffer unit 2510 upon receipt of the notification of the destination node address from the transmission buffer unit 2510. At the same time, the packet transmission control unit 2520 issues a start instruction to start counting a wait time to the counter 2550. Upon completion of the transmission of the packet, the packet transmission control unit 2520 issues, to the counter 2550, a stop instruction to stop counting the transmission wait time of the packet that has been transmitted.

Upon receipt of the start instruction from the packet transmission control unit 2520, the counter 2550 starts counting the transmission wait time for a packet to be transmitted to the destination node address notified from the packet transmission control unit 2520. Moreover, upon receipt of the stop instruction from the packet transmission control unit 2520, the counter 2550 stops counting the transmission wait time for the packet to be transmitted to the destination node, for which the stop instruction has been issued. Then, the counter 2550 sets the count value in the wait time table 2600 stored in the storage unit 2560.

Upon receipt of the transmission request from the packet transmission control unit 2520, the port 2530 issues a notification of transmission permission to the packet transmission control unit 2520. Thereafter, upon receipt of the packet from the packet transmission control unit 2520, the port 2530 transmits the received packet to the destination node. Also the port 2540 performs substantially the same operations as those of the port 2530.

FIG. 25 refers to the example of the case where the switch 2420 includes the two ports 2530 and 2540. However, FIG. 25 does not intend to limit the number of ports included in the switch 2420. Moreover, the switch 2420 may include the transmission buffer unit 1820, the port 1840, and the like, which are illustrated in FIG. 18.

FIG. 26 illustrates an example of the wait time table 2600 stored in the storage unit 2560. The wait time table 2600 illustrated in FIG. 26 stores information including a communication pattern, a destination node address, and a transmission wait time needed from when each packet that the node 2410 connected to the switch 2420 transmits to the destination node is received until the packet is transmitted to the destination node.

Examples of the communication pattern may include types of a collective communication, such as "All Gather", "All to All", "All reduce", and the like, which are stipulated by MPI (Message Passing Interface). The examples of the communication pattern may further include types of a collective communication, such as "Broadcast", "Gather", "Reduce", and the like, which are stipulated by MPI.

"All Gather" is a communication pattern in which each node transmits the same data to all other nodes. "All to All" is a communication pattern in which each node transmits different data respectively to all other nodes. "All reduce" is a communication pattern in which one arbitrary node transmits a result obtained by performing an arithmetic operation with data held by all nodes to all the nodes other than the node that performs the arithmetic operation. "Broadcast" is a communication pattern in which one arbitrary node transmits data to a plurality of other nodes. "Gather" is a communication pattern in which a plurality of nodes transmit data to one arbitrary node. "Reduce" is a communication pattern in which one arbitrary node performs an arithmetic operation with data held by all nodes. In this case, only the node that performs the arithmetic operation holds a result of the arithmetic operation.

For example, in the wait time table 2600 illustrated in FIG. 26, transmission wait times "t00", "t01", ... of packets "p00", "p01", ... transmitted to a destination node having a destination node address of "n00" are set in a case where a communication pattern is "All Gather".

Figure 27:
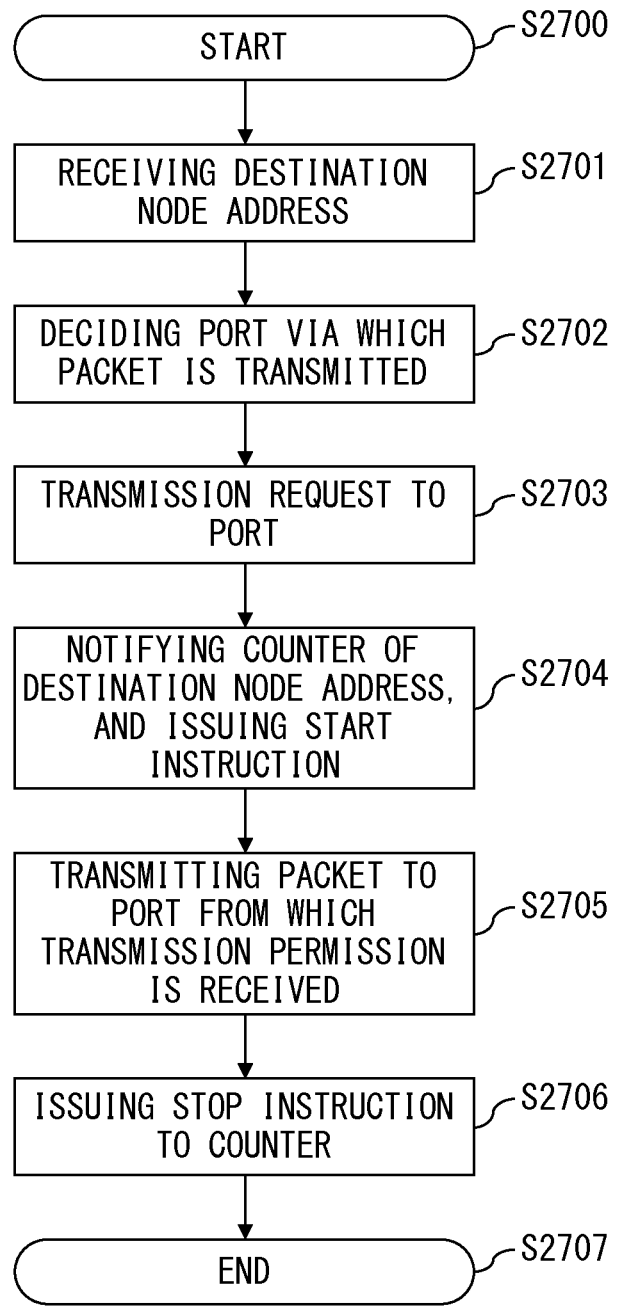
FIG. 27 is a flowchart illustrating a process of the switch illustrated in FIG. 25.

FIG. 27 is a flowchart illustrating the process of the switch 2420 illustrated in FIG. 25. In step S2701, the packet transmission control unit 2520 receives a destination node address from the transmission buffer unit 2510. Then, the process of the packet transmission control unit 2520 moves to step S2702.

In step S2702, the packet transmission control unit 2520 decides a port via which a packet is to be transmitted based on the destination node address received from the transmission buffer unit 2510. After the packet transmission control unit 2520 decides the port via which the packet is to be transmitted, the packet transmission control unit 2520 issues a transmission request to the decided port (step S2703).

In step S2704, the packet transmission control unit 2520 notifies the counter 2550 of the destination node address received from the packet transmission buffer unit 2510, and issues a start instruction. The counter 2550 that has received the start instruction starts counting a transmission wait time of the packet to be transmitted to the destination node address, for example, at 0.

In step S2705, upon receipt of transmission permission from the port to which the transmission request has been issued, the packet transmission control unit 2520 transmits the packet to the port from which the transmission permission is received. Upon completion of the transmission of the packet, the packet transmission control unit 2520 issues a stop instruction to the counter 2550 (step S2706). The counter 2550 that has received the stop instruction stops counting the transmission wait time started according to the start instruction in step S2704. Then, the counter 2550 stores a count value and the destination node address for a corresponding communication pattern within the wait time table 2600.

The above provided explanation does not intend to limit the process of the packet transmission control unit 2520 to the order of the process of steps S2700-S2707 illustrated in FIG. 27. For example, the packet transmission control unit 2520 may execute steps S2703 and S2704 at the same time. Moreover, the packet transmission control unit 2520 may execute steps S2705 and S2706 at the same time.

Figure 28:
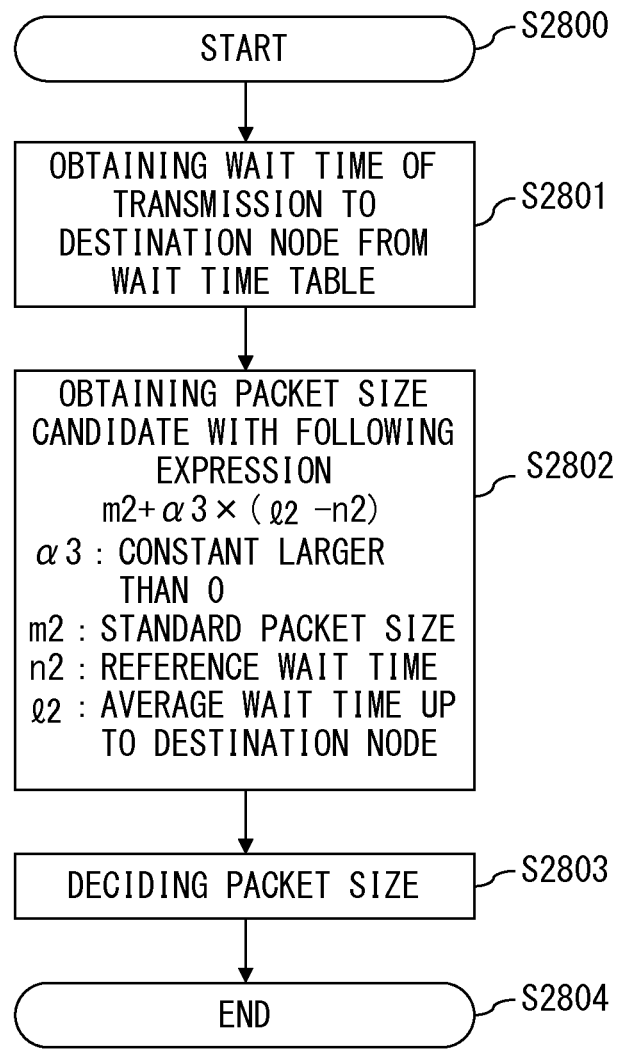
FIG. 28 is a flowchart illustrating a packet size decision process of a processor illustrated in FIG. 24.

FIG. 28 is a flowchart illustrating a packet size decision process of the processor 2411 according to this embodiment. In step S2801, the processor 2411 obtains all wait times of transmissions to each destination node in a communication pattern of a communication to be hereafter performed from the wait time table 2600 stored in the storage unit 2560 included in the switch 2420.

In step S2802, the processor 2411 calculates an average value l2 of the transmission wait times to each destination node, which are obtained in step S2801, and calculates a packet size candidate with the following expression.

$$m2 + \alpha 3 \times (l2 - n2) \quad (12)$$

where $\alpha 3$ is a constant, which is larger than 0, for adjusting a packet size, l2 is an average wait time of transmission to each destination node, m2 is a standard packet size, and n2 is a predetermined reference wait time. As m2, a size of a packet transmitted when await time is equal to the reference wait time, or the like is available. As the reference wait time n2, for example, an average value of transmission wait times, counted in advance in all nodes by performing various types of communications, of packets transmitted to the same destination node, or the like is available.

In step S2803, if the packet size candidate obtained in step S2802 is equal to or larger than an available maximum value of the packet size, the processor 2411 decides the available maximum value is the packet size. Alternatively, if the packet size candidate obtained in step S2802 is equal to or smaller than an available minimum value of the packet size, the processor 2411 decides the available minimum value is the packet size. Further alternatively, if the packet size candidate obtained in step S2802 is larger than the available minimum value and smaller than the available maximum value, the processor 2411 decides the packet size candidate is the packet size.

Upon termination of the above described process, the processor 2411 ends the packet size decision process (step S2804).

Modification Example

Figure 29:
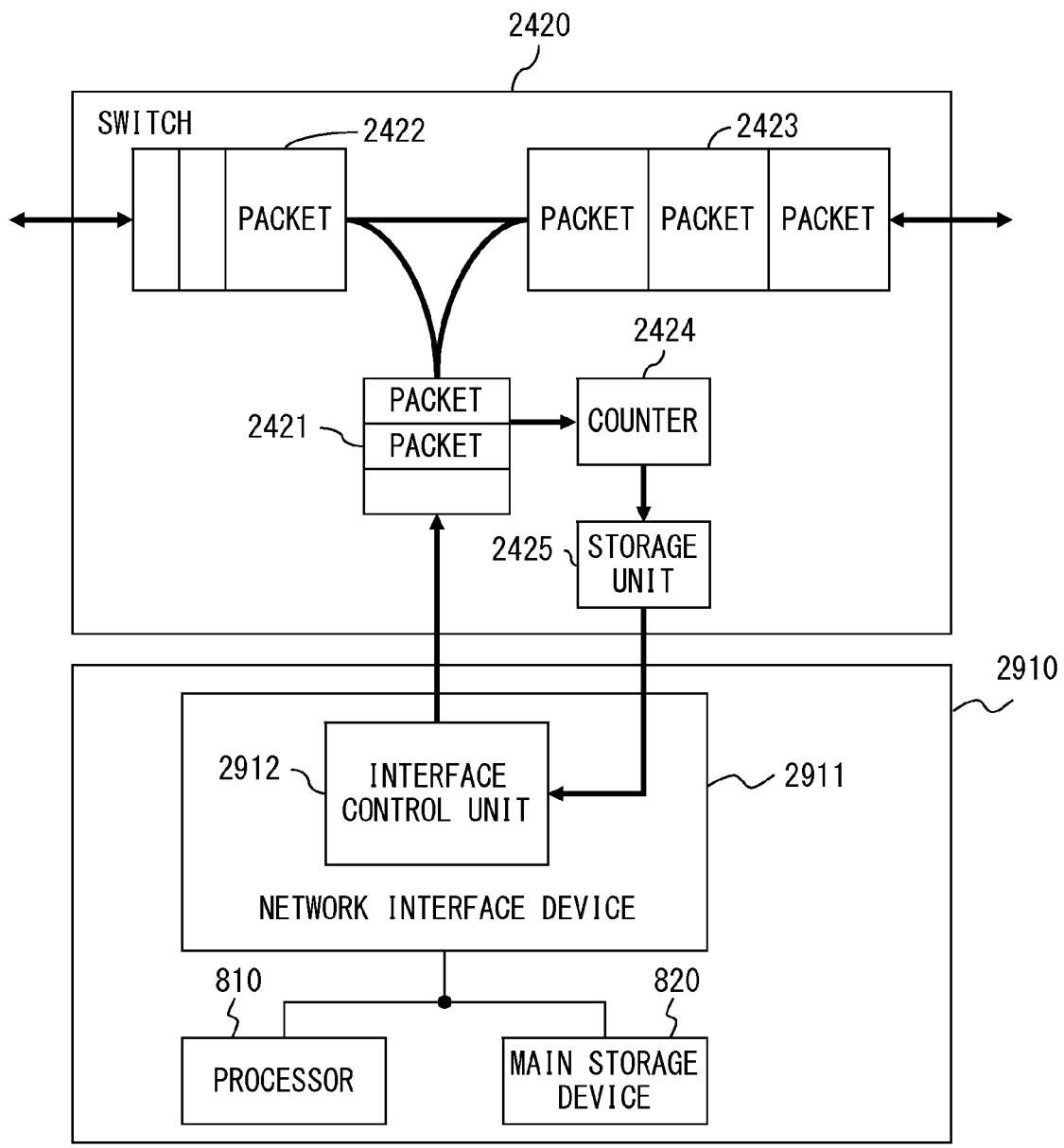
FIG. 29 illustrates a modification example of the node illustrated in FIG. 24.

FIG. 29 illustrates a modification example of the node 2410 illustrated in FIG. 24. The node 2910 illustrated in FIG. 29 includes the processor 810, the main storage device 820, and a network interface device 2911 including an interface control unit 2912. The node 2910 is communicatively connected to the switch 2420 via a LAN cable or the like. Moreover, the interface control unit 2912 included in the node 2910 may be communicatively connected to the storage unit 2560 included in the switch 2420 via a dedicated line, a LAN cable, or the like.

The interface control unit 2912 executes a packet transmission process according to a packet transmission instruction from the processor 810. At this time, the interface control unit 2912 measures a communication bandwidth between the local node and a destination node based on a transmission wait time of a packet, which is set in a wait time table 3100 stored in the storage unit 2425 included in the switch 2420. The interface control unit 2912 may decide the size of the packet transmitted to the destination node according to the measurement. The wait time table 3100 will be described later with reference to FIG. 31.

Figure 30:
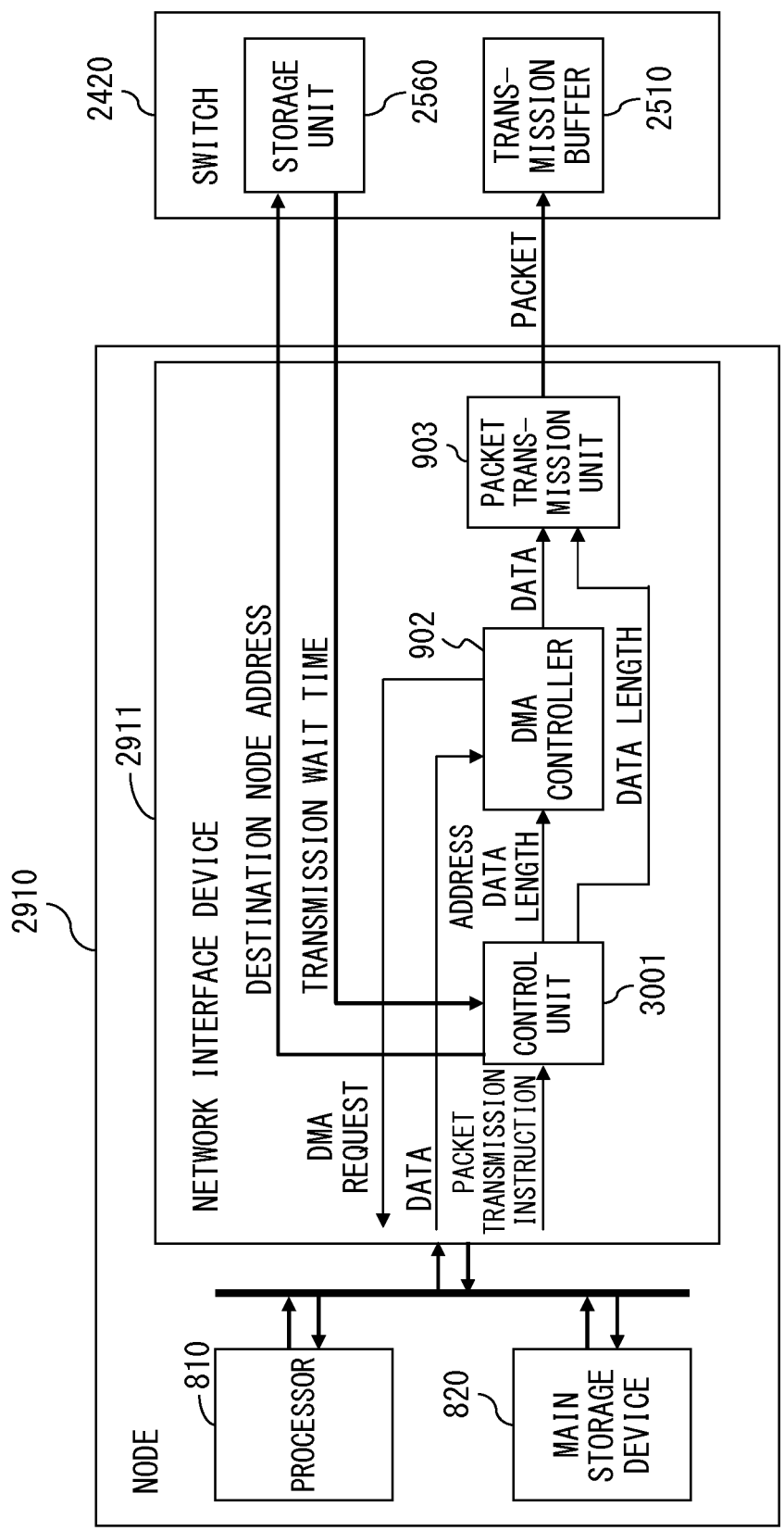
FIG. 30 illustrates a specific configuration example of the node illustrated in FIG. 29.

FIG. 30 illustrates a specific configuration example of the node 2910 illustrated in FIG. 29. The node 2910 includes the processor 810, the main storage device 820, and the network interface device 2911. The network interface device 2911 includes a control unit 3001, the DMA controller 902, and the packet transmission unit 903. However, FIG. 30 does not intend that the network interface device 2911 includes only the components illustrated in FIG. 30. The network interface device 2911 may include a function such as a packet reception function, or the like.

Upon receipt of a packet transmission instruction from the processor 810, the control unit 3001 executes the packet transmission process by operating the DMA controller 902 and the packet transmission unit 903. The control unit 3001 measures a communication bandwidth between the local node and the destination node based on a transmission wait time of the packet, which is obtained from the wait time table 3100 stored in the storage unit 2560 included in the switch 2420. According to the measurement, the control unit 3001 may decide the size of the packet transmitted to the destination node.

The control unit 3001 may quantitatively obtain a data length of the packet transmitted to the destination node with a mathematical expression that represents a relationship between the measurement of the communication bandwidth of the local node based on the transmission wait time and the data length decided according to the measurement.

Figure 31:
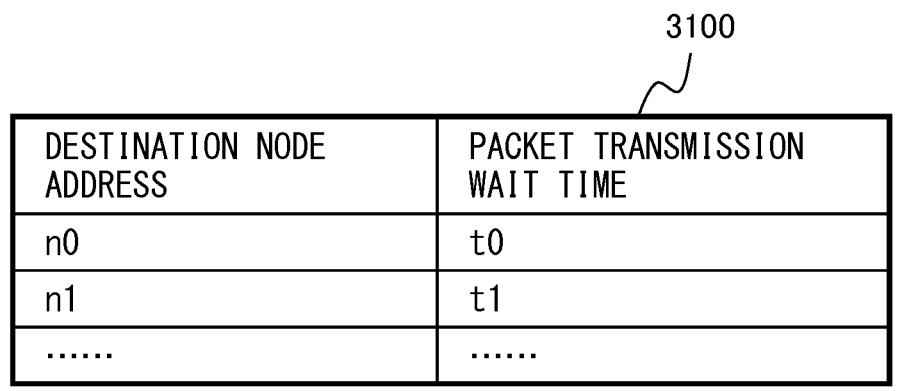
FIG. 31 illustrates an example of a wait time table stored in a storage unit of the switch illustrated in FIG. 30.

FIG. 31 illustrates an example of the wait time table 3100 used in this modification example. The wait time table 3100 illustrated in FIG. 31 stores information including a destination node address, which is information for identifying a destination node, and a transmission wait time of a packet transmitted to the destination node. As the transmission wait time, a transmission wait time of the newest packet among packets transmitted to a corresponding destination node is set by the counter 2550.

Also in this modification example, the wait time table 2600 illustrated in FIG. 26 is available. However, when the wait time table 2600 is used, it is needed to calculate the average wait time l2 of transmissions to the destination node as illustrated in FIG. 28. Therefore, an influence of latency of a packet transmission is sometimes exerted.

Figure 32:
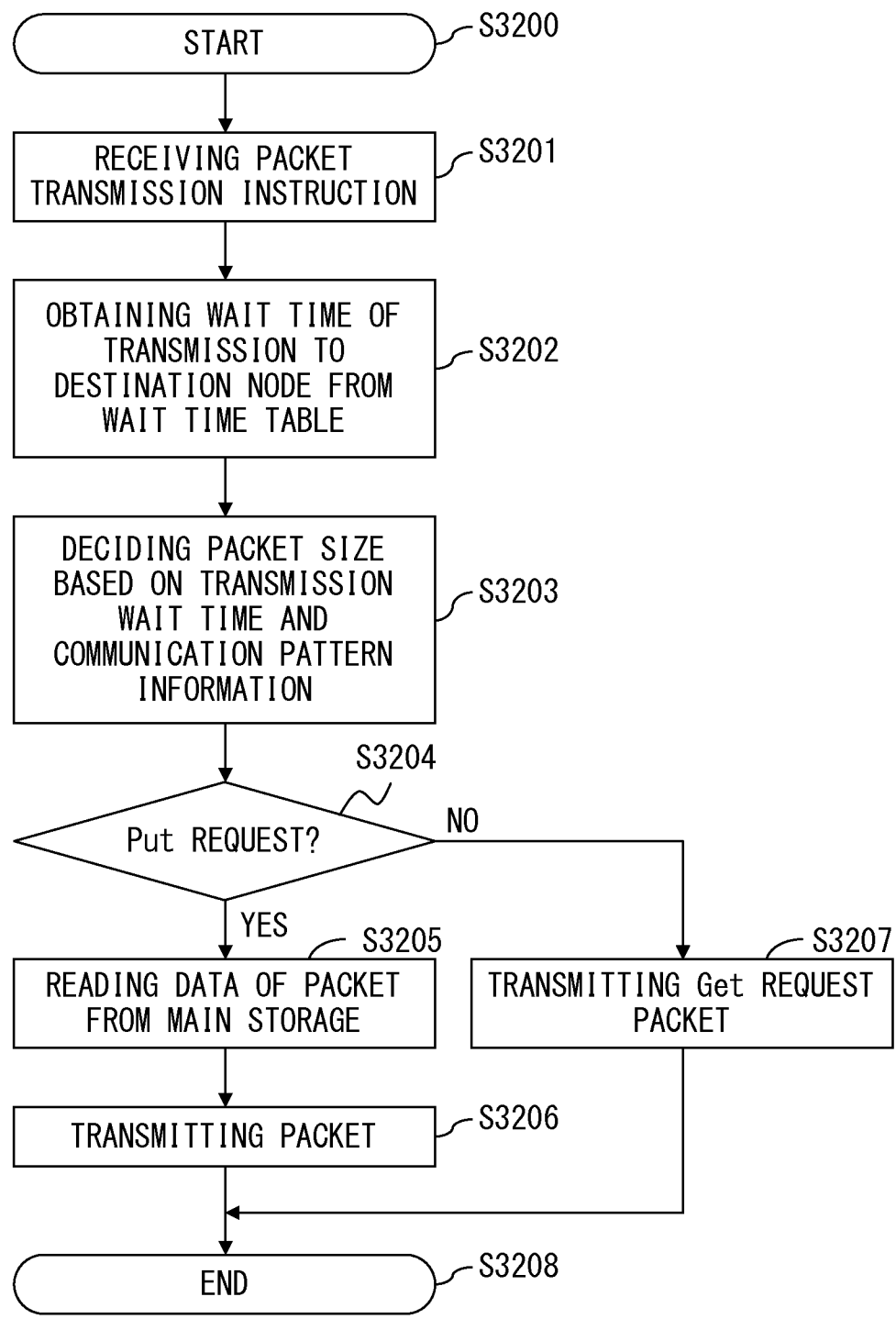
FIG. 32 is a flowchart illustrating a packet transmission process of the parallel computing device 2400 employing the node described with reference to FIG. 30.

FIG. 32 is a flowchart illustrating the packet transmission process of the parallel computing device 2400 employing the node 2910 described with reference to FIG. 30. Since a process of step S3201 is substantially the same as that of step S1001 illustrated in FIG. 10, an explanation of this step is omitted.

In step S3202, upon receipt of a packet transmission instruction from the processor 810, the control unit 3001 obtains a wait time of a transmission of a packet to a destination node from the wait time table 3100 stored in the storage unit 2560 included in the switch 2420.

In step S3203, the control unit 3001 decides a size of the packet transmitted to the destination node based on the wait time of the transmission, which is obtained in step S3202, and a communication pattern. Since a process of steps S3204-S3207 is substantially the same as that of steps S1004-S1007 illustrated in FIG. 10, explanations of these steps are omitted.

Figure 33:
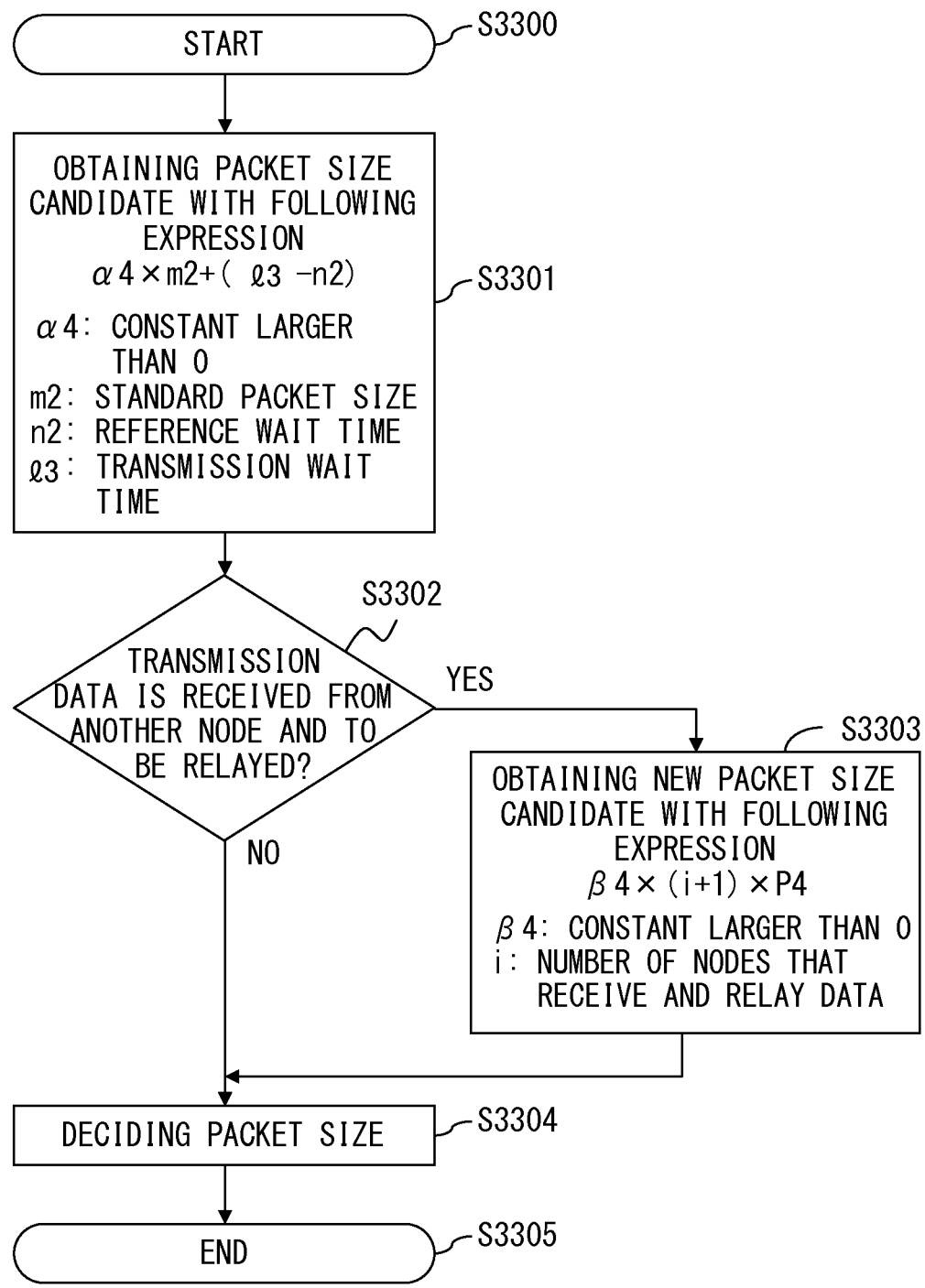
FIG. 33 is a flowchart illustrating a specific process of step S3202 illustrated in FIG. 32.

FIG. 33 is a flowchart illustrating details of the packet size decision process (step S3203) according to this modification example. In step S3301, the control unit 3001 calculates a packet size candidate with the following expression.

$$\alpha 4 \times m2 + (l3 - n2) \tag{13}$$

where α4 is a constant, which is larger than 0, for adjusting a packet size, m2 is a standard packet size, n2 is a reference wait time, and l3 is the wait time of a transmission to a destination node, which is obtained in step S3202. As m2, a size of a packet transmitted when the wait time is equal to the reference wait time, or the like is available. As the reference wait time n2, for example, an average wait time of transmissions of packets to the same destination node, which are measured in advance in all nodes by performing various types of communications, or the like is available.

When the transmission data is received from a different node and to be relayed in step S3302 ("YES" in step S3302), the process of the control unit 3001 moves to step S3303. In this case, the control unit 3001 calculates a new packet size candidate with the following expression (step S3303).

$$\beta 4 \times (i+1) \times P4 \tag{14}$$

where β4 is a constant, which is larger than 0, for adjusting a packet size, i is the number of nodes that receive and relay data, and P4 is the packet size candidate calculated in step S3301.

After the control unit 3001 calculates the new packet size candidate with the expression (14), the process of the control unit 3001 moves to step S3304. Alternatively, if the transmission data is not the data that is received from the different node and to be relayed to the destination node in step S3302 ("NO" in step S3302), the process of the control unit 3001 moves to step S3304.

In step S3304, if the packet size candidate obtained in step S3301 or S3303 is equal to or larger than an available maximum value, the control unit 3001 decides the available maximum value is the packet size. Alternatively, if the packet size candidate obtained in step S3301 or S3303 is equal to or smaller than an available minimum value, the control unit 3001 decides the available minimum value is the packet size. Further alternatively, if the packet size candidate obtained in step S3301 or S3303 is larger than the available minimum value and smaller than the available maximum value, the control unit 3001 decides the packet size candidate is the packet size.

Upon termination of the above described process, the control unit 3001 ends the packet size decision process (step S3305).

The control unit 3001 included in the above described node 2911 may control a packet transmission interval by designating the packet transmission interval for the packet transmission unit 903 like the control unit 1211 included in the node 1210 illustrated in FIG. 12. In this case, the control unit 3001 may execute the process of steps S1303-S1307 illustrated in FIG. 13 as a replacement for that of steps S3203-S3207 illustrated in FIG. 32.

As a packet used in an inter-node communication in the above described parallel computing devices 600, 700, 2000, and 2400, a packet 3400 illustrated in FIG. 34 is available. The packet 3400 illustrated in FIG. 34 includes a packet type, a remote node address, a local node address, and a payload. The packet type is information indicating a type of a packet such as a packet used for a Put request, a Get request, or the like. The remote node address is information indicating an address of a destination node of a packet. The local node address is information indicating an address of a source node of the packet. The payload stores data of a message transmitted from the source node to the destination node. The message may be partitioned when needed.

Figure 35:
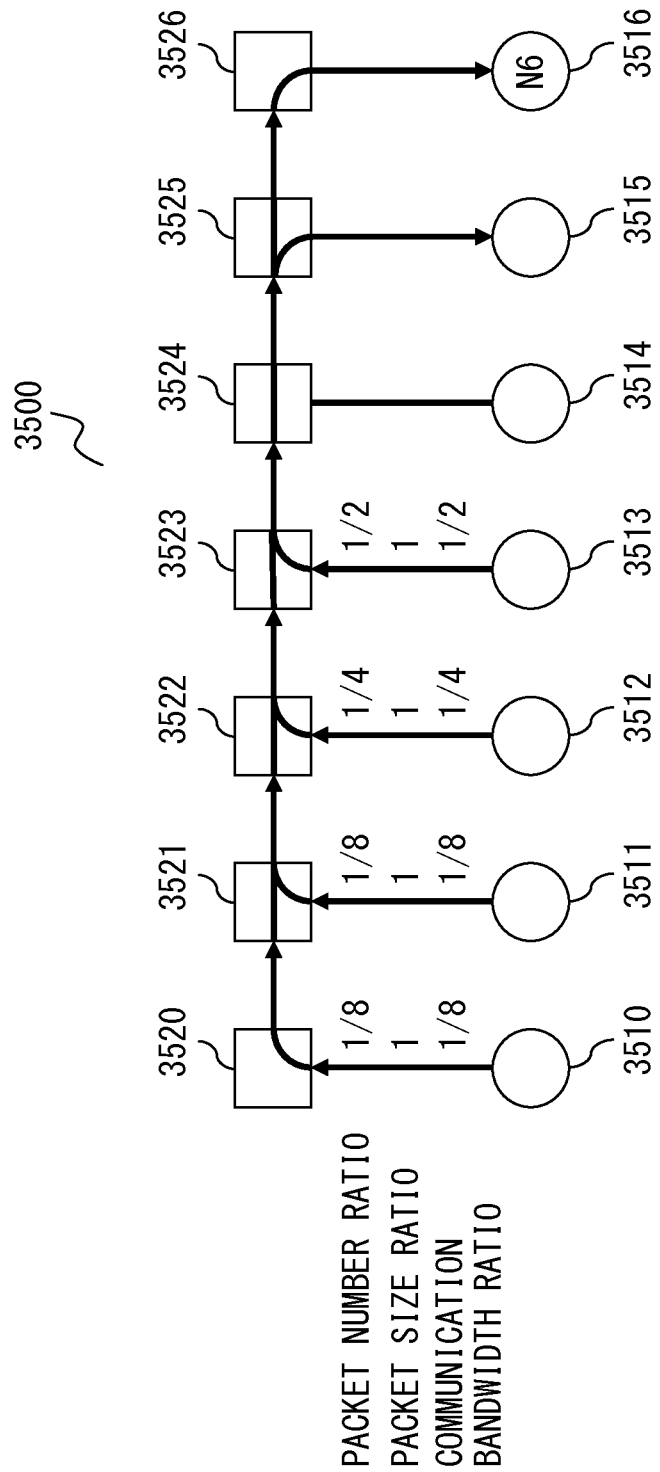
FIG. 35 illustrates a parallel computing device 3500 for comparison with the parallel computing device 700.

An example of effects of the parallel computing device according to this embodiment is described below. For instance, a parallel computing device 3500 illustrated in FIG. 35 is considered. The parallel computing device 3500 has a configuration similar to that of the parallel computing device 100 illustrated in FIG. 1. However, the number of switches and that of nodes are assumed to be seven in the parallel computing device 3500 according to this embodiment for comparison with the parallel computing device 100.

The parallel computing device 3500 illustrated in FIG. 35 is an example of a case where nodes 3510-3513 perform a Gather communication with a node 3515 or 3516. A switch 3523 performs arbitration such that packet number ratios become equal. Accordingly, a ratio of the number of packets that the switch 3523 receives from the node 3513 and transmits to the destination node, and a ratio of the number of packets that the switch 3523 receives from a switch 3522 and transmits to the destination node result in 1/2, respectively. Similarly, a ratio of the number of packets that the switch 3522 receives from the node 3512 and transmits to the destination node, and a ratio of the number of packets that the switch 3522 receives from a switch 3521 and transmits to the destination node result in 1/2, respectively. Moreover, a ratio of the number of packets that the switch 3521 receives from the node 3511 and transmits to the destination node, and a ratio of the number of packets that the switch 3521 receives from a switch 3520 and transmits to the destination node result in 1/2, respectively.

As a result, the ratios of the numbers of packets that the nodes 3513, 3512, 3511, and 3510 respectively transmit to the destination node, namely, packet number ratios result in 1/2, 1/4, 1/8, and 1/8, respectively.

When sizes of packets that the nodes 3513, 3512, 3511, and 3510 respectively transmit are the same, the packet number ratios result in communication bandwidth ratios unchanged. In this case, arrivals of data transmitted from the nodes 3510 and 3511 far from the nodes 3515 and 3516, which are destination nodes, to the destination nodes are later than that of data transmitted from the node 3513 close to the nodes 3515 and 3516 to the destination nodes.

Figure 36:
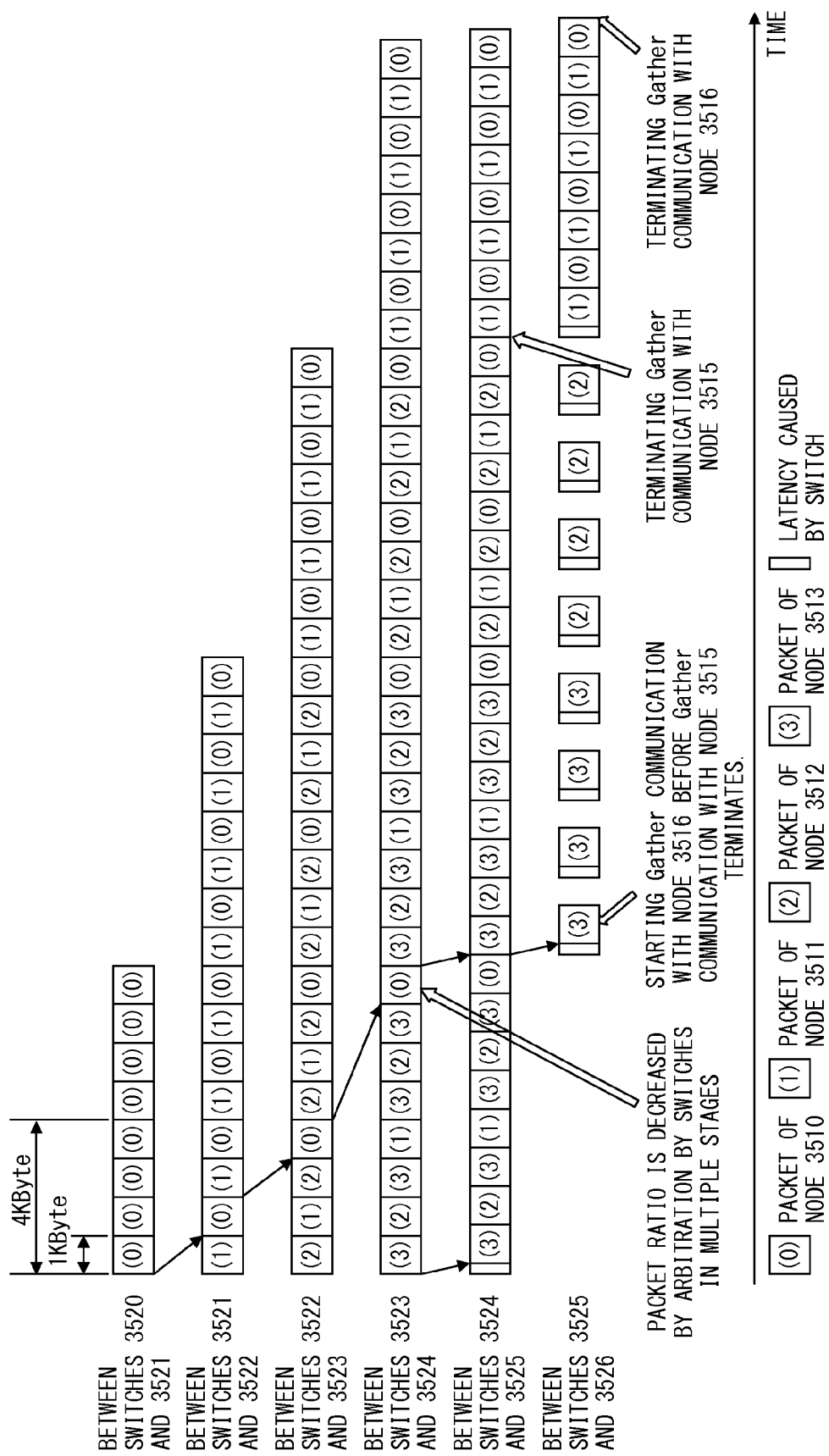
FIG. 36 is a time chart of packets that flow in a direction toward a destination node among switches of the parallel computing device 3500 illustrated in FIG. 35.

FIG. 36 is a time chart of packets that flow in the direction toward the destination nodes among the switches of the parallel computing device 3500 illustrated in FIG. 35. FIG. 36 illustrates an example of a case of a communication pattern in which the nodes 3510-3513 perform a Gather communication with the nodes 3515 and 3516 in this order. Assume that the nodes 3510-3513 partition data of a message size of 4K bytes into 1K bytes and transmit the partitioned data to the nodes 3515 and 3516. However, this figure does not intend to limit the partitioned size. Moreover, the switches 3520-3526 may operate with Cut-Through scheme. Namely, it is assumed that the switches 3520-3526 transmit a received packet or an already received packet to the next switch upon receipt of the beginning of the packet from another switch or the like.

☐ denoted with (0) in FIG. 36 represents a packet that the node 3510 transmits to the destination node. Similarly, ☐ denoted with (1), (2), and (3) represent packets that the node 3511, 3512, and 3513 respectively transmit to the destination node. This also applies to FIGS. 39, 41, and 44.

In FIG. 36, for example, the ratio of the number of packets that the node 3510 transmits to the destination node is low on a path between the switches 3523 and 3524 due to arbitration of the switches in the multiple stages. Also the ratios of the numbers of packets that the nodes 3511 and 3512 transmit to the destination node are low on the path between the switches 3523 and 3524.

In the meantime, the ratio of the number of packets that the node 3513 transmits to the destination node on the path between the switches 3523 and 3524 is high. Namely, a communication bandwidth available to the node 3513 on the path between the switches 3523 and 3524 is wide. Accordingly, the node 3513 has started transmitting a packet to the node 3516 before the nodes 3510-3512 terminate the transmission of all the packets to the node 3515. Namely, the node 3513 has started a Gather communication with the node 3516 before the nodes 3510-3512 terminate a Gather communication with the node 3515. As a result, the transmission of packets from the nodes 3510-3513 to the node 3515, namely, the Gather communication of the nodes 3510-3513 with the node 3515 is caused to wait.

As described above, an arrival of a packet transmitted from a node having a large number of hops to a destination node is later than that of a packet transmitted from a node having a small number of hops to the destination node.

Figure 37:
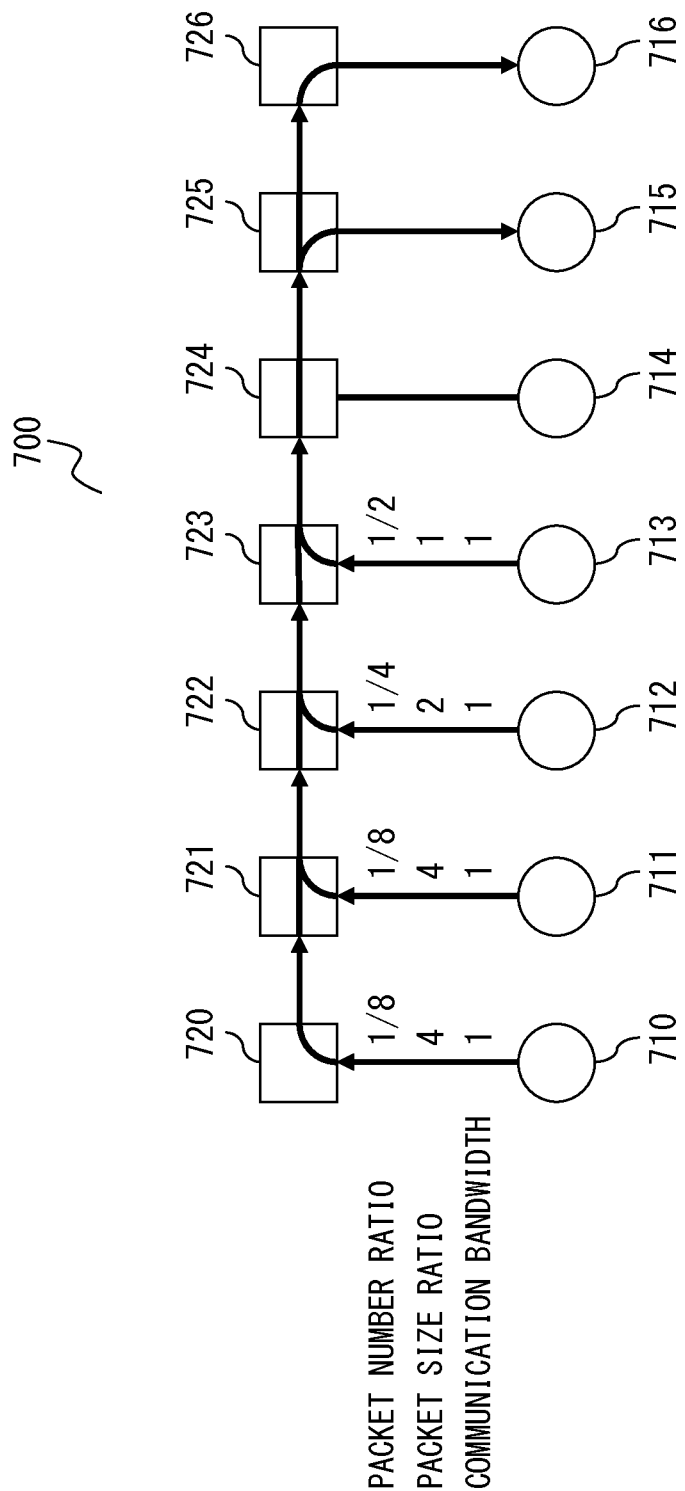
FIG. 37 illustrates an example of a case where nodes 710-713 perform a Gather communication with a node 715 or 716 in the parallel computing device 700.

FIG. 37 illustrates an example of a case where the nodes 710-713 perform a Gather communication with the node 715 or 716 in the parallel computing device 700 according to this embodiment.

The parallel computing device 700 increases the size of a packet transmitted from a node having a large number of hops to a destination node, for example, with the process of step S1102 described with reference to FIG. 11. In FIG. 37, packet size ratios of the nodes 710 and 711 having a large number of hops are 4. Moreover, a packet size ratio of the node 713 having a small number of hops is 1. As a result, ratios of communication bandwidths used by the switches 720-723 are equal. Consequently, none of the communication bandwidths of the nodes cause a bottleneck. Moreover, timing of an arrival of a packet transmitted from a node having a large number of hops to a destination node and that of an arrival of a packet transmitted from a node having a small number of hops to the destination node are equalized. The packet size ratios illustrated in FIG. 37 are merely the examples for the explanation. The packet size ratios may be obtained, for example, with the process of step S1102 illustrated in FIG. 11.

Figure 38:
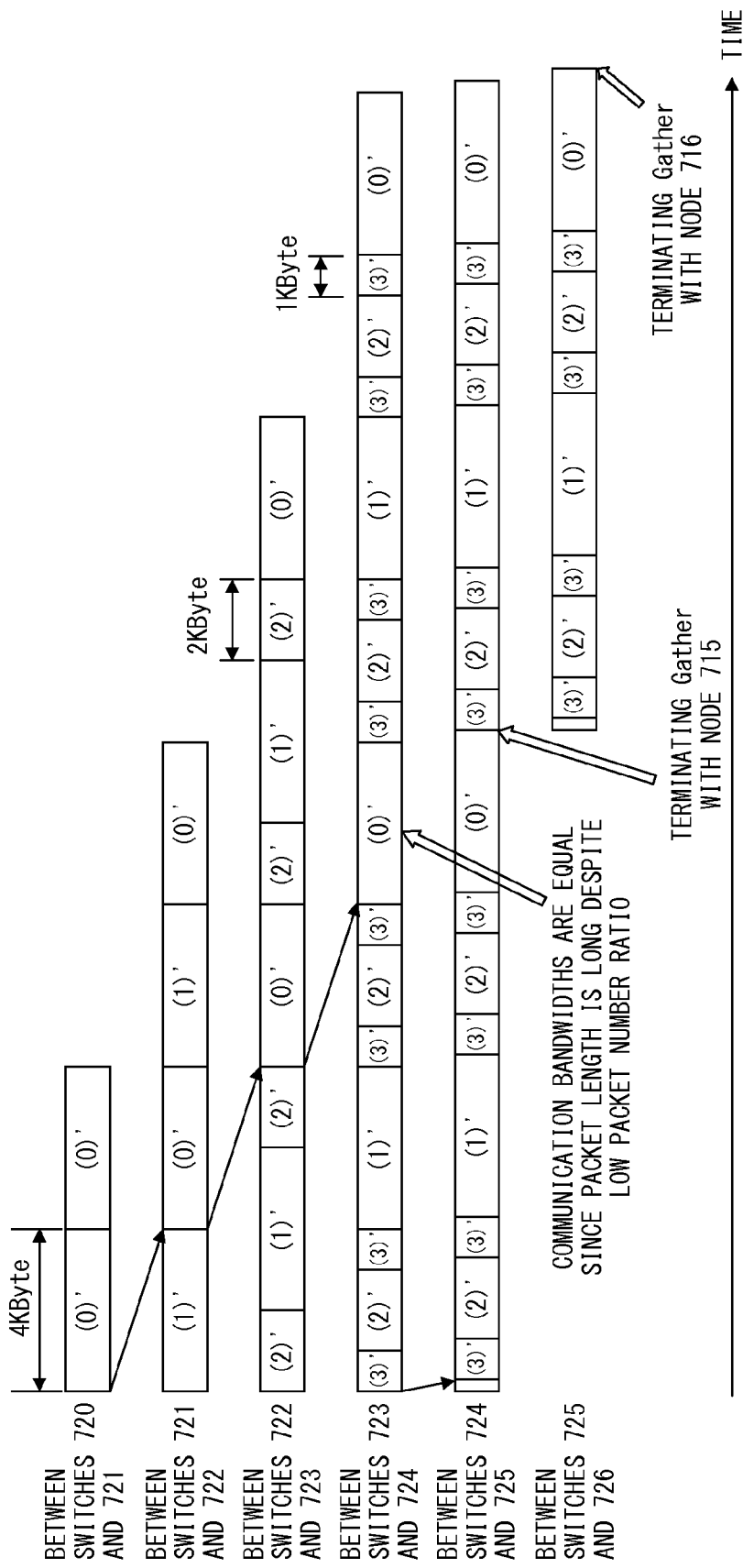
FIG. 38 is a time chart of packets that flow in a direction toward a destination node among switches of the parallel computing device 700 illustrated in FIG. 37.

FIG. 38 is a time chart of packets that flow in the direction toward the destination node among the switches of the parallel computing device 700 illustrated in FIG. 37. FIG. 38 illustrates an example of a case of a communication pattern in which the nodes 710-713 perform a Gather communication with the nodes 715 and 716 in this order. Assume that the nodes 710-713 respectively transmit a message of 4K bytes to the nodes 715 and 716. Also assume that the switches 720-726 are operable with Cut-Through scheme.

☐ denoted with (0)' illustrated in FIG. 38 represents a packet that the node 710 transmits to the destination node. Similarly, ☐ denoted with (1)', (2)', and (3)' respectively represent packets that the nodes 711, 712, and 713 transmit to the destination node. The same also applies to FIGS. 43 and 45.

In FIG. 38, the switches 720-726 perform arbitration such that packet number ratios become equal. Accordingly, the packet number ratios of packets that the nodes 710-713 transmit to the destination node on the path between the switches 723 and 724 are equal to those of packets that the nodes 3510-3513 transmit to the destination node on the path between the switches 3523 and 3524 illustrated in FIG. 36.

However, the size of a packet transmitted from the node 710 or 711 having a low packet number ratio is larger than that of a packet transmitted from the node 713 or the like having a high packet number ratio. For instance, in the example of FIG. 38, the sizes of the packets transmitted from the nodes 710 and 711 to the destination node are 4K bytes, that of the packet transmitted from the node 712 to the destination node is 2K bytes, and that of the packet transmitted from the node 713 to the destination node is 1K bytes. As a result, the lengths of time that the nodes 710-713 respectively use a path, for example, the path between the switches 723 and 724 per unit time become equal. Therefore, ratios of communication bandwidths respectively used by the nodes 710-713 become equal.

Consequently, for example, as is proved from the time chart of packets on the path between the switches 725 and 726 of FIG. 38, an arrival of the packet transmitted from the node 710 or 711 having a large number of hops to the destination node 716, and that of the packet transmitted from the node 713 having a small number of hops to the 716 are equalized.

FIGS. 35 to 38 have referred to the example where the message of 4K bytes respectively transmitted from the nodes is partitioned into packets of a specified size and the packets are transmitted to the destination node. In the meantime, also when the message of 4K bytes respectively transmitted from the nodes is transmitted to the destination node without being partitioned, the effects described with reference to FIG. 38 may be produced.

Figure 39:
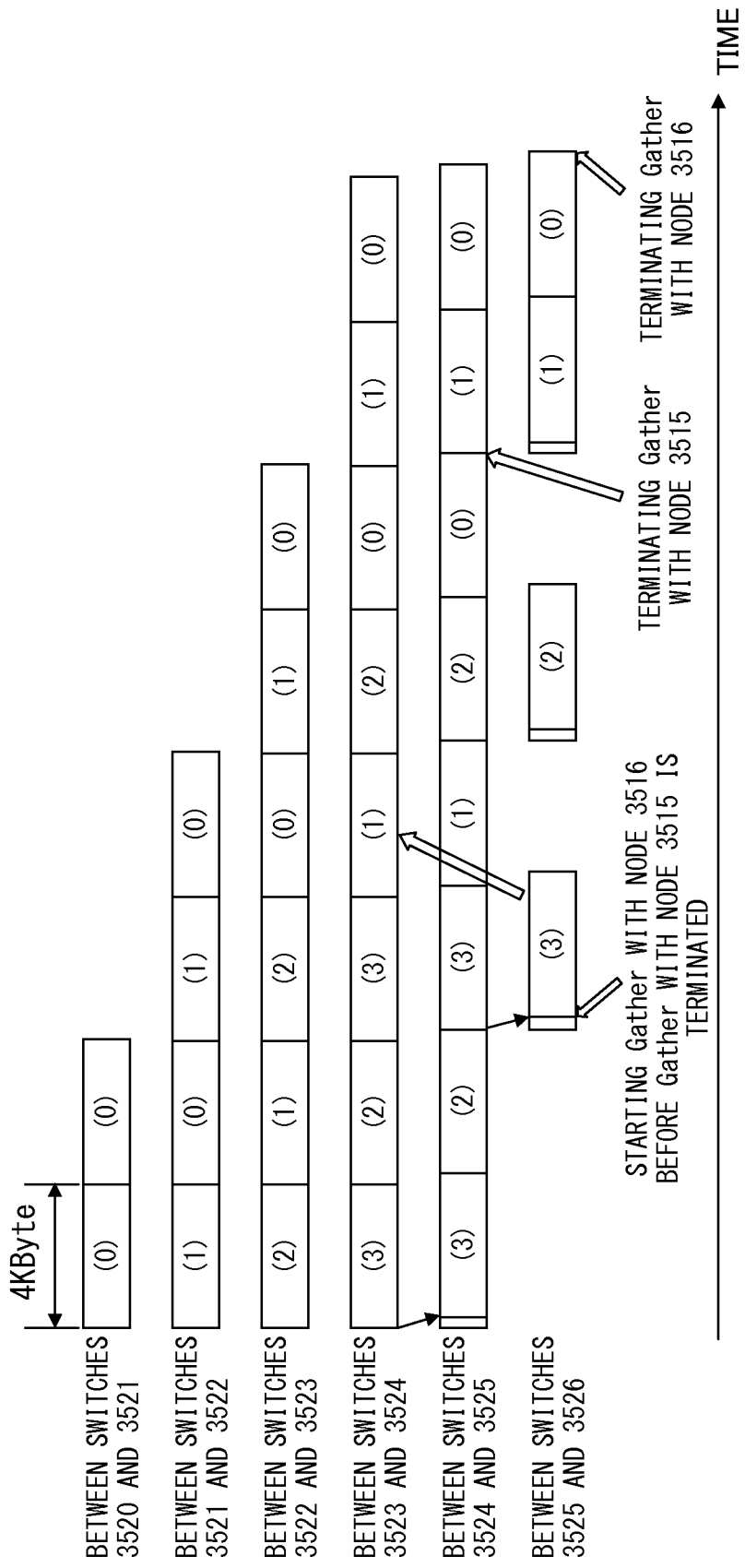
FIG. 39 is a time chart of packets that flow in a direction toward a destination node among switches when the nodes of the parallel computing device 3500 illustrated in FIG. 35 respectively transmit a message to the destination node without partitioning the message.

FIG. 39 is a time chart of packets that flow in the direction toward the destination node among the switches when the nodes of the parallel computing device 3500 illustrated in FIG. 35 transmit a message without partitioning the message.

Also when the nodes respectively transmit the message to the destination node without partitioning the message, for example, a ratio of the number of packets that the node 3510 transmits to the destination node is low on the path between the switches 3523 and 3524 due to arbitration performed by the switches in the multiple stages. Also ratios of the number of packets that the nodes 3511 and 3512 respectively transmit to the destination node are low on the path between the switches 3523 and 3524.

In the meantime, a ratio of the number of packets that the node 3513 transmits to the destination node on the path between the switches 3523 and 3524 is high. Namely, a communication bandwidth available to the node 3513 on the path between the switches 3523 and 3524 is wide. Accordingly, the node 3513 has started transmitting a packet to the node 3516 before the nodes 3510-3512 do not complete the transmission of all the packets to the node 3515. Namely, the node 3513 has started a Gather communication with the node 3516 before the nodes 3510-3512 terminate a Gather communication with the node 3515. As a result, transmissions of packets from the nodes 3510-3513 to the node 3515, namely, the Gather communication of the nodes 3510-3515 with the node 3515 is caused to wait.

When the nodes respectively transmit a message to the destination node without partitioning the message into packets of a specified size, an arrival of a packet transmitted from a node having a large number of hops to the destination node is later than that of a packet transmitted from a node having a small number of hops to the destination node. Accordingly, even when each of the nodes transmits a message to the destination node without partitioning the message into packets of a specified size, the effects described with reference to FIG. 38 can be produced by using the parallel computing device 700 according to this embodiment.

The example of the effects of the parallel computing device 700 according to the embodiments in the collective communication has been described above. An example of the effects of the parallel computing device 700 according to the embodiments in a case where a communication other than a collective communication is performed is described below.

Figure 40:
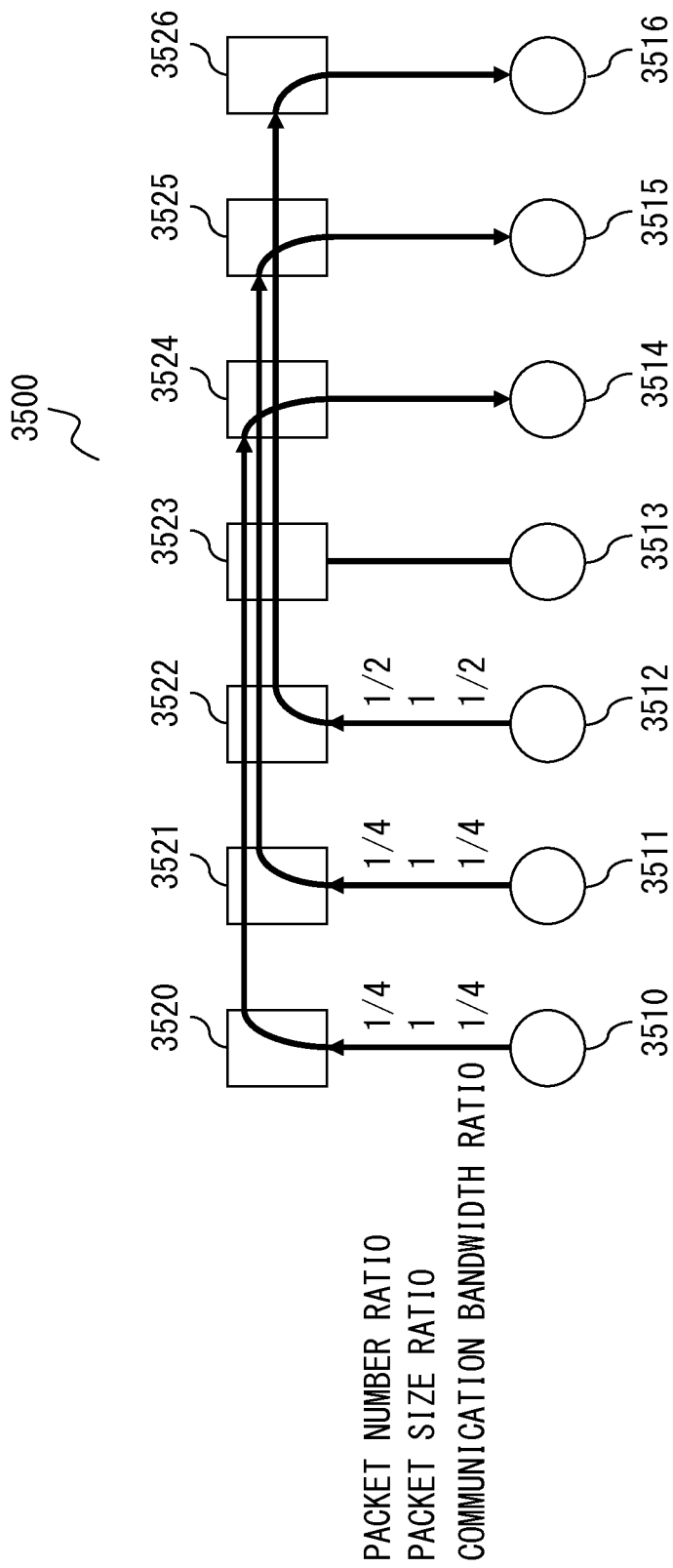
FIG. 40 illustrates an example of a case where the nodes 3510-3512 of the parallel computing device 3500 illustrated in FIG. 35 perform a communication with corresponding destination node separate by four hops.

FIG. 40 illustrates an example of a case where the nodes 3510-3512 of the parallel computing device 3500 illustrated in FIG. 35 perform a communication with each destination node separate by four hops. The switch 3522 performs arbitration such that the packet number ratios become equal. Accordingly, the ratio of the number of packets that the switch 3522 receives from the node 3512 and transmits to the destination node, and the ratio of the number of packets that the switch 3522 receives from the switch 3521 and transmits to the destination node are 1/2, respectively. Similarly, the ratio of the number of packets that the switch 3521 receives from the node 3511 and transmits to the destination node, and the ratio of the number of packets that the switch 3521 receives from the switch 3520 and transmits to the destination node are 1/2, respectively. Eventually, the ratios of the number of packets that the nodes 3512, 3511, and 3510 respectively transmit to the destination node, namely, the packet number ratios result in 1/2, 1/4, and 1/4, respectively. Also communication bandwidth ratios of the nodes 3512, 3511, and 3510 result in 1/2, 1/4, and 1/4, respectively.

In this case, the communication bandwidth of the node 3512 is wider than those of the nodes 3510 and 3511. Accordingly, in the switch 3522, the length of time needed from when a packet that the node 3510 or 3511 transmits to the destination node is received until the packet that the node 3510 or 3511 transmits to the destination node is transmitted becomes longer than the length of time needed from when a packet that the node 3512 transmits to the destination node is received until the packet that the node 3512 transmits to the destination node is transmitted. As a result, for example, even when the size of a message that the node 3510 transmits to the destination node is smaller than that of a message that the node 3512 transmits to the destination node, timing of the message that the node 3512 transmits arrives at the destination node is sometimes later than timing of the message that the node 3510 transmits arrives at the destination node.

Figure 41:
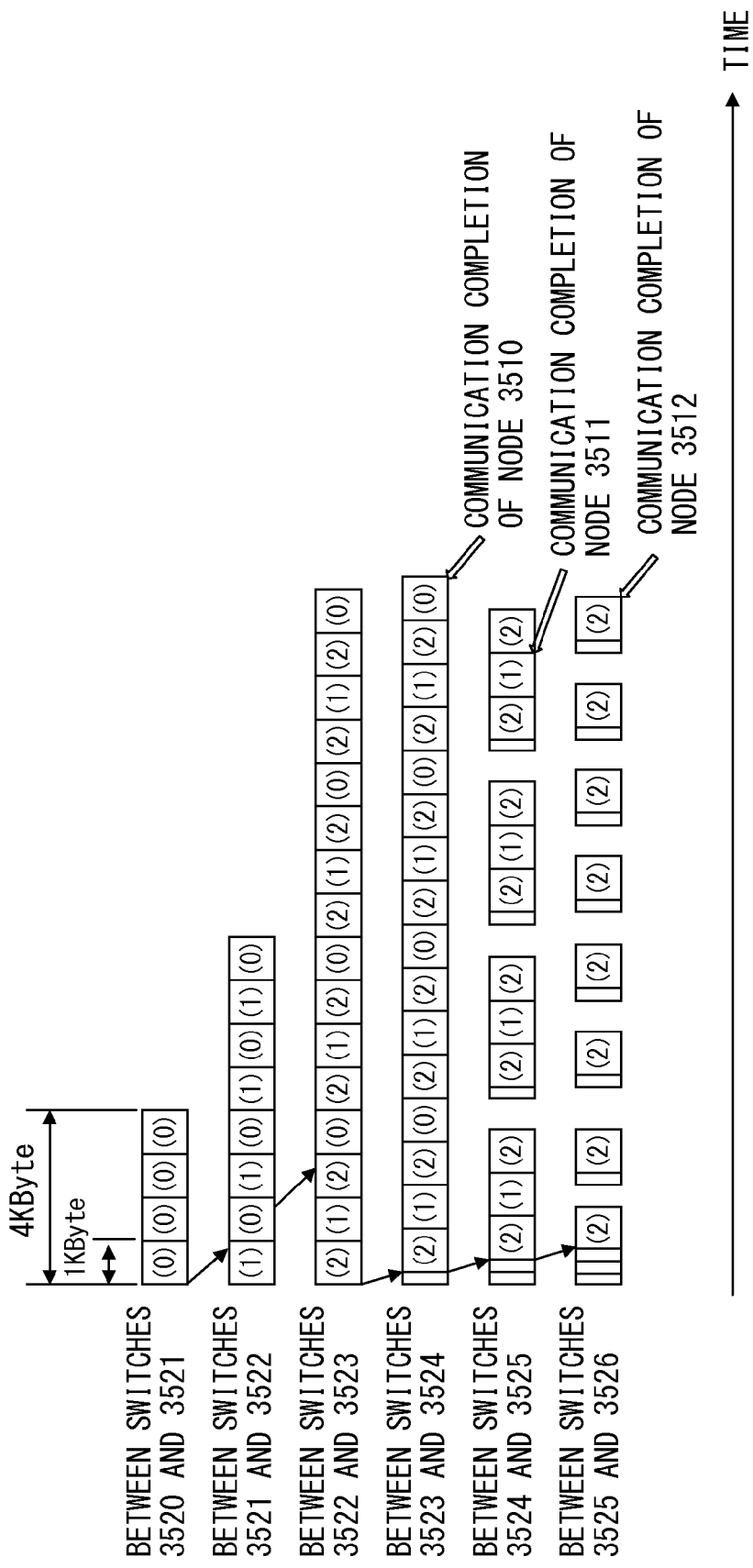
FIG. 41 is a time chart of packets that flow in the direction toward corresponding destination node among the switches of the parallel computing device 3500 illustrated in FIG. 40.

FIG. 41 is a time chart of packets that flow in the direction toward the destination node among the switches of the parallel computing device 3500 illustrated in FIG. 40. Assume that the nodes 3510 and 3511 respectively partition a message of 4K bytes into packets of 1K bytes, and transmit the packets to the destination nodes 3514 and 3515 each separate by four hops. Also assume that the node 3512 partitions a message of 8K bytes into packets of 1K bytes, and transmits the packets to the node 3516 separate by four hops.

In FIG. 41, for example, the ratio of the number of packets that the node 3510 transmits to the destination node is low on a path between the switches 3522 and 3523 due to arbitration performed by the switches in the multiple stages. In the switch 3522, the length of time needed from when a packet that the node 3510 transmits to the destination node 3514 is received until the packet is transmitted to the destination node 3514 is longer than the length of time needed from when a packet that the node 3512 transmits to the destination node 3516 is received until the packet is transmitted to the destination node 3516. As a result, an arrival of the message that the node 3510 transmits to the destination node 3514 is later than an arrival of the message that the node 3512 transmits to the destination node 3516 although the size of the message that the node 3510 transmits to the destination node is smaller than the size of the message that the node 3512 transmits to the destination node.

Figure 42:
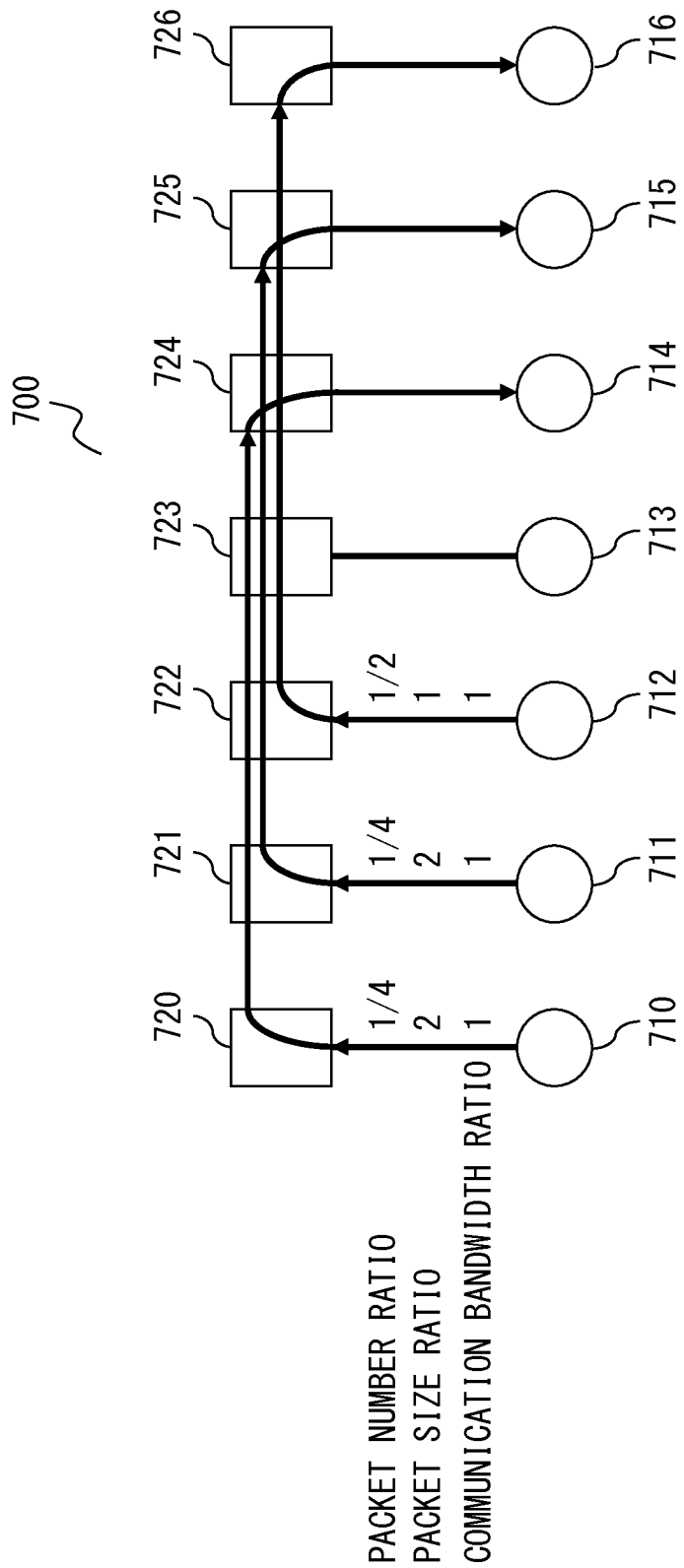
FIG. 42 illustrates an example of a case where the nodes 710 to 712 perform a communication with corresponding destination node separate by four hops in the parallel computing device 700.

In the meantime, FIG. 42 illustrates an example of a case where the nodes 710-712 perform a communication with each destination node separate by four hops in the parallel computing device 700 according to the embodiments. The parallel computing device 700 increases the size of a packet that a node having a large number of hops up to a destination node, namely, a node having a low packet number ratio transmits to the destination node, for example, with the process of step S1102 described with reference to FIG. 11. Thus, the packet size ratio of the packet that the node having a low packet number ratio transmits to the destination node increases. For example, the packet size ratios of the nodes 710 and 711 having a low packet number ratio are respectively 2 in FIG. 42. As a result, ratios of communication bandwidths used by the nodes 710-712 become equal. Accordingly, none of the communication bandwidths of the nodes cause a bottleneck.

The packet size ratios illustrated in FIG. 42 are merely the examples for the explanation. The packet size ratios may be obtained, for example, with the process of step S1102 illustrated in FIG. 11.

Figure 43:
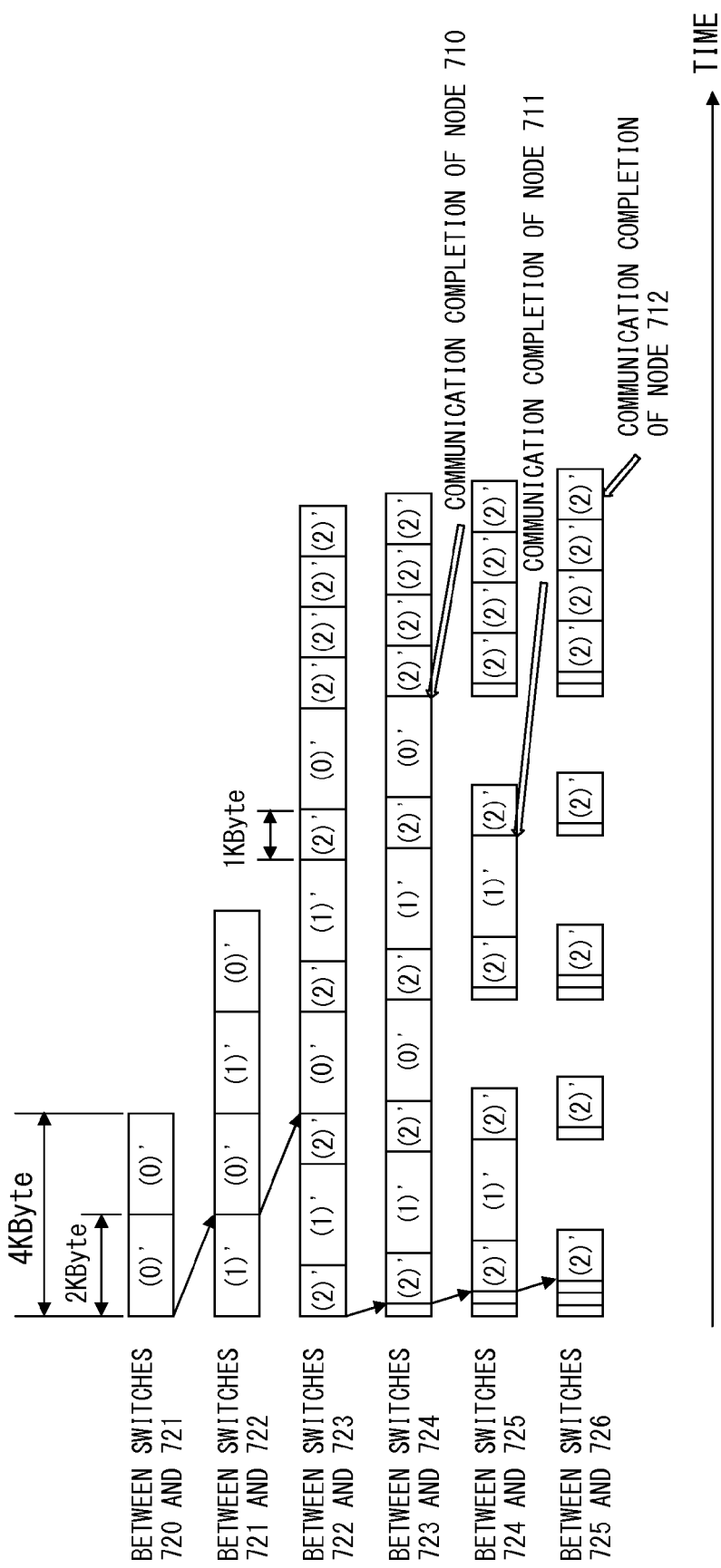
FIG. 43 is a time chart of packets that flow in the direction toward corresponding destination node among the switches of the parallel computing device 700 illustrated in FIG. 42.

FIG. 43 is a time chart of packets that flow in the direction toward the destination node among the switches of the parallel computing device 700 illustrated in FIG. 42. FIG. 43 illustrates an example of a case of a communication pattern in which the nodes 710-712 perform a communication with corresponding destination nodes 714-716 separate by four hops. Assume that the nodes 710 and 711 change the size of packets of a message of 4K bytes when needed and transmit the packets to the nodes 714 and 715, respectively. Also assume that the node 712 change the size of packets of a message of 8K bytes when needed and transmits the packets to the node 716.

As illustrated in FIG. 43, the size of packets that the node 710 or 711 having a low packet number ratio transmits to the destination node is larger than the size of packets that the node 712 having a high packet number ratio transmits to the destination node. For instance, in the example of FIG. 43, the sizes of packets that the nodes 710 and 711 respectively transmit to the destination nodes 714 and 715 are 2K bytes. Moreover, the size of packets that the node 712 transmits to the destination node 716 is 1K bytes. As a result, the lengths of time during which the nodes 710-712 respectively use a path, for example, the path between the switches 722 and 723 per unit time become equal. Thus, ratios of communication bandwidths respectively used by the nodes 710-712 become equal. Consequently, for example, the following can be said from the timing chart with respect to the paths between the switches 723 and 724, between the switches 724 and 725, and between the switches 725 and 726. Namely, arrival timing of the message that the node 710 transmits to the destination node 714, arrival timing of the message that the node 711 transmits to the destination node 715, and arrival timing of the message that the node 712 transmits to the destination node 716 are distributed and equalized.

FIGS. 40-43 illustrate the example where the switches are operable with Cut-Through scheme. Also when the switches are operable with Store-and-Forward scheme, the effects described with reference to FIG. 43 may be produced. In the Store-and-Forward scheme, a switch transmits a packet received by the local switch or an already received packet to the next switch after the switch receives all packets transmitted from another switch or the like.

Figure 44:
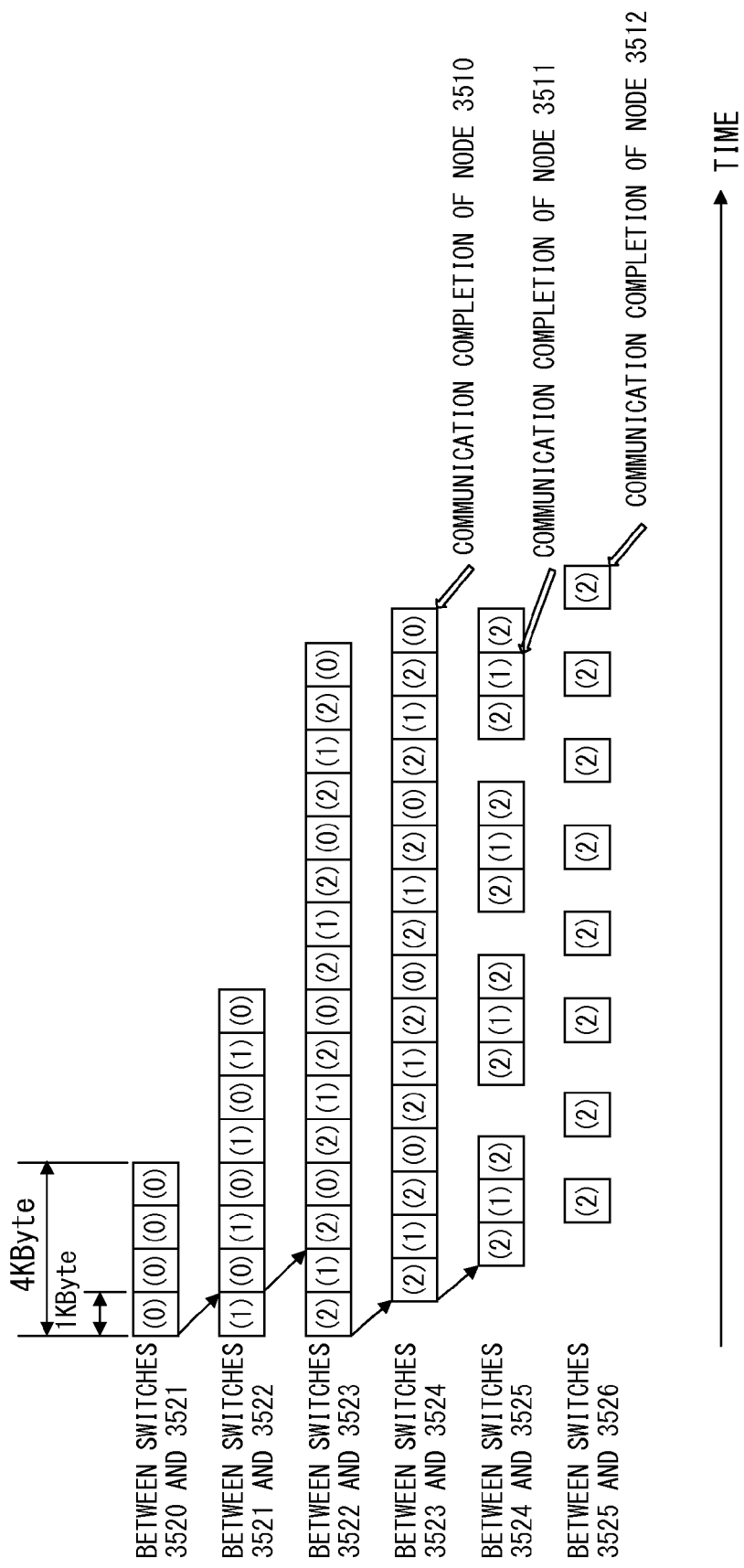
FIG. 44 is a time chart of packets that flow in the direction toward corresponding destination node among the switches when the nodes of the parallel computing device 3500 illustrated in FIG. 40 respectively operate with Store-and-Forward scheme.

FIG. 44 is a time chart of packets that flow in the direction toward the destination node among the switches in a case where the nodes of the parallel computing device 3500 illustrated in FIG. 40 operate with Store-and-Forward scheme.

Also when the nodes 3510-3516 operate with Store-and-Forward scheme, for example, the ratio of the number of packets that the node 3510 transmits to the destination node is low on the path between the switches 3522 and 3523 due to arbitration performed by the switches in the multiple stages similarly to FIG. 41. In the switch 3522, the length of time needed from when a packet that the node 3510 transmits to the destination node 3514 is received until the packet is transmitted to the destination node 3514 is longer than the length of time needed from when a packet that the node 3512 transmits to the destination node 3516 is received until the packet is transmitted to the destination node 3516. As a result, an arrival of the message that the node 3510 transmits to the destination node 3514 is later than an arrival of the message that the node 3512 transmits to the destination node 3516 although the size of the message that the node 3510 transmits to the destination node 3514 is smaller than the size of the message that the node 3512 transmits to the destination node 3516.

FIG. 45 is a time chart of packets that flow in the direction toward the destination node among the switches in a case where the nodes of the parallel computing device 700 illustrated in FIG. 42 operate with Store-and-Forward scheme.

If a size of a received packet is large in the case where the switches 720-726 operate with Store-and-Forward scheme, a time period, such as a section A illustrated in FIG. 45, during which a packet cannot be transmitted to the next switch while reception of packets is waited to be complete, occurs. However, the same operations as FIG. 43 apply to FIG. 45 except for this point.

For example, the size of a packet that the node 710 or 711 having a low packet number ratio transmits to the destination node is larger than the size of a packet that the node 712 having a high packet number ratio transmits to the destination node. For instance, in the example of FIG. 45, the sizes of packets that the nodes 711 and 711 respectively transmit to the destination nodes 714 and 715 are 2K bytes. Moreover, the size of a packet that the node 712 transmits to the destination node 716 is 1K bytes. As a result, the lengths of time during which the nodes 710-712 respectively use a path, for example, the path between the switches 722 and 723 per unit time become equal. Therefore, ratios of communication bandwidths respectively used by the nodes 710-712 become equal. Consequently, for example, the following can be said from the timing chart with respect to the paths between the switches 723 and 724, between the switches 724 and 725, and between the switches 725 and 726 in FIG. 45. Namely, arrival timing of a packet that the node 710 transmits to the destination node 714, arrival timing of a packet that the node 711 transmits to the destination node 715, and arrival timing of a packet that the node 712 transmits to the destination node 716 are distributed and equalized.

In the above provided explanation, the hop count table 840, the response time table 2030, and the wait time tables 2600 and 3100 may be cited as examples of a communication scheme among the nodes.

Additionally, the control units 901, 1511, and 1711, which execute the process of S1101-S1107 and the like, may be examples of measurement unit. Also the control unit 1211 that executes the process of S1401-S1407 and the like, and the control unit 2103 that executes the process of S2301-S2304 and the like may be examples of the measurement unit. Moreover, the processor 2411 that executes the process of S2801-2803 and the like, and the control unit 3001 that executes the process of S3301-S3304 and the like may be examples of the measurement unit.

Furthermore, the control unit 901 that executes the process of S1004-S1006 and the like, and the control unit 1211 that executes the process of S1304-S1307 and the like may be examples of control unit. Similarly, the control unit 1511 that executes the process of S1604-S1606 and the like, and the control unit 1711 that executes the process of S1904-1906 and the like may be examples of the control unit. Moreover, the control unit 2103 that executes the process of S2207-S2209 and the like, the processor 2411 that executes the process of S2701-S2706 and the like, and the control unit 3001 that executes the process of S3204-S3206 and the like may be examples of the control unit.

For example, if the network configuration is of a torus type or a mesh type, the above described node 710 obtains a packet size with the expression (1). Namely, the node 710 increases the packet size as the number of hops up to a destination node grows. In this case, as the number of hops up to the destination node increases, so does a packet size ratio.

Generally, a packet number ratio decreases as the number of hops up to a destination node increases if the network configuration is of a torus type or a mesh type. In contrast, the node 710 increases the packet size ratio as the number of hops up to a destination node grows. As a result, the node 710 performs operations such that an arrival time of a packet transmitted from the local node to a destination node and those of packets transmitted from other nodes to the destination node are equalized. Also the nodes 711-716 perform substantially the same operations as those of the node 710.

As a result, the nodes 710-716 perform operations such that an arrival time of a packet transmitted from the local node to a destination node and those of packets transmitted from the other nodes to the destination node are equalized even when packet number ratios are decreased by a concentration of a communication such as a collective communication or the like in some of switches.

Figure 5:
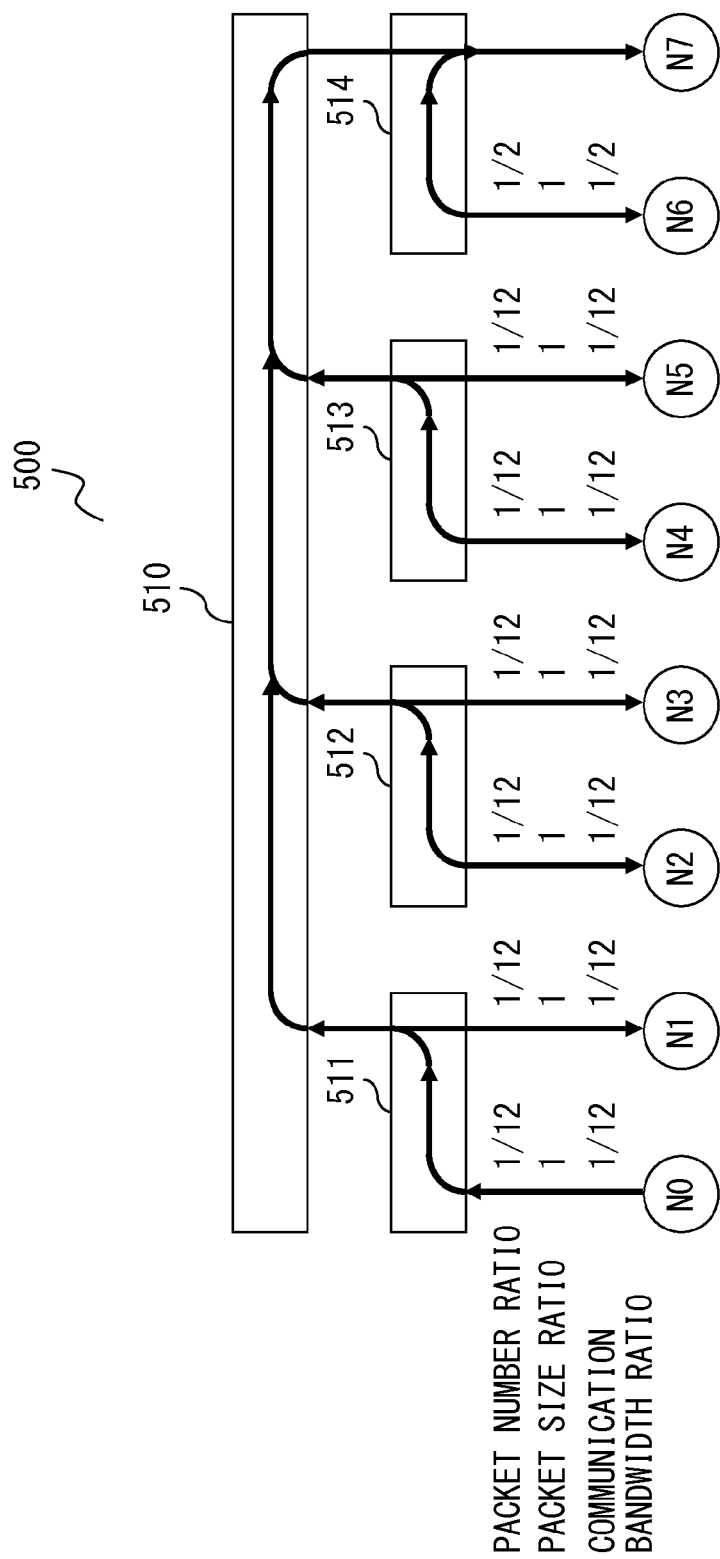
FIG. 5 illustrates a configuration example of a parallel computing device when a network form is of a fat-tree type.

Additionally, if the network configuration is of a mesh type, and if the number of hops up to the destination node is not 1, for example, if the node 710 is not connected to a switch to which the destination node is connected as in the state of the nodes N0 and N7 illustrated in FIG. 5, the node 710 obtains a packet size with the expression (3). In this case, the node 710 increases the packet size.

Generally, if the network configuration is of a mesh type, a packet number ratio of a node other than a node directly connected to a switch to which a destination node is connected decreases. This is as illustrated in FIG. 5.

In contrast, if the network configuration is of a mesh type, and if the node 710 is not connected to the switch to which the destination node is connected, the node 710 increases the packet size ratio. As a result, the 710 performs operations such that an arrival time of a packet transmitted from the local node to the destination node and those of packets transmitted from other nodes to the destination node are equalized.

Also the nodes 711-716 perform substantially the same operations as those of the node 710 if the network configuration is of a mesh type and if the local node is not connected to the switch to which the destination node is connected. As a result, the nodes 710-716 can equalize an arrival time of a packet transmitted from the local node to the destination node and those of packets transmitted from the other nodes to the destination node even when packet number ratios of nodes other than a node directly connected to a switch to which the destination node is connected decrease.

Also the parallel computing device 700 employing the node 1500 or 1700 performs operations similar to those of the parallel computing device 700 employing the nodes 710-716. Accordingly, the parallel computing device 700 employing the node 1500 or 1700 is able to perform an inter-node communication that does not degrade communication performance even when a communication concentrates on some of nodes like a collective communication or the like. Moreover, the parallel computing device 700 employing the node 1500 or 1700 is able to perform an inter-node communication without degrading communication performance even in a collective communication if a network configuration is of a mesh type.

For example, if the network configuration is of a torus type or a mesh type, the node 1200 decides a packet size with the expression (5). Namely, the node 1200 decreases a packet transmission interval as the number of hops up to a destination node increases. Here, considering a packet size ratio as a ratio of the total number of packets that nodes, which are sources of a collective communication, transmit in a certain length of time, the packet size ratio increases as the packet transmission interval decreases.

Generally, if the network configuration is of a torus type or a mesh type, the packet number ratio decreases as the number of hops up to a destination node increases. In contrast, the node 1200 increases the packet size ratio as the number of hops up to the destination node grows. As a result, the node 1200 performs operations such that an arrival time of a packet transmitted from the local node to the destination node and those of packets transmitted from other nodes to the destination node are equalized.

Additionally, if the network configuration is of a mesh type, and if the number of hops up to the destination node is not 1, for example, if the node 1200 is not connected to the switch to which the destination node is connected as in the state of the nodes N0 and N7 illustrated in FIG. 5, the node 1200 decides the packet transmission interval in step S1405. In this case, the node 1200 makes the packet transmission interval shorter than a preset value used in a normal communication.

Generally, if the network configuration is of a mesh type, a packet number ratio of a node other than anode directly connected to a switch to which a destination node is connected decreases. This is as illustrated in FIG. 5

However, if the network configuration is of a mesh type, and if the node 1200 is not connected to the switch to which the destination node is connected, the node 1200 increases the packet size ratio by reducing the packet transmission interval. As a result, the node 1200 performs operations such that an arrival time of a packet transmitted from the local node to the destination node and those of packets transmitted from other nodes to the destination node are equalized.

The node 2020 decides a packet size with the expression (10). Namely, the node 2020 increases the packet size as a measured response time grows. In this case, as the measured response time increases, so does a packet size ratio.

Generally, the packet number ratio is considered to further decrease as a result of arbitration performed by a switch on a communication path as the measured response time increases. In contrast, the node 2020 increases the packet size ratio as the measured response time grows. Consequently, the node 2020 is able to equalize the arrival time of a packet transmitted from the local node to a destination node and those of packets transmitted from other nodes to the destination node.

The node 2410 decides a packet size with the expression (12). Namely, the node 2410 increases the packet size as an average wait time of packets transmitted to a destination node grows. In this case, as the average wait time of packets transmitted to the destination node increases, so does a packet size ratio.

Generally, the packet number ratio is considered to decrease as a result of arbitration performed by a switch on a communication path as the average wait time of packets transmitted to a destination node grows. In contrast, the node 2410 increases the packet size ratio as the average wait time of packets transmitted to the destination node grows. As a result, the node 2410 is able to equalize the arrival time of a packet transmitted from the local node to the destination node and those of packets transmitted from other nodes to the destination node. Also the parallel computing device 2400 employing the node 2910 performs operations similar to those of the parallel computing device 2400 employing the node 2410.

As described above, using the parallel computing device according to the embodiments enables an inter-node communication that equalizes arrival times of data transmitted to a destination node.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A parallel computing device comprising
a plurality of nodes for executing an arithmetic process, the plurality of nodes being communicatively interconnected with each other, wherein
each of the plurality of nodes includes:
a packet transmission unit that transmits a packet;
a packet reception unit that receives a packet; and
a processor that performs a process including:
a measurement process to measure a communication bandwidth up to a destination node based on a number of transfer devices provided on a communication path between a first node included in the plurality of nodes and a second node included in the plurality of nodes, the transfer devices each transferring a packet, the first node being a communication source, and the second node being a communication destination of the first node;
a control process to control a size of a packet transmitted to the destination node according to the communication bandwidth measured by the measurement process;
a transmission process to control the packet transmission unit so as to transmit, to the second node, an examination packet including a count value area for holding a count value updated by one of the transfer devices each time the examination packet passes via the one of the transfer devices; and
a reception process to control the packet reception unit so as to receive a reply packet, in which the count value held in the count value area included in the examination packet is set by the second node, to the examination packet, and the measurement process obtains the number of transfer devices from the reply packet received by the reception process, and measures the communication bandwidth based on the obtained number of transfer devices.

2. The parallel computing device according to claim 1, wherein
the control process increases the size of the packet transmitted to the destination node according to the communication bandwidth measured by the measurement process.

3. The parallel computing device according to claim 1, wherein
the control process changes a transmission interval at which the each of the plurality of nodes transmits a packet to the destination node according to the bandwidth measured by the measurement process.

4. The parallel computing device according to claim 1, further comprising
a storage that stores information including the number of transfer devices, wherein
the measurement process obtains the number of transfer devices based on the information stored in the storage, and measures the communication bandwidth based on the obtained number of transfer devices.

5. The parallel computing device according to claim 1, wherein
the process performed by the processor further includes a calculation process to calculate the number of transfer devices based on a position relationship of the first node and the second node in a network including the plurality of nodes, and
the measurement process obtains the number of transfer devices calculated by the calculation process, and measures the communication bandwidth based on the obtained number of transfer devices.

6. A parallel computing device that includes a plurality of nodes for executing an arithmetic process, the plurality of nodes being communicatively interconnected each other, wherein
each of the plurality of nodes comprises:
a storage that stores a standard response time based on a number of transfer devices provided on a communication path between a first node included in the plurality of nodes and a second node included in the plurality of nodes, the transfer devices each transferring a packet, the first node being a communication source, and the second node being a communication destination of the first node; and
a processor that performs a process including:
a counting process to count a response time needed from when the first node transmits a packet to the second node until the first node receives from the second node a reply packet to the packet transmitted to the second node;
a measurement process to compare the standard response time stored in the storage and the response time counted by the counting process, and to measure a communication bandwidth up to a destination node based on a result of the comparison; and
a control process to control a size of a packet transmitted to the destination node according to the communication bandwidth measured by the measurement process.

7. A communication control device that controls a communication in a parallel computing device that includes a plurality of communicatively interconnected nodes for performing an arithmetic process, the communication control device comprising:
a storage that stores a number of transfer devices provided on a communication path between a communication source node and a communication destination node of the communication source node, the transfer devices each transferring a packet; and
a processor that performs a process including:
a measurement process to measure a communication bandwidth between nodes based on the number of transfer devices stored in the storage; and
a control process to control a size of a packet transmitted between the nodes according to the communication bandwidth measured by the measurement process;
a transmission process to transmit, to the communication destination node, an examination packet including a count value area for holding a count value updated by one of the transfer devices each time the examination packet passes via the one of the transfer devices;
a reception process to receive a reply packet, in which the count value held in the count value area included in the examination packet is set by the communication destination node, to the examination packet, and
an obtainment process to obtain the number of transfer devices from the received reply packet received by the reception process and to store the obtained number of transfer devices in the storage.

8. A communication control device that controls a communication in a parallel computing device that includes a plurality of communicatively interconnected nodes for performing an arithmetic process, the communication control device comprising
a storage that stores a standard response time based on a number of transfer devices provided on a communication path between a communication source node and a communication destination node, the transfer devices each transferring a packet; and
a processor that performs a process including:
a counting process to count a response time needed from when the communication source node transmits a packet to the communication destination node until the communication source node receives from the communication destination node a reply packet to the packet transmitted to the communication destination node;
a measurement process to compare the standard response time stored in the storage and the response time counted by the counting process, and to measure a communication bandwidth between nodes based on a result of the comparison; and
a control process to control a size of a packet transmitted between the nodes according to a result of the measurement by the measurement process.

9. A communication control method that controls a communication in a parallel computing device that included a plurality of nodes for executing an arithmetic process, the plurality of nodes being communicatively interconnected each other, the method comprising:
measuring a communication bandwidth based on a number of transfer devices provided on a communication path between a first node included in the plurality of nodes and a second node included in the plurality of nodes, the transfer devices each transferring a packet, the first node being a communication source, and the second node being a communication destination of the first node;

controlling a packet size according to the measured communication bandwidth;

transmitting, to the second node, an examination packet including a count value area for holding a count value updated by one of the transfer devices each time the examination packet passes via the one of the transfer devices;

receiving a reply packet, in which the count value held in the count value area included in the examination packet is set by the second node, to the examination packet; and obtaining the number of transfer devices from the received reply packet, wherein the communication bandwidth is measured based on the obtained number of transfer devices obtained from the received reply packet.

10. A communication control method that controls a communication in a parallel computing device that included a plurality of nodes for executing an arithmetic process, the plurality of nodes being communicatively interconnected each other, the process comprising:

counting a response time needed from when a first node included in the plurality of nodes transmits a packet to the second node included in the plurality of nodes until the first node receives from the second node a reply packet to the packet transmitted to the second node, the first node being a communication source, and the second node being a communication destination of the first node;

comparing a standard response time, which is based on a number of transfer devices provided on a communication path between the first node and the second node, and the counted response time;

measuring a communication bandwidth up to a destination node based on a result of the comparison; and controlling a size of a packet transmitted to the destination node according to the measured communication bandwidth.

\* \* \* \* \*